US012724462B2

(12) United States Patent
Thomas-Brigden

(10) Patent No.: US 12,724,462 B2
(45) Date of Patent: Sep. 1, 2026

(54) LAPTOP DISPLAY SYSTEMS

(71) Applicant: Blue Eggplant Pty Ltd, Crabbes Creek (AU)

(72) Inventor: Benjamin Thomas-Brigden, Crabbes Creek (AU)

(73) Assignee: BLUE EGGPLANT PTY LTD, Crabbes Creek (AU)

(*) Notice: Subject to any disclaimer, the term of this patent is extended or adjusted under 35 U.S.C. 154(b) by 379 days.

(21) Appl. No.: 18/209,956

(22) Filed: Jun. 14, 2023

(65) Prior Publication Data

US 2023/0324957 A1 Oct. 12, 2023

Related U.S. Application Data

(63) Continuation-in-part of application No. PCT/AU2021/051494, filed on Dec. 15, 2021.

(51) Int. Cl.
*G06F 1/16* (2006.01)

(52) U.S. Cl.
CPC .......... *G06F 1/1654* (2013.01); *G06F 1/1628* (2013.01); *G06F 1/1629* (2025.01); *G06F 1/1647* (2013.01); *G06F 1/1649* (2013.01)

(58) Field of Classification Search
CPC ...... G06F 1/1628; G06F 1/1629; G06F 1/166; G06F 1/1686; G06F 1/1647; G06F 1/1683; G06F 1/1649; G06F 1/165; G06F 1/1654
See application file for complete search history.

(56) References Cited

U.S. PATENT DOCUMENTS 6,256,193 B1 7/2001 Janik et al.
6,295,038 B1 * 9/2001 Rebeske ............... G06F 1/1616 361/679.04
6,343,006 B1 * 1/2002 Moscovitch ........ B60R 11/0235 361/679.04

(Continued)

FOREIGN PATENT DOCUMENTS

CN 109491453 A 3/2019
GB 2534590 A * 8/2016 ........... G06F 1/1654

(Continued)

OTHER PUBLICATIONS

International Search Report and Written Opinion for PCT App No. PCT/AU2021/051494 mailed Oct. 10, 2022, 8 pgs.

*Primary Examiner* — Nidhi Thaker
(74) *Attorney, Agent, or Firm* — Procopio, Cory, Hargreaves & Savitch LLP

(57) ABSTRACT

Various laptop display systems are provided that are ergonomic, reliable and visually appealing. In one form, the portable laptop display system is for use with a laptop computer and includes: an auxiliary display configured to be coupled to the laptop computer, a support assembly, coupled to the auxiliary display, the support assembly movable between a transport configuration and an extended configuration, the support assembly comprising: a rigid panel member, wherein in the transport configuration the rigid panel member is configured to extend across an entire front surface of the auxiliary display; and in the extended configuration, the rigid panel member supports the auxiliary display in an elevated position, such that it in use with the laptop computer the auxiliary display is displayed above a display of the laptop.

18 Claims, 40 Drawing Sheets

(56) References Cited

U.S. PATENT DOCUMENTS

| | | | | |
|---|---|---|---|---|
| 6,505,797 | B1 | 1/2003 | Dempsey | |
| 6,667,877 | B2 | 12/2003 | Duquette | |
| 6,667,878 | B2 * | 12/2003 | Ponx | G06F 1/1679 361/679.04 |
| 6,842,338 | B2 * | 1/2005 | Iredale | G06F 1/1616 361/740 |
| 7,277,275 | B2 * | 10/2007 | Won | G06F 1/1643 248/920 |
| 12,038,791 | B2 * | 7/2024 | Yao | G06F 1/1618 |
| 2002/0063072 | A1 | 5/2002 | Pham | |
| 2005/0253775 | A1 | 11/2005 | Stewart | |
| 2007/0223184 | A1 | 9/2007 | Garrett | |
| 2010/0124006 | A1 * | 5/2010 | Chang | G06F 1/1624 361/679.04 |
| 2012/0127646 | A1 | 5/2012 | Moscovitch | |
| 2015/0041609 | A1 * | 2/2015 | Lee | F16M 11/2021 248/447 |
| 2016/0066452 | A1 | 3/2016 | Music et al. | |
| 2017/0171528 | A1 * | 6/2017 | Ent | G06F 1/1607 |
| 2020/0033911 | A1 | 1/2020 | Moser | |

FOREIGN PATENT DOCUMENTS

| | | | | |
|---|---|---|---|---|
| KR | 20120022439 | A * | 3/2012 | G06F 1/1613 |
| KR | 2012-01115629 | A | 10/2012 | |
| WO | 2020077975 | A1 | 4/2020 | |

* cited by examiner

500

100

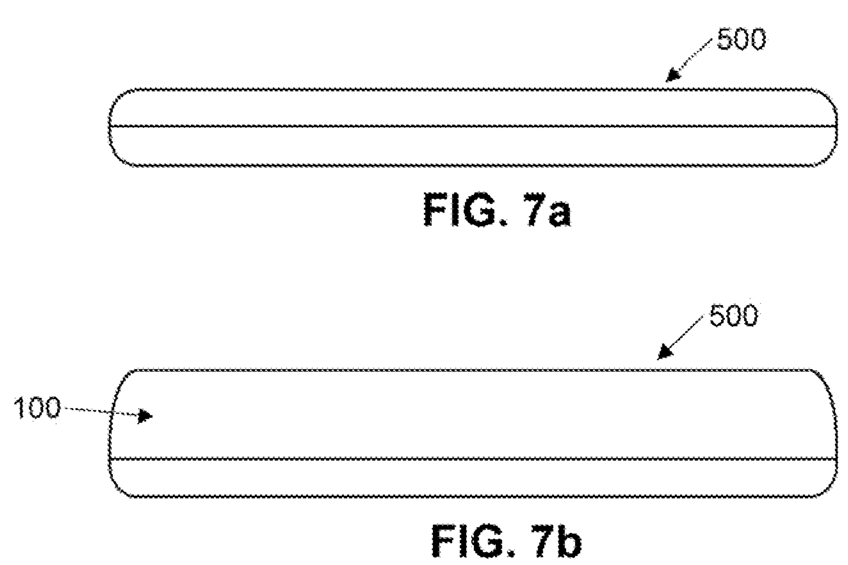
FIG. 7a
FIG. 7b
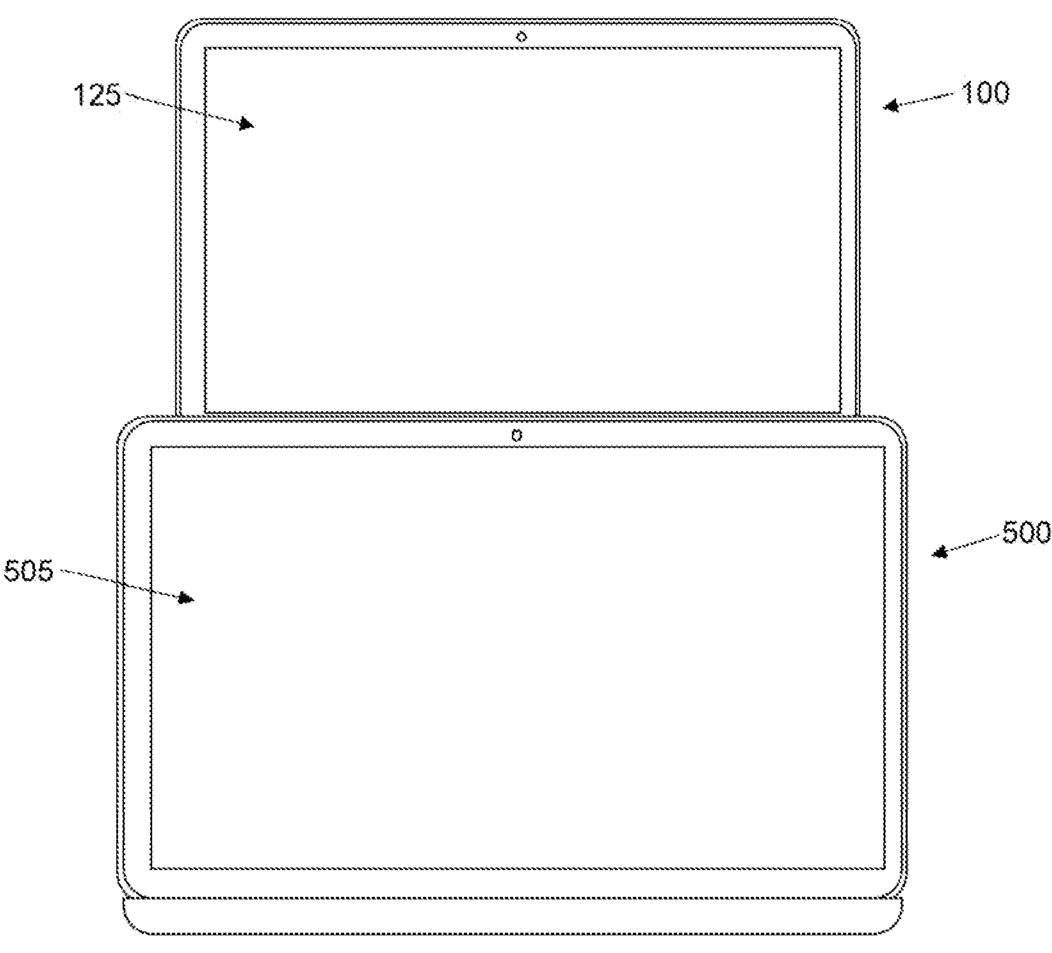
FIG. 8

LAPTOP DISPLAY SYSTEMS

CROSS-REFERENCE TO RELATED APPLICATIONS

This application is Continuation-in-Part of PCT Application No. PCT/AU2021/051494, filed Dec. 15, 2021, which claims the benefit of Australia Patent Application Nos. 2020904674, filed Dec. 15, 2020, and 2021903213, filed Oct. 7, 2021, and the disclosure of each is hereby incorporated by reference in its entirety.

This application also claims the benefit of Australia Patent Application Nos. 2022901627, filed Jun. 15, 2022, and 2022291645, filed Dec. 23, 2022, and the disclosure of each is hereby incorporated by reference in its entirety.

TECHNICAL FIELD

The present invention relates to computer displays, and in particular, although not exclusively, to laptop computer displays.

BACKGROUND ART

In dedicated workspaces, computer display real estate is highly valued. It is not uncommon for professionals to use computers with large and multiple displays, typically in a side-by-side arrangement on a work desk. This enables multiple different applications to be displayed simultaneously, and may increase productivity, particularly when multi-tasking.

When travelling, or working outside of a dedicated workspace, laptop computers are often used. Laptop computers are small, lightweight portable computers, which generally have a clamshell housing, with a compact display portion hingedly attached to a keyboard portion.

While being easy to transport, laptop computers by their very nature have a small display, which makes it difficult to work efficiently and ergonomically. In most modern laptop computers, the display will take up substantially all of the upper portion of the laptop, meaning that display sizes cannot be significantly increased without increasing the size of the laptop computer itself.

Several attempts have therefore been made to increase the size of laptop display real estate through other means. In most cases, this has involved the use of peripheral displays. A problem, however, with such peripheral displays is that they are bulky and not user friendly. As an illustrative example, transporting and setting up a peripheral displays for use beside a laptop is generally not feasible when travelling and in crowded environments.

Certain laptops exist which have multiple displays. A problem with such laptop computers is that they are generally expensive, and are still generally limited in the amount of display space they provide.

As such, there is clearly a need for improved laptop display devices.

It will be clearly understood that, if a prior art publication is referred to herein, this reference does not constitute an admission that the publication forms part of the common general knowledge in the art in Australia or in any other country.

SUMMARY OF INVENTION

The present invention is directed to display systems for computers which may at least partially overcome at least one of the abovementioned disadvantages or provide the consumer with a useful or commercial choice.

With the foregoing in view, the present invention in one form, resides broadly in a portable laptop display system for use with a laptop computer, the portable laptop display system including:

- an auxiliary display retainer portion, which is configured to receive and retain an auxiliary display for use with a laptop; and
- a stand portion, coupled to the auxiliary display retainer portion, which is movable between a transport configuration and an extended configuration,
- wherein in the extended configuration, the stand portion is configured to retain the auxiliary display in an elevated position such that it in use with the laptop computer the auxiliary display is displayed above a display of the laptop.

Advantageously, the system provides an elevated display for use with a laptop which not only increases screen real estate, through the addition of an auxiliary screen, but may also improve ergonomics by reducing the need for a user to consistently look down at a relatively low laptop screen. Furthermore, by extending the display area vertically, the system is particularly suited for use in crowded environments, such as in shared desk space, on public transport, on flights, etc.

Preferably, the stand portion is foldable between a transport and extended configuration.

Preferably, the portable laptop display system is configured to receive the laptop when the stand portion is in the transport configuration.

The laptop may be housed in a housing defined at least in part by the stand portion. In some embodiments, the stand portion comprises first and second panels, hingedly coupled to each other, wherein the laptop is received between the first and second panels in the transport configuration.

The first and/or second panels may include a closure, to retain the first and second panels in the transport configuration. The closure may comprise a zip, a fastener (e.g. a hook and loop fastener), a magnetic latch, or any other suitable closure.

The portable laptop display system may further include a support member, configured to prevent the opening of the first and second panel members beyond a certain extent. The support member may comprise a brace extending between the first and second panel members.

In the extended configuration, the stand portion may comprise a base member, and an upwardly extending vertical member, wherein the laptop is configured to be received on at least a portion of the base member. The base member may be supported on the knees, thighs or legs of a user while sitting.

In some embodiments, the base member includes a mouse, trackpad and/or keyboard support. The mouse and/or keyboard support may be retractable.

The base member may include a riser, configured to lift the laptop to allow air to flow under the laptop. The riser may be adjustable in height. The riser may be configured to lift a rear of a base portion of the laptop, thereby angling a base of the laptop relative to the base portion.

The base member may include a lip, configured to prevent the laptop from sliding laterally relative to the base member.

The base member may be extendable in a direction away from the vertical member.

The auxiliary screen may be coupled to the stand portion in both the transport and extended configurations. The auxiliary screen may be integrated into the stand portion. Alternatively, the auxiliary screen may be releasably coupled to the stand portion.

At least part of the stand portion may function as a protective housing for the auxiliary screen in the transport configuration.

The auxiliary screen may be configured to fold from the stand portion between the transport and extended configuration.

The auxiliary screen may be configured to slide from the stand portion between the transport and extended configuration.

The stand portion may include a laptop retainer, for engaging with and retaining the stand portion to the laptop.

The laptop retainer may comprise a magnetic retainer, configured to releasably engage with the laptop using magnetism. In some embodiments, the laptop may include magnets, configured to couple with the magnetic retainer. The magnets may be spaced along a width of the laptop and/or retainer, wherein detachment of the magnetic retainer may be performed by sliding the retainer relative to the laptop.

The stand portion may include a ledge, configured to receive a base of the auxiliary screen. The ledge may be provided at an upper portion of the stand portion. The ledge may comprise a channel, in which a base of the auxiliary screen is received.

The stand portion may be adjustable in height, to enable the auxiliary display to be retained at various heights.

The stand portion may include an electric coupling, for electrically coupling the laptop to the auxiliary display, for powering the auxiliary display and/or providing signals to the auxiliary display. The coupling may comprise a USB port or plug.

The stand portion may be reconfigurable to support the auxiliary display in a non-elevated position independently of the laptop. The auxiliary display may comprise a tablet computer, and in such case, this configuration may enable the tablet computer to be used independently of the laptop.

In another form, the invention resides broadly in a laptop display system including:

- a display retainer portion, which is configured to receive and retain a display of a laptop by engaging with and extending over substantially an entire rear surface of the display of the laptop and engaging with a front of the display of the laptop at a top and sides of the display of the laptop; and
- an auxiliary display portion, including an auxiliary display coupled to the laptop, the auxiliary display movable between a retracted position, where the display is not visible, and an extended position, where the display is visible.

Advantageously, by engaging with and extending over substantially an entire rear surface of the display of the laptop, a strong and secure coupling with the laptop can be provided without the need for adhesives. Furthermore, force is able to be evenly distributed across the entire laptop display, which reduces the risk of damaging the laptop display.

Preferably, the auxiliary display is configured to slide between the retracted position and the extended position.

Preferably, the auxiliary display portion includes a channel along which the auxiliary display is configured to slide.

Preferably, the auxiliary display is parallel to the display of the laptop when in the retracted position.

Preferably, the auxiliary display is configured to be above the display of the laptop when in the extended position.

Preferably, the auxiliary display is provided adjacent to the display of the laptop in the extended position such that the display of the laptop functionally extends onto the auxiliary display when used.

Preferably, the auxiliary display is configured to slide upwards from behind the display of the laptop.

Preferably, an angle of the auxiliary display relative to the display of the laptop is adjustable in the extended position. Suitably, the angle of the display is adjustable between a plurality of pre-defined positions.

Preferably, the display retainer portion is moulded to conform to a rear surface of the display of the laptop.

Preferably, the display retainer includes at least one retainer portion, defining a ledge that extends over a front edge of the laptop display, to thereby retain the display retainer to the laptop.

The display retainer may engage with the laptop display from behind in a press-fit arrangement.

Alternatively, the display retainer may slide down over the laptop display from above. The display retainer may include one or more retainers, to retain a bottom portion of the laptop display.

Preferably, the display retainer includes a plurality of retainer portions, spaced around a periphery of the display retainer.

Preferably, the auxiliary display is wirelessly coupled to the laptop.

Preferably, the auxiliary display includes a battery, configured to power the auxiliary display.

Alternatively, a wire may extend between the laptop and a port of the display system, and internally from the port of the display system to the auxiliary display.

Preferably, the auxiliary display comprises a tablet computer. Preferably, the tablet computer is releasably coupled to the auxiliary display portion, to enable the tablet computer to be used independently of the laptop.

Preferably, the display retainer portion and the auxiliary display portion are integrally formed.

Preferably, an outer surface of the laptop display system is convex.

In another form, the invention resides broadly in a laptop display system including:

- a display retainer portion, which is configured to receive and retain a display of a laptop by engaging with and extending over substantially an entire rear surface of the display of the laptop; and
- an auxiliary display portion, configured to receive an auxiliary display that is to be coupled to the laptop, wherein the auxiliary display portion is adapted to enable an installed auxiliary display to be movable between a retracted position, where the auxiliary display is not visible, and an extended position, where the auxiliary display is visible.

Preferably, the auxiliary display comprises a tablet computer.

Preferably, the auxiliary display is releasably coupled to the auxiliary display portion.

In yet another form, the invention resides broadly in a laptop display system including:

- a laptop retainer portion, which is configured to be retained by a laptop; and
- an auxiliary display portion, coupled to the laptop retainer portion, the auxiliary display portion including an auxiliary display coupled to the laptop, the auxiliary display adapted to be positioned above or beside the display of the laptop.

Advantageously, the use of the laptop retainer portion enables the auxiliary display portion to be lightweight and portable, while reducing the risk for the auxiliary display toppling over.

Preferably, the auxiliary display is adapted to be positioned above the display of the laptop.

Preferably, the laptop retainer portion comprises a base portion, and the auxiliary display portion comprises a vertically extending support.

The base portion and the vertically extending support may be coupled at between about 80°-100° relative to each other.

The base portion and the vertically extending support may be releasably couplable.

The base portion may engage with a base portion of the laptop. The base portion may engage in a locking arrangement with a case of or associated with the base portion of the laptop.

The auxiliary display portion may engage with a display portion of the laptop. The auxiliary display portion may be hingedly coupled to a case of or associated with the display portion of the laptop.

The auxiliary display portion, when not used to support the auxiliary display, may function as a protective case for the auxiliary display.

In yet another form, the invention resides broadly in a stabilisation system for a laptop, including:

- a stabiliser, that is extendable between a retracted position, where it is housed at a base of the laptop, and an extended position, where it extends outwardly from the base of the laptop.

Advantageously, the stabilisation system may prevent the laptop from toppling when weight is added to the laptop. e.g. an auxiliary display.

In yet another form, the invention resides broadly in a laptop display system including:

- an auxiliary display coupled to the laptop; and
- a stabiliser, that is extendable between a retracted position, where it is housed at a base of the laptop, and an extended position, where it extends outwardly from the base of the laptop.

In yet another form, the invention resides broadly in a protective cover assembly for a portable display, the protective cover assembly including:

- a display retainer, which is configured to receive and retain the portable display;
- a cover, coupled to the display retainer portion, which is movable between a transport configuration, where the cover covers the portable display, and an extended configuration, where the cover does not cover the portable display; and
- a laptop coupling, the laptop coupling configured to releasably couple to a laptop when the cover is in the extended configuration;
- wherein in the extended configuration, the cover is configured to function as a stand to support the portable display in an elevated position above a display of the laptop while the laptop coupling is coupled to the laptop.

Advantageously, the protective cover assembly conveniently provides a stand and cover in a single assembly. By releasably coupling to the laptop, it only impacts the laptop when used, rather than being always attached. Furthermore, by coupling to the laptop, the stand may be simple, without risking the assembly from tipping over. This enables the system to be very compact and lightweight, as well as being very user friendly, particularly when compared to more bulky, stand-alone solutions.

Preferably, the cover is foldable between a transport and extended configuration.

Preferably, the cover comprises one or more panels, hingedly coupled to each other.

Preferably, the cover assembly includes a closure, to retain the cover in the closed position.

Preferably, the display retainer, and thereby the display, is configured to slide outwardly from the cover between the transport and extended configuration.

Preferably, the display retainer, and thereby the display, is configured to fold outwardly from the cover between the transport and extended configuration.

Preferably, the laptop coupling includes one or more magnets, configured to magnetically engage with the laptop.

Preferably, the laptop coupling comprises a strip including a plurality of magnets extending across a width of the laptop display system.

Preferably, the strip includes a lip configured to extend over the top of the laptop to support the strip against the laptop.

Preferably, the laptop is provided with one or more magnets and/or ferrous elements, which are attached to the laptop via adhesive, for engagement with the one or more magnets of the laptop coupling.

Preferably, in the extended configuration, the cover comprises a horizontal base member, and an upwardly extending vertical member.

Preferably, the cover is foldable to provide a horizontal base member and an upwardly extending vertical member having one or more different heights.

Preferably, the laptop is configured to be received on at least a portion of the base member.

Preferably, the portable display comprises a tablet computer, which is functional independently of the laptop.

Preferably, the portable display is removable from the display retainer.

Preferably, the portable display is integrated into the protective cover assembly.

Preferably, the cover includes a gripping portion, such that in use, the gripping portion comprises a lower edge of the stand to prevent the stand from sliding relative to a support surface.

Preferably, the cover includes an electric coupling, for electrically coupling the laptop to the portable display, for powering the portable display and/or providing signals to the portable display.

Preferably, the cover is further configurable such that the cover is able to support the portable display in a non-elevated position on a surface independently of the laptop, where the cover does not cover the portable display.

Preferably, the cover is further configurable to cover the laptop.

In another form, the invention resides broadly in a portable laptop display system for use with a laptop computer, the portable laptop display system including:

- a hinged case for receiving the laptop computer, the laptop computer removable from the hinged case, the hinged case including a base member and an upper member hingedly coupled along an edge of the base member and upper member, the upper member rotatable around the at least one edge between a closed position, where the upper member closes against the base member to provide an enclosed case, and an open position, where the upper member extends upwardly from the base member at the at least one edge;
- an auxiliary display retainer defined in the upper member, which is configured to receive and retain an auxiliary display for use with the laptop, the auxiliary display retainer movable between a storage configuration and an extended configuration; and an adjustable brace member, configured to support the upper member in the open position at a user configurable angle;

wherein with the upper member in the open position and the auxiliary display retainer in the extended configuration, the auxiliary display is provided in an elevated position such that in use with the laptop being opened on the base, the auxiliary display is displayed above a display of the laptop, and in the storage configuration the auxiliary display is housed in the upper member.

Preferably, the hinged case includes a closure, to retain the case in the closed position.

Preferably, the closure comprises a zip.

Preferably, the display retainer, and thereby the display, is configured to slide outwardly from the upper member between the storage and extended configuration.

Preferably, the display retainer, and thereby the display, is configured to fold outwardly from the upper member between the storage and extended configuration.

Preferably, the base member includes a riser, configured to lift at least a portion of the laptop from the base.

Preferably, the riser is adjustable in height.

Preferably, the portable laptop display system further comprises one or more stabilisers, configured to extend outwardly from a rear of the base member, to prevent the display system from toppling backwards.

Preferably, the case includes an electric coupling, for electrically coupling the laptop to the portable display, for powering the portable display and/or providing signals to the portable display.

Preferably, the portable display comprises a tablet computer, which is functional independent of the laptop.

Preferably, the portable display is removable from the display retainer.

Preferably, the portable display is integrated into the case.

Preferably, the auxiliary display is larger than a display of the laptop.

Preferably, the base is extendible in a lateral direction.

Preferably, the upper member is releasably attachable to the laptop.

Preferably, the upper member includes one or more magnets releasably attachable to the laptop.

Preferably, the base member includes a non-slip surface, configured to prevent the laptop from sliding relative to the base member.

Preferably, the base member includes one or more extendible legs, configured to support the base member elevated above a support surface.

Preferably, the base member includes a keyboard support, for supporting a keyboard.

Preferably, the keyboard support is configured to slide outwardly from the base member.

In yet another form, the invention resides broadly in a portable laptop system for use with a laptop computer, the portable laptop system including:

a hinged case for receiving the laptop computer, the laptop computer removable from the hinged case, the hinged case including a base member and an upper member hingedly coupled along at least one edge, the upper member rotatable around the at least one edge between a closed position, where the upper member closes against the base member to provide an enclosed case, and an open position, where the upper member extends upwardly from the base member at the at least one edge;

an adjustable brace member, configured to support the upper member in the open position at a user configurable angle;

a keyboard or keyboard support, for supporting a keyboard, provided in the base member, and a retainer, provided on an inside of the base member, intermediate the at least one edge and an outer edge opposing the at least one edge, configured to retain a front edge of a base of the laptop, wherein in use in the open position, the retainer is configured to retain the front edge of the base of the laptop such that a rear of the base of the laptop is elevated from the base member and a display of the laptop is supported in an elevated position by the upper member.

Preferably, the retainer comprises one or more grooves or protrusions, configured to engage with a front edge of a base of the laptop.

Preferably, the retainer comprises a plurality of grooves or protrusions, configured to engage with a front edge of a base of the laptop at one of a plurality of pre-defined positions, each position for supporting the laptop at a different level of elevation.

Preferably, the retainer comprises a non-slip surface, configured to engage with a front edge of a base of the laptop.

Preferably, the keyboard or keyboard support comprises an integrated keyboard, integrated into the base member.

Preferably, the integrated keyboard includes a trackpad.

Preferably, the keyboard or keyboard support comprises a keyboard retainer, in the base member, for retaining a keyboard.

Preferably, the keyboard or keyboard support comprises a ledge, for supporting a keyboard.

Preferably, the ledge is configured to slide outwardly from the base member.

Preferably, the ledge is configured to be adjustable in height.

Preferably, the base includes one or more adjustable support members, configured to enable adjustment of an angle of the base member relative to a support surface.

Preferably, the one or more adjustable support members comprise first and second adjustable support members, which are slidably and hingedly attached to the base member and upper member.

Preferably, the hinged case includes a closure, to retain the case in the closed position.

Preferably, the closure comprises a zip.

Preferably, the base member includes a riser, configured to lift at least a portion of the laptop from the base.

Preferably, the riser is adjustable in height.

Preferably, the portable laptop display system further comprises one or more stabilisers, configured to extend outwardly from a rear of the base member, to prevent the display system from toppling backwards.

Preferably, the base member includes one or more extendible legs, configured to support the base member elevated above a support surface.

Preferably, a portion of a screen of the laptop is configured to be lifted above an upper edge of the upper member.

Advantageously, the stabiliser may prevent the laptop from toppling from the weight of the auxiliary display.

In yet another form, the invention resides broadly in a protective cover assembly including:

a cover comprising a rigid panel coupled to a portable display, which is movable between a transport configuration, where the rigid panel covers substantially an entire front of the portable display, and an extended configuration, where the rigid panel is configured to function as a stand to support the portable display in an elevated position.

Advantageously, the protective cover assembly conveniently provides a stand and cover in a single assembly. By using the rigid panel to support the display, which is sized to cover substantially the entire front of the display, the display is able to be raised to a height at or near the height of the display above the support surface.

Preferably, the cover is foldable between a transport and extended configuration.

Preferably, the cover comprises multiple panels. One or more additional panels may function to support the rigid panel.

Preferably, the cover is coupled to the display using a hinge or one or more flexible straps.

Preferably, the flexible straps enable the cover to be coupled to a rear of the display in the extended configuration such that the rigid panel extends downwardly from the rear of the display to a support surface.

The cover may be coupled to the rear of the display using one or more of hook and loop fasteners and magnets.

The cover may be coupled to the rear of the display at different positions such that the display may be supported at different heights above the support surface.

Preferably the hinge comprises a torque hinge. Alternatively, the display may be configurable to be attached to the panel at one or more predefined angles.

Preferably, the cover assembly includes a closure, to retain the cover in the closed position.

In yet another form, the invention resides broadly in a computer system including:

a data input device, with which a user may interact;

a camera, configured to capture images of the data input device and an interaction therewith by a user, and a display screen, on which images captured by the camera of the data input device and the interaction therewith by the user are displayed.

Advantageously, by displaying the interaction with the data input device by the user, on the display screen, the user is able to interact more accurately with the data input device without looking away from the display screen. Such system may be beneficial from an ergonomics perspective, as the user need not look down at the data input device, or from an efficiency perspective, in that the user is able to maintain focus on the display screen.

Preferably, the data input device is a keyboard.

Preferably, the camera is configured to capture the data input device from above.

Preferably, the display screen is configured to overlay images on a portion of the display screen. The overlay may be semi-transparent.

The system may comprise a laptop computer.

The camera may comprise a camera of the laptop computer. A reflective device may be used to direct the camera to the data input device (e.g. keyboard).

The reflective device may comprise a mirror, angled relative to the camera. The mirror may be mounted to the laptop.

The camera may be an external camera coupled to the laptop computer. The external camera may be supported such that it is directed towards the data input device (e.g. keyboard).

The keyboard may be a keyboard of the laptop computer. The keyboard may be an external keyboard coupled to the laptop computer.

The display screen may be an auxiliary display screen coupled to the laptop computer. The display screen may be provided in an elevated position for ergonomics.

In yet another form, the invention resides broadly in a portable laptop display system for use with a laptop computer, the portable laptop display system including:

an auxiliary display configured to be coupled to the laptop computer, a support assembly, coupled to the auxiliary display, the support assembly movable between a transport configuration and an extended configuration, the support assembly comprising:

a rigid panel member, wherein in the transport configuration the rigid panel member is configured to extend across an entire front surface of the auxiliary display; and in the extended configuration, the rigid panel member supports the auxiliary display in an elevated position, such that it in use with the laptop computer the auxiliary display is displayed above a display of the laptop.

Preferably, the support assembly further comprises a support member, wherein the rigid panel member and the support member define a base of the support assembly.

Preferably, the support member is pivotally attached to the rigid panel member.

Preferably, the support member is pivotally attached to an upper end of the rigid panel member.

Preferably, the display is pivotally attached to the rigid panel member.

Preferably, the support member comprises a second panel member.

Preferably, the second panel member is substantially the same size as the rigid panel member.

Preferably, the support member comprises a kickstand that extends outwardly from the rigid panel member.

Preferably, the rigid panel member and/or the support member include one or more extensions, configurable to further elevate the display relative to a support surface.

Preferably, the one or more extensions are telescopic, and extend in a direction parallel to the rigid panel member or the support member.

Preferably, the auxiliary display is coupled to the support assembly by an extension member, wherein the extension member is configurable to elevate the display relative to the support assembly.

Preferably, the extension member comprises a telescopic member.

Preferably, the rigid panel member is coupled to the display by a hinge member, the hinge member including a hollow inner body extending across a width of the rigid panel member.

Preferably, the auxiliary display is configured to be coupled to the laptop computer at least in part using a cable, the cable extending through at least part of the hollow inner body.

Preferably, the hollow inner body is cylindrical in shape.

Preferably, the system further comprises a camera configured to be coupled to the laptop computer and/or the auxiliary display.

Preferably, the camera is configurable to be directed in different directions.

Preferably, the camera is coupled to an end of an arm that extends outwardly from the system.

Preferably, the arm is flexible.

Preferably, the camera is configurable to capture images of a keyboard of the laptop, and a user's fingers thereon, and display the images in real time or near real time on a display of the laptop computer and/or the auxiliary display.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 7*a* illustrates a side view of the laptop of FIG. 5, closed without the laptop display system of FIG. 1 installed.

FIG. 8 illustrates a front view of the laptop of FIG. 5, open with the laptop display system of FIG. 1 installed and in an extended (display) state.

FIG. 84 illustrates a portable keyboard for use with a computing system, such as a laptop or tablet computer, according to an embodiment of the present invention.

FIG. 66 illustrates a front view of a case, with first and second legs, supporting the case above a support surface.

FIG. 67 illustrates a side view of a laptop display system used with the laptop of FIG. 5, according to an embodiment of the present invention.

FIG. 70 illustrates a side view of a laptop display system used with the laptop of FIG. 5 with a camera extension, according to an embodiment of the present invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figures 1, 2:
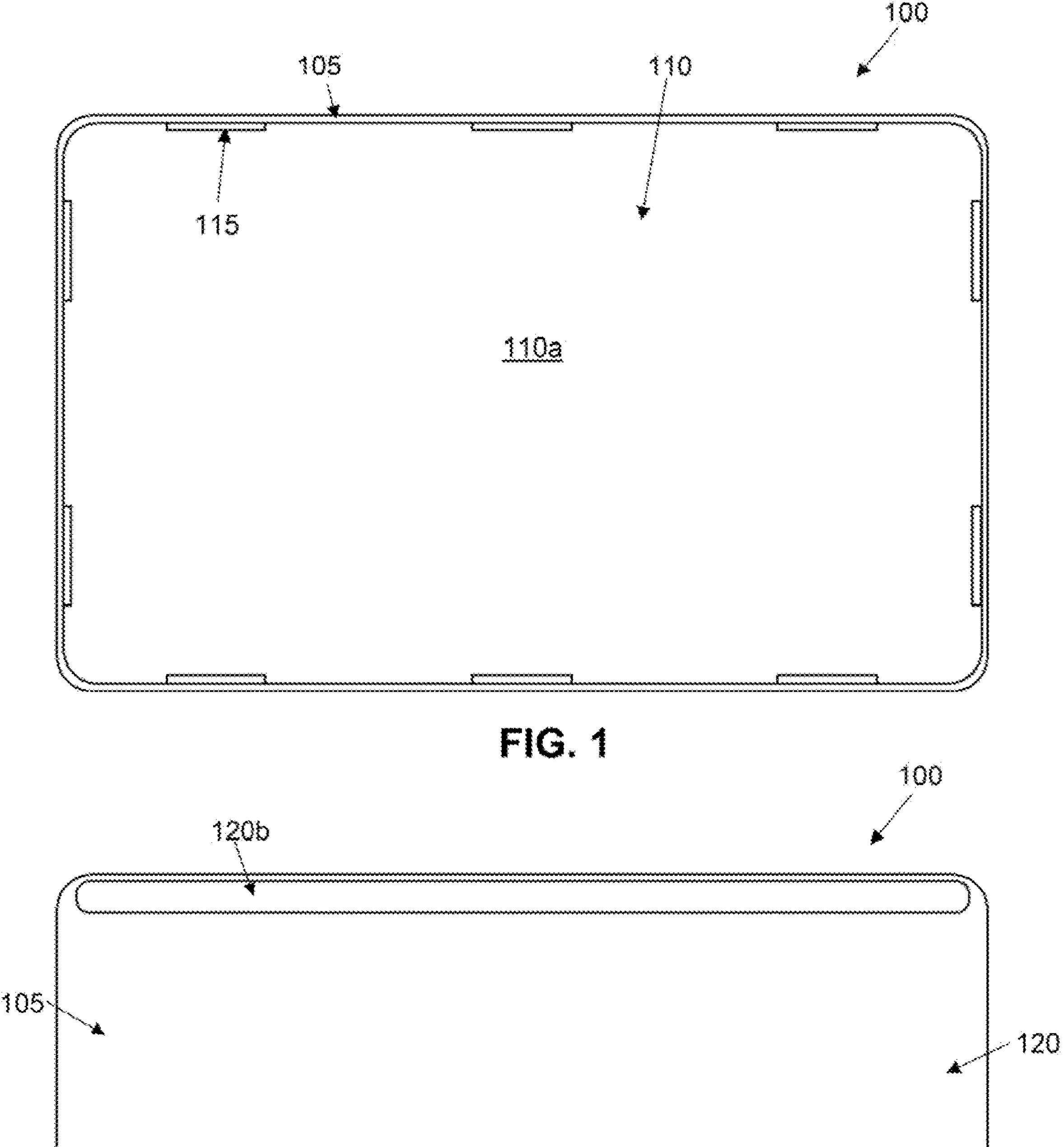
FIG. 1 illustrates a front view of a laptop display system, according to an embodiment of the present invention.
FIG. 2 illustrates a rear view of the display system of FIG. 1.
Figures 3, 4:
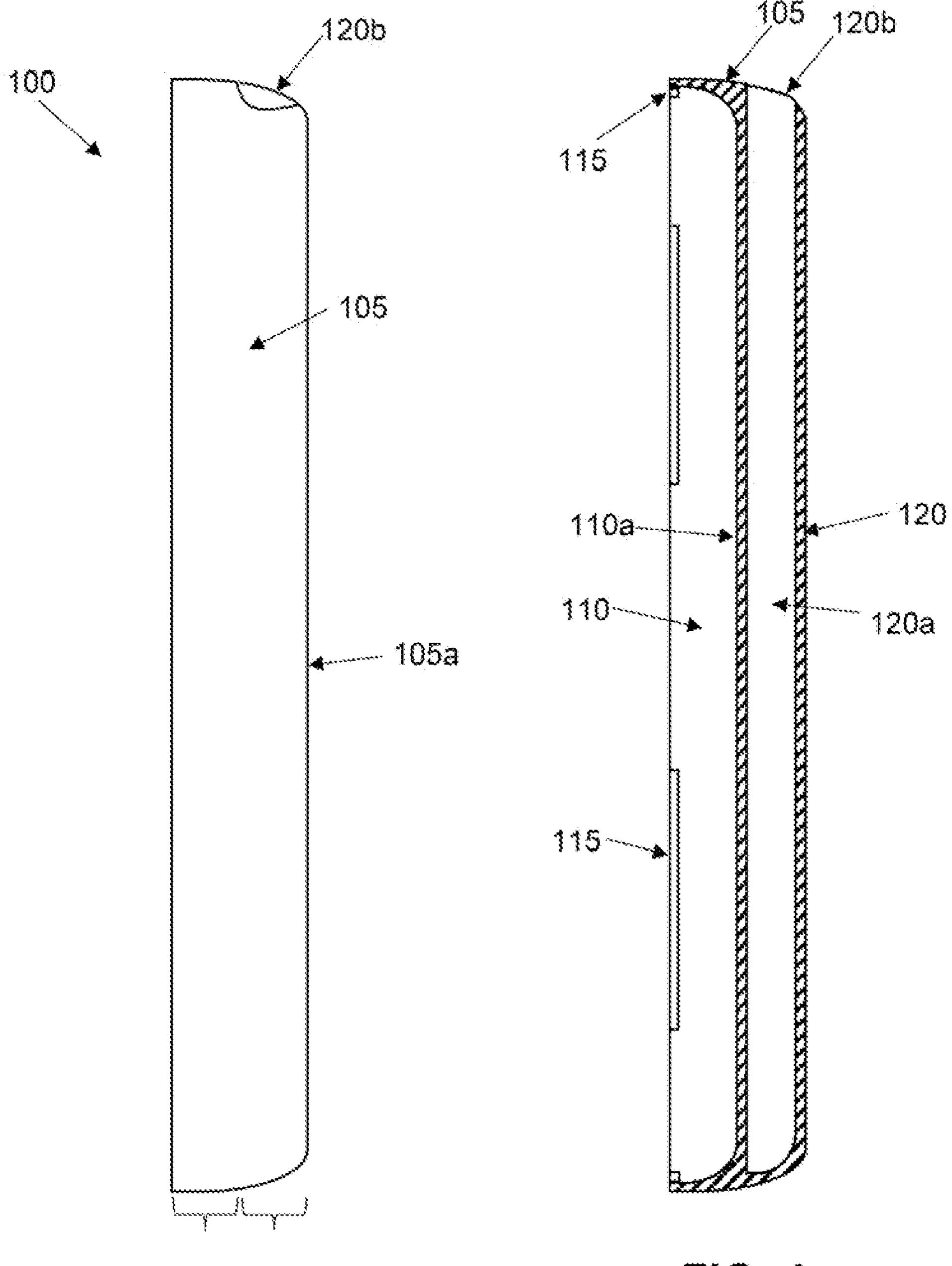
FIG. 3 illustrates a side view of the display system of FIG. 1.
FIG. 4 illustrates a side cross-sectional view of the laptop display system of FIG. 1 through a centre of the laptop display system.

FIG. 1 illustrates a front view of a laptop display system 100, according to an embodiment of the present invention. FIG. 2 illustrates a rear view of the display system 100, and FIG. 3 illustrates a side view of the display system 100. The terms front, rear, side, etc herein are used relatively, and front generally refers to the front (viewing side) of the display system 100 when used.

The laptop display system 100 is configured to be releasably attached to a display of a laptop computer, and includes an auxiliary display, which may be used with the laptop. The laptop display system 100 thus allows a user to upgrade a laptop computer to include an auxiliary display, in an easy to use and elegant manner, and without requiring any permanent modification to the laptop.

The auxiliary display is retracted, and thus not illustrated, in FIGS. 1-3.

The laptop display system 100 comprises a body 105 which includes a laptop display retainer portion 110, which is configured to receive and retain the display of the laptop. The body 105 and the laptop display retainer portion 110 which is formed therein is rigid, and the laptop display retainer portion 110 includes an inside surface 110*a* which conforms substantially to an outside of the display of the laptop, and therefor when installed, is in positioned immediately adjacent to the outside of the display.

A plurality of retainer portions 115 extend inwardly from a peripheral edge of the laptop display retainer portion 110. The retainer portions 115 define small ledges that extend inwardly from a peripheral edge of the laptop display retainer portion 110 and over an edge of the laptop display in use. As such, the laptop display retainer portion 110 may be pressed over the display of the laptop such that the retainer portions engage with a front of the display, thereby retaining the laptop display retainer portion 110 to the laptop.

The laptop display system 100 further includes a display portion 120, located immediately behind the laptop display retainer portion 110 and includes an auxiliary display therein, which may slide up and down between retracted (storage) and extended (display) positions. The auxiliary display is described in further detail below.

FIG. 4 illustrates a side cross-sectional view of the laptop display system 100 through a centre of the laptop display system 100. The auxiliary display has been removed for clarity.

The display portion 120 comprises an auxiliary display channel 120*a*, which is defined immediately behind the laptop display retainer portion 110, and is configured to receive the auxiliary display. A front of the channel 120*a* Is defined by the inside (rear) surface 110*a* of the display retainer portion 110.

The channel 120*a* includes guides (not shown), to guide the auxiliary display between retracted (storage) and extended (display) configurations, and retainers (not shown) to retain the auxiliary display in each of the retracted (storage) and extended (display) configurations.

The channel 120*a* includes an opening 120*b* at an upper end thereof, through which the auxiliary display may extend. The channel 120*a* is closed at its sides and bottom, and an upper portion of the auxiliary display may close the opening 120*b* in the retracted configuration.

The guides may comprise protrusions in the channel 120*a*, to engage with corresponding channels in the display (or a housing thereof), or vice versa. The retainers may similarly comprise protrusions, which may form ledges or other retaining members to retain the display in one of its positions.

Now turning back to FIGS. 2 and 3, a rear surface 105*a* of the body 105 of the laptop display system 100 is convex and smooth, and in use, essentially replaces the outer housing of the display of the laptop. This enables the laptop with the display system 100 installed to be used and transported in a retracted (storage) configuration much like if the display system 100 were not installed.

As illustrated below, apart from being somewhat thicker, when the auxiliary display is not used, the laptop display system 100 does not in any other way change the appearance or function of the laptop on which it is installed, outside of providing the additional functionality described here. It should also be noted that the laptop display system 100 may be much thinner than illustrated, and thus may impact the laptop minimally, but is shown in such manner for the sake of clarity.

Figures 5A, 5B:
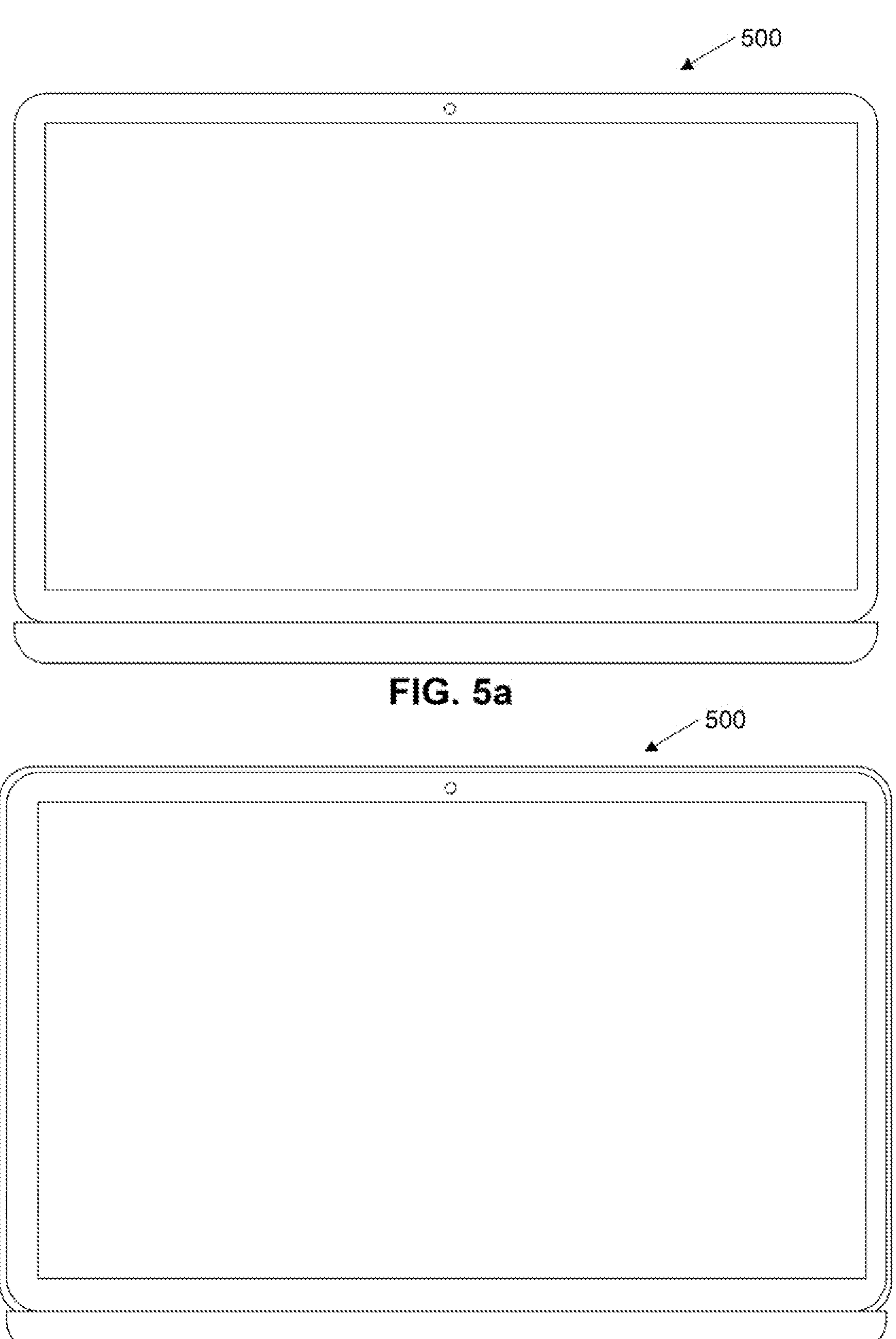
FIG. 5*a* illustrates a front view of a laptop, open and without the laptop display system of FIG. 1 installed.
FIG. 5*b* illustrates a front view of the laptop of FIG. 5, open and with the laptop display system of FIG. 1 installed and in a retracted (storage) state.

FIG. 5*a* illustrates a front view of a laptop 500, open and without the laptop display system 100 installed. FIG. 5*b* illustrates a front view of the laptop 500, open and with the laptop display system 100 installed and in a retracted (storage) state.

As can be seen from FIGS. 5*a* and 5*b*, the front view of the laptop 500 is substantially unchanged with the laptop display system installed, while in the retracted (storage) state.

Figures 6A, 6B:
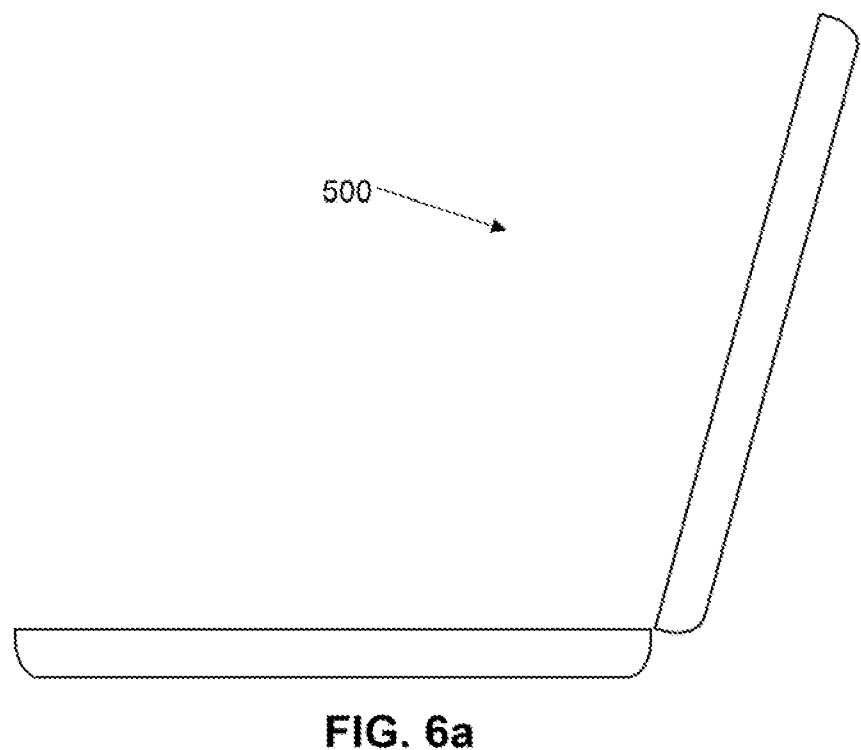
FIG. 6*a* illustrates a side view of the laptop of FIG. 5, open without the laptop display system of FIG. 1 installed.
FIG. 6*b* illustrates a side view of the laptop of FIG. 5, open with the laptop display system of FIG. 1 installed and in a retracted (storage) state.

FIG. 6*a* illustrates a side view of a laptop 500, open without the laptop display system 100 installed. FIG. 6*b* illustrates a side view of the laptop 500, open with the laptop display system 100 installed and in a retracted (storage) state.

As can be seen from FIGS. 6*a* and 6*b*, the side view of the laptop 500 while open is only minimally changed with the laptop display system installed, namely the upper portion of the laptop is slightly thicker, while in the retracted (storage) state.

FIG. 7*a* illustrates a side view of a laptop 500, closed without the laptop display system 100 installed. FIG. 7*b* illustrates a side view of the laptop 500, closed with the laptop display system 100 installed and in a retracted (storage) state.

As can be seen from FIGS. 7*a* and 7*b*, the side view of the laptop 500 while closed is only minimally changed with the laptop display system installed, namely slightly thicker, while in the retracted (storage) state.

The laptop 500 may be used in the same way as if the laptop display system 100 were not installed. As such, when not used, the laptop display system 100 does not cause inconvenience, enabling it to be kept on the laptop even when not used. When the auxiliary display is to be used, it may be slid out into position and used.

Figures 9, 10:
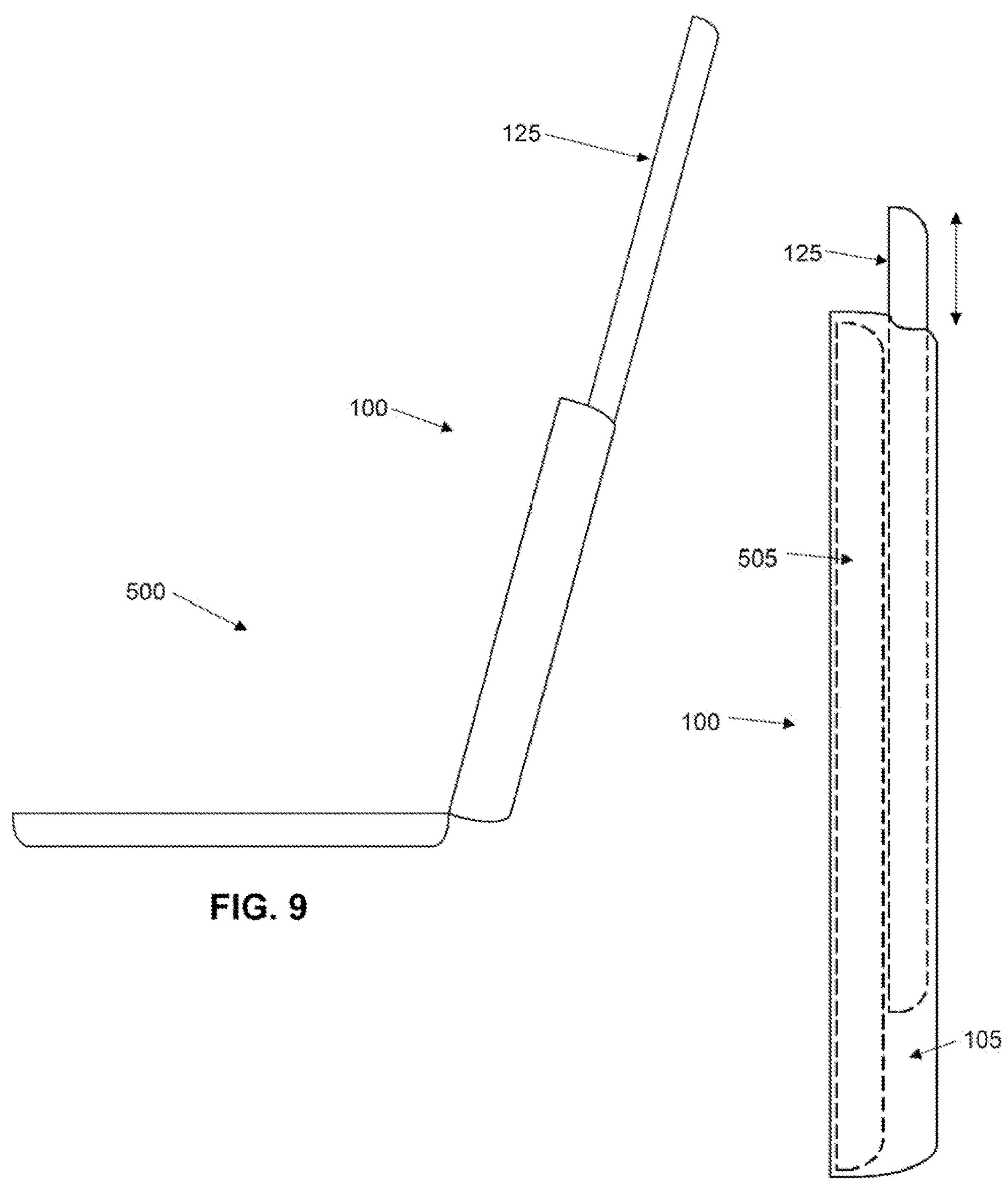
FIG. 9 illustrates a side view of the laptop of FIG. 5, open with the laptop display system of FIG. 1 installed and in an extended (display) state.
FIG. 10 illustrates a side view of the laptop display system of FIG. 1 with the auxiliary display partially extended, to illustrate the mechanism.

FIG. 8 illustrates a front view of the laptop 500, open with the laptop display system 100 installed and in an extended (display) state. FIG. 9 illustrates a side view of the laptop 500, open with the laptop display system 100 installed and in an extended (display) state. FIG. 10 illustrates a side view of the laptop display system 100 with the auxiliary display partially extended, to illustrate the mechanism.

As can be seen from FIG. 8, the useable display area is significantly increased, as an auxiliary display 125 is provided immediately above a primary display 505 of the laptop 500, essentially extending the primary display 505 of the laptop 500.

The auxiliary display 125 includes a wireless interface, coupling the auxiliary display 125 to the laptop 500. The auxiliary display 125 further includes a battery, configured to power the auxiliary display. As such, no wires are required between the auxiliary display 125 and the laptop 500.

In some embodiments, the auxiliary display 125 comprises a tablet computer. In such case the tablet computer may be removed from the laptop display system 100 and used independently of the laptop 500.

The tablet computer (or display 125 more generally) may be provided within a case that is adapted to be received in the channel 120*a*. The case may include protrusions or channels which are configured to engage with corresponding protrusions or channels in the channel 120*a*.

Such configuration enables both the laptop and the tablet computer to be off-the-shelf hardware, which enables users to purchase a laptop and tablet computer according to their needs, and potentially even at different points of time.

The tablet computer may engage with the case in a similar manner to how the laptop display retainer portion 110 engages with the laptop display, e.g. being formed to the tablet and including retaining portions 115.

By providing a display that is able to slide outwardly and above the existing display of the laptop has several benefits. Firstly, it is able to be used in compact environments, unlike side-by-side displays. In extreme cases, the laptop display system 100 may be used when working shoulder-to-shoulder with others, without interfering with the space of others. One example of such use is on aeroplanes and public transport.

Furthermore, by extending the display vertically, documents, code and other line-based content may be viewed such that a large number of lines may be simultaneously displayed in a continuous manner.

As the auxiliary display is stored behind the primary display of the laptop in parallel planes, the display system may be made in a compact manner. In some embodiments, only the thickness of the upper display portion of the laptop is changed, to facilitate housing of the auxiliary display 125. The thickness may be increased by no more than 15 mm in some embodiments. In other embodiments, the thickness may be increased by no more than 5 mm.

Another advantage of embodiments of the invention, but no less importantly, relates to ergonomics. In particular, extending the display vertically lifts at least part of the viewing area, which has significant ergonomic benefits for the user of the laptop.

Figure 11A:
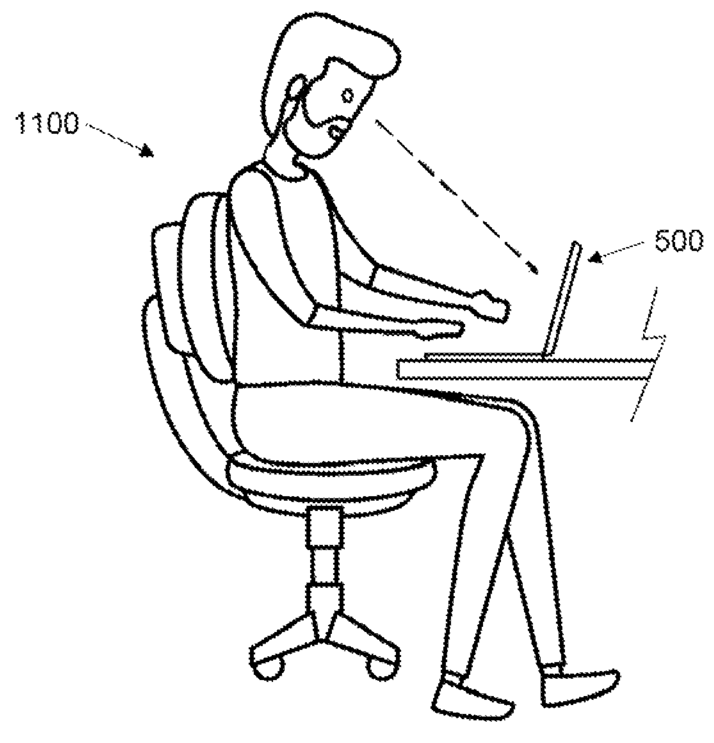
FIG. 11*a* illustrates an exemplary configuration of a user using the laptop of FIG. 5 without the laptop display system of FIG. 1.

FIG. 11*a* illustrates an exemplary configuration of a user 1100 using the laptop 500 without the laptop display system 100. The user 1100 looks down at the display, which puts strain on his neck.

Figure 11B:
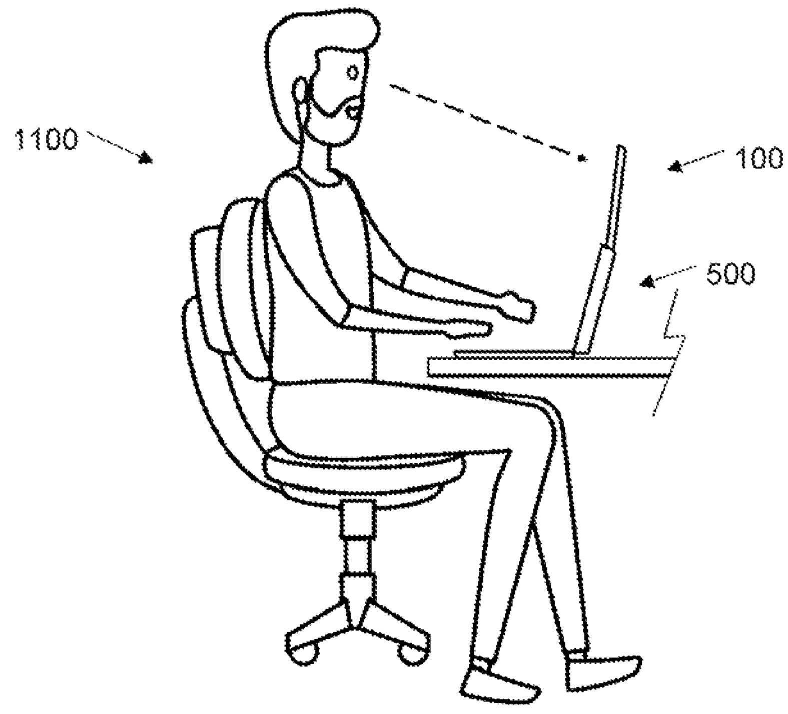
FIG. 11*b* illustrates an exemplary configuration of the user of FIG. 11 using the laptop of FIG. 5 with the laptop display system of FIG. 1.

FIG. 11*b* illustrates an exemplary configuration of the user 1100 using the laptop 500 with the laptop display system 100. The user 1100 is able to look forward to the display, which alleviates the strain on his neck. The auxiliary display 125, being more ergonomically positioned, may even be chosen as the primary workspace of the user 1100.

While the above embodiments describe the auxiliary display being a tablet computer with its own power supply and wireless connectivity, the skilled addressee will readily appreciate that the laptop display system 100 may alternatively include a simple display which is connected to the laptop by wires for both power and signal.

The laptop display retainers described above are illustrated with retainer portions (tabs) that extend around a peripheral edge of the laptop display retainer portion. In alternative embodiments, a lower edge of the laptop display retainer may be open from below, with a single lip, tabs or the like on upper and side edges, such that the laptop display retainer may slide onto the laptop screen from above. In such case, a simple clip/latch could be used at the bottom to stop the retainer from sliding off.

Figures 12, 13:
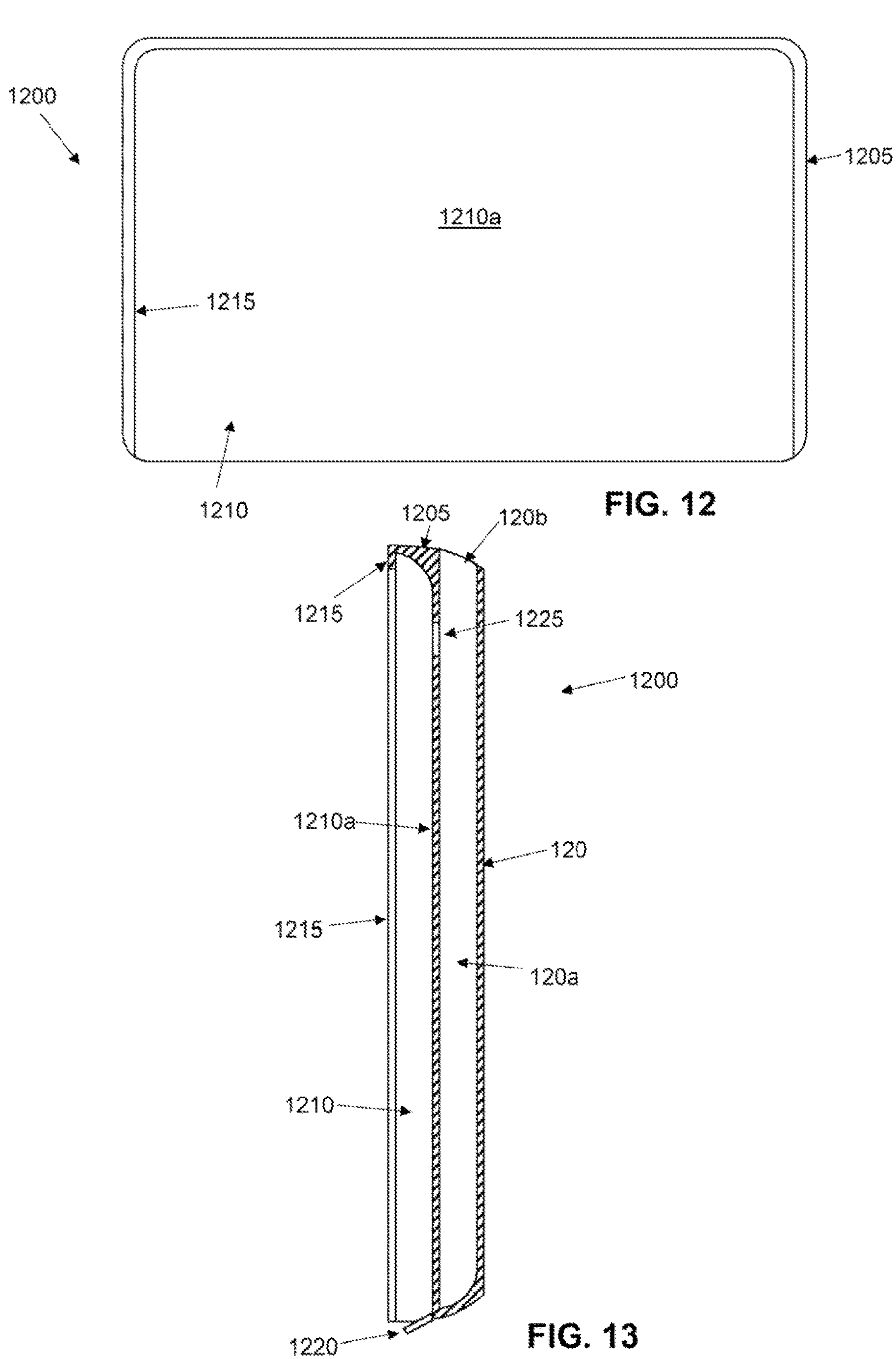
FIG. 12 illustrates a front view of a laptop display system, according to an embodiment of the present invention.
FIG. 13 illustrates a side cross-sectional view of the laptop display system of FIG. 12 through a centre of the laptop display system.

FIG. 12 illustrates a front view of a laptop display system 1200, according to an embodiment of the present invention. FIG. 13 illustrates a side cross-sectional view of the laptop display system 1200 through a centre of the laptop display system 1200. The auxiliary display has been removed in FIG. 13 for clarity.

The display system 1200 is similar to the display system 100, and includes an auxiliary display, but releasably engages with the display of the laptop by sliding down over the display of the laptop from above.

The laptop display system 1200 comprises a body 1205 which includes a laptop display retainer portion 1210, which is configured to receive and retain the display of the laptop. The body 1205 and the laptop display retainer portion 1210 which is formed therein is rigid, and the laptop display retainer portion 1210 includes an inside surface 1210*a* which conforms substantially to an outside of the display of the laptop, much like for the display system 100.

Instead of retainer portions 115, a lip 1215 extends around upper and side edges of the laptop display retainer portion 1210. The lip 1215 functions as a small ledge that extends inwardly and over an upper and side edges of the laptop display in use. As such, the laptop display retainer portion 1210 may be slid down over the display of the laptop such that the lip 1215 engages with a front of the display at its top and sides, thereby retaining the laptop display retainer portion 110 to the laptop.

A flexible (or pivotal) retainer 1220 (optional) is provided at a lower end of the display retainer portion 1210 to releasably retain the display in the display retainer portion 1210. Similarly, one or more magnetic or ferrous metal retainers 1225 (optional) is provided in the inside surface 1210*a* of the display retainer portion 1210 to engage with magnetic or ferrous metal in the rear of the laptop.

The laptop display system 1200 further includes a display portion 120, as outlined above in relation to the system 100.

The display system 1200 may distribute weight across the display of the laptop more evenly, as the entire upper and side surfaces of the laptop display are gripped, rather than just at tabs. The slide-on installation (and similarly the slide-off removal) of the system 1200 does not have any "snap on" (or "snap off") action, which may decrease the likelihood that the laptop display screen is damaged or cracked during installation, use or removal, particularly for thin laptop displays.

The display system may be made with rigid material (much more rigid than the display system 100), as neither installation nor removal requires the display system to bend or flex. In particular, the display system may be made from very rigid plastic, or even metal.

While not explicitly illustrated, the skilled addressee will readily appreciate that the slide-on laptop display retaining mechanism illustrated above may be used together with other embodiments, and that different laptop display retaining mechanisms may be interchanged.

Figures 14, 15:
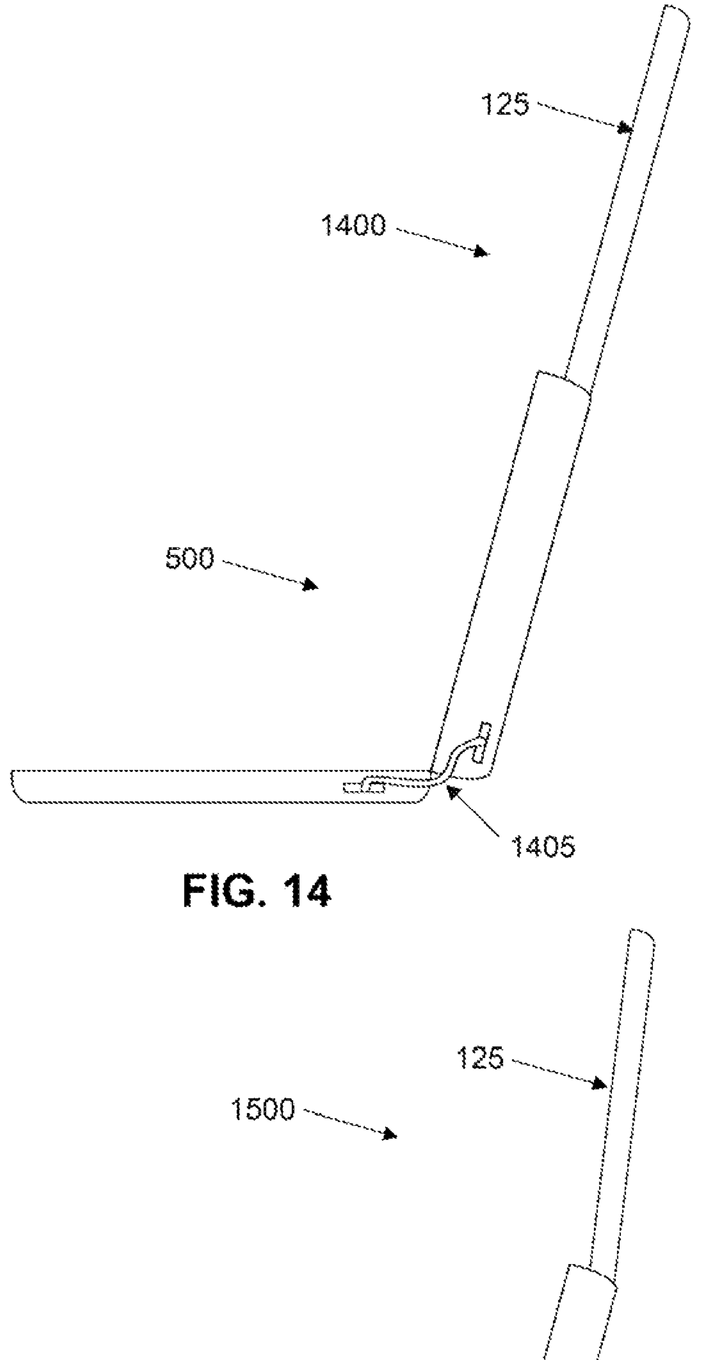
FIG. 14 illustrates a laptop display system installed on the laptop of FIG. 5, according to an embodiment of the present invention.
FIG. 15 illustrates a laptop display system installed on the laptop of FIG. 5, according to an embodiment of the present invention.

FIG. 14 illustrates a laptop display system 1400 installed on the laptop 500, according to an embodiment of the present invention.

The laptop display system 1400 is similar to the system 100 or 1200, but wherein the auxiliary display is without its own power supply or wireless interface. In such case, a universal serial bus (USB) cable 1205 couples the laptop 500 to the housing of display system 1400, and then internally to the auxiliary display. Such configuration is particularly beneficial as it enables a very small cable (e.g. USB-C) to be used to both power the auxiliary display and provide a signal thereon, and the internal cable is hidden and therefore unable to catch on things or tangle.

The skilled addressee will readily appreciate that such configuration is also suitable for use with tablets and auxiliary displays with their own power supply and/or wireless interface. In such case, the cable may be used to charge the tablet, or maintain charge in the tablet.

Depending on a size of the laptop and laptop display system, and viewing angle, it may be desirable to be able to adjust an angle between the display of the laptop and the auxiliary display.

FIG. 15 illustrates a laptop display system 1500 installed on the laptop 500, according to an embodiment of the present invention.

The laptop display system 1500 is similar to the system 100, but wherein the auxiliary display is able to be angled relative to the laptop display. This may be achieved using a torque hinge, a plurality of pre-defined support members, each supporting the auxiliary display at different angles, or any suitable mechanism.

The auxiliary display is generally lightweight, but does add additional weight to the display of the laptop, and thus the torque hinge of the laptop. In some cases, it is desirable to provide additional support to the display of the laptop The display system 1500 includes a support arm 1505, which may extend outwardly from a rear of the display system 1500, to thereby support the display. The support arm may take various forms, including a bracket, kickstand or the like. The support arm 1505 may help prevent the laptop from topping over due to the additional weight of the auxiliary display, and may also take pressure off hinges of the laptop, and thereby prevent wear of the hinges or alternatively the hinges from inadvertently opening.

In other embodiments, other types of locking mechanisms may be used to lock the angle of the laptop due to the extra weight of the auxiliary display. This can include locking members on the body 105 that engage with locking members of a corresponding housing installed on the keyboard portion of the laptop.

In some embodiments, laptop display systems are provided which function much like stands for the auxiliary display. One benefit with such configuration is that the auxiliary display may be stored with or separate to the laptop. However, in such scenarios, it is desirable to include some form of laptop retainer portion, so that the weight of the laptop may be used to prevent the stand (and thus auxiliary display) from toppling.

Figure 16:
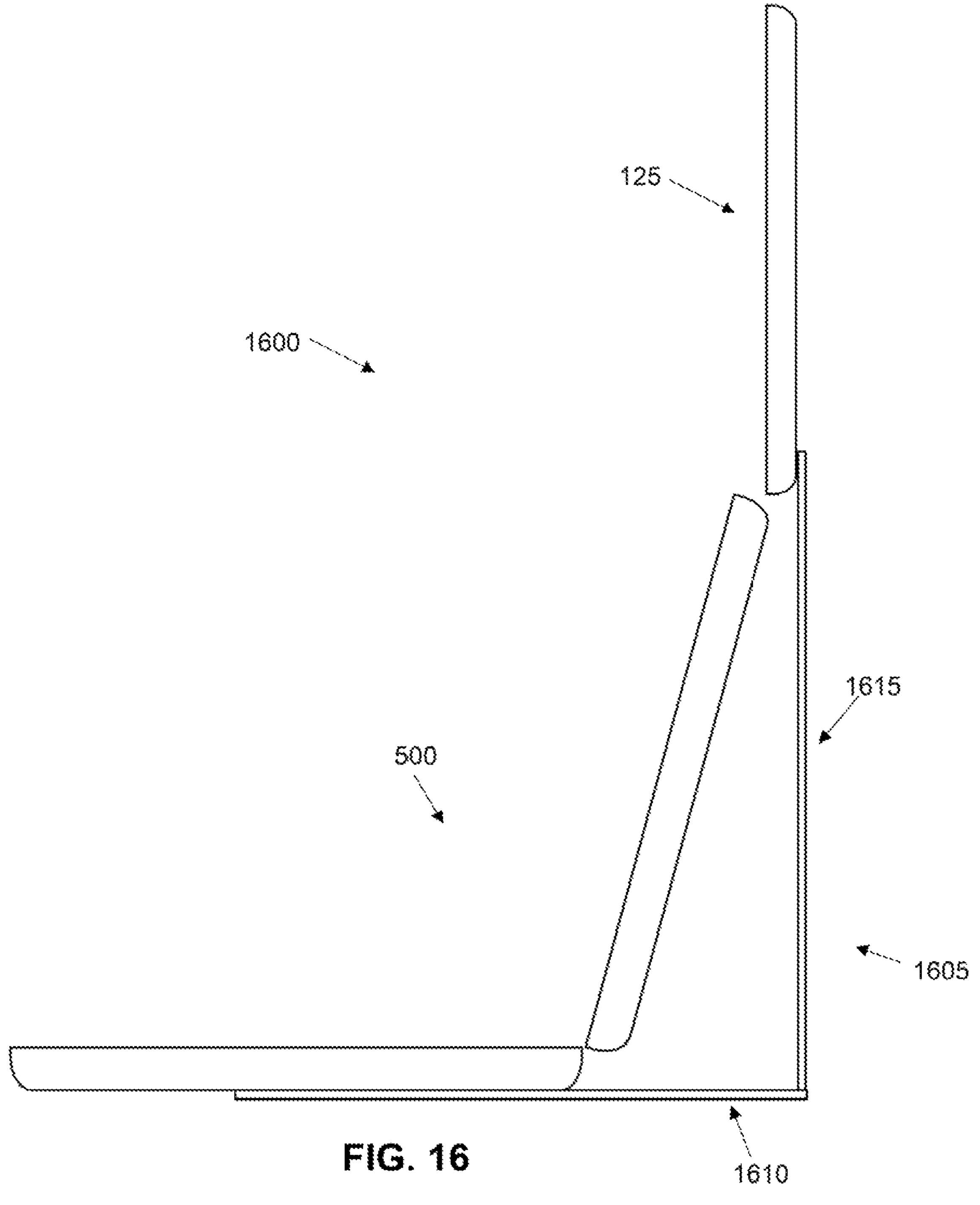
FIG. 16 illustrates a laptop display system used with the laptop of FIG. 5, according to an embodiment of the present invention.

FIG. 16 illustrates a laptop display system 1600 used with the laptop 500, according to an embodiment of the present invention.

The laptop display system 1600 comprises a stand 1605 comprising a base member 1610, from which an upwardly extending support member 1615 extends. An auxiliary display 125 is supported by the support member 1615.

In contrast to the system 100, the auxiliary display 125 is supported by the stand 1605 immediately above and behind the display of the laptop 500, rather than by the laptop itself. Such configuration is beneficial in that the display of the laptop 500 is able to move independently of the auxiliary display 125, and the weight of the auxiliary display 125 does not need to be supported by the laptop 500.

Preferably, the base member 1615 is releasably engageable with a base of the laptop 500, or a case thereon. As such, the weight of the laptop 500 is used to provide stability to the stand 1605 and the auxiliary display 125, while allowing the stand 1605 to be lightweight.

The auxiliary display 125 is illustrated being attached to a front side of the upwardly extending support member 1615, however a variety of alternative configurations may be used. As an illustrative example, the auxiliary display 125 may be attached to a rear of the upwardly extending support member 1615, or even extend upwardly from a top of the upwardly extending support member 1615.

Similarly, the auxiliary display 125 may be attached to the support member 1615 in a variety of manners. As an illustrative example, the auxiliary display 125 may be slidably attached to the support member 1615, such that the auxiliary display 125 may slide up and down relative to the support member 1615. Alternatively, the auxiliary display 125 may be hingedly attached to the support member 1615, e.g. such that the support member folds 1615 over the display 125 to protect the display 125. Alternatively again, the auxiliary display 125 may be releasably coupled to an upper portion of the support member 1615, e.g. using a retainer and or ledges.

The base member 1610 and the support member 1615 may also be attached in a variety of ways. As an illustrative example, the base member 1610 and the support member 1615 may be hingedly attached, such that they may fold together for compact storage. Similarly, the base member 1610 and the support member 1615 may be releasably coupled to each other to form the stand 1605.

The base member 1610 and the support member 1815 may be stored with the laptop 500, the auxiliary display 125, or separately. In one embodiment, the base member 1610 and the support member 1615 may function to provide a storage case for the auxiliary display 125 when not used. In another embodiment, the base member 1610 and/or the support member 1615 may be stored in a case of the laptop 500 or a case of the auxiliary display 125.

The base member 1610 and the support member 1615 need not extend across an entire width of the laptop 500. Instead, the base member 1610 and the support member 1615 may each include a pair of arms at each side of the laptop. Alternatively, cut-outs may be provided in the stand 1605 to reduce weight and material.

In alternative embodiments, at least part of the stand may be integral with a case or housing of the laptop. As such, the stand may not only support the auxiliary display, but also support the display of the laptop in a fixed arrangement.

Figure 17:
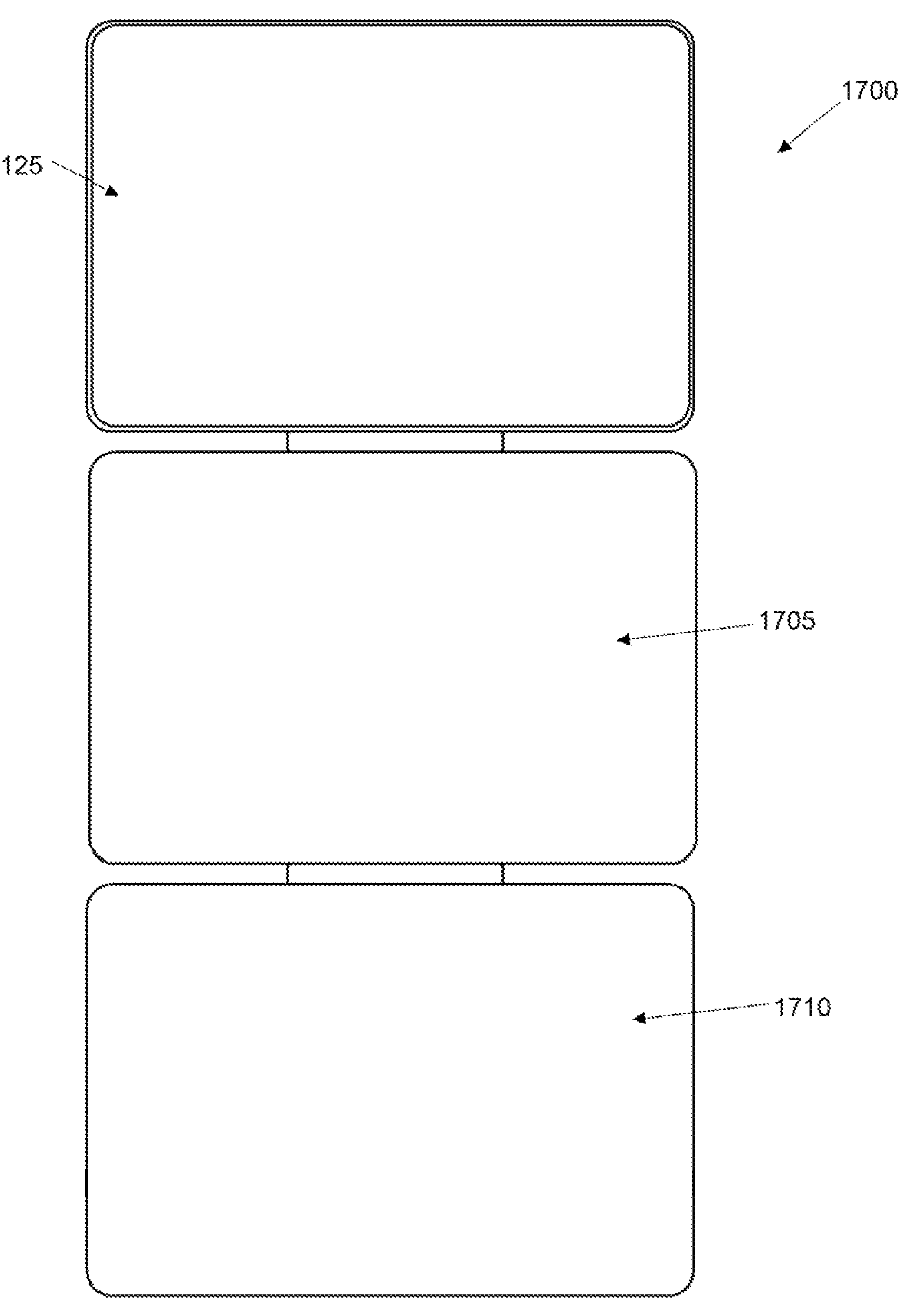
FIG. 17 illustrates a laptop display system used with the laptop of FIG. 5, according to an embodiment of the present invention.

FIG. 17 illustrates a laptop display system 1700, for use with a laptop, according to an embodiment of the present invention.

The laptop display system includes the auxiliary display 125, which may comprise a tablet computer that is operable together or independently of the laptop.

First and second panel members 1705, 1710 are coupled to the auxiliary display 125, e.g. by a housing of or coupled to the auxiliary display 125, or by a panel magnetically coupled to the auxiliary display 125. The first and second panel members 1705 and 1710 are of about the same size as the auxiliary display 125, and are configured to protect the front and rear of the auxiliary display 125 respectively. In particular, the first panel member 1705 folds up over the front of the auxiliary display 125, and the second panel member 1710 folds back down over a rear of the auxiliary display 125.

The first and second panel members 1705, 1710 may include magnets to retain the panel members 1705, 1710 in a closed configuration around the auxiliary display 125.

The first and second panel members 1705, 1710 are also lockable relative to each other. In particular, the first and second panel members 1705, 1710 are lockable at an angle of 90 degrees relative to each other (or thereabouts). Similarly, the first panel 1705 and the display 125 are lockable relative to each other at an angle of about 180 degrees, i.e. such that the auxiliary display 125 sits directly above the first panel member 1705.

Such configuration enables the auxiliary display to be supported above a work surface, and used much like the system 1600. In particular, the second panel member 1710 functions like the base member 1610, and the first panel member like the support member 1615, wherein the laptop supports the second panel member 1710.

The second panel member 1710 may include a retainer (e.g. a magnet or clip) to allow the second panel to engage with the base of the laptop, to prevent the laptop display system from sliding out from under the laptop and toppling. The retainer may engage with the base of the laptop directly, or through a case coupled to the base of the laptop.

Figure 18:
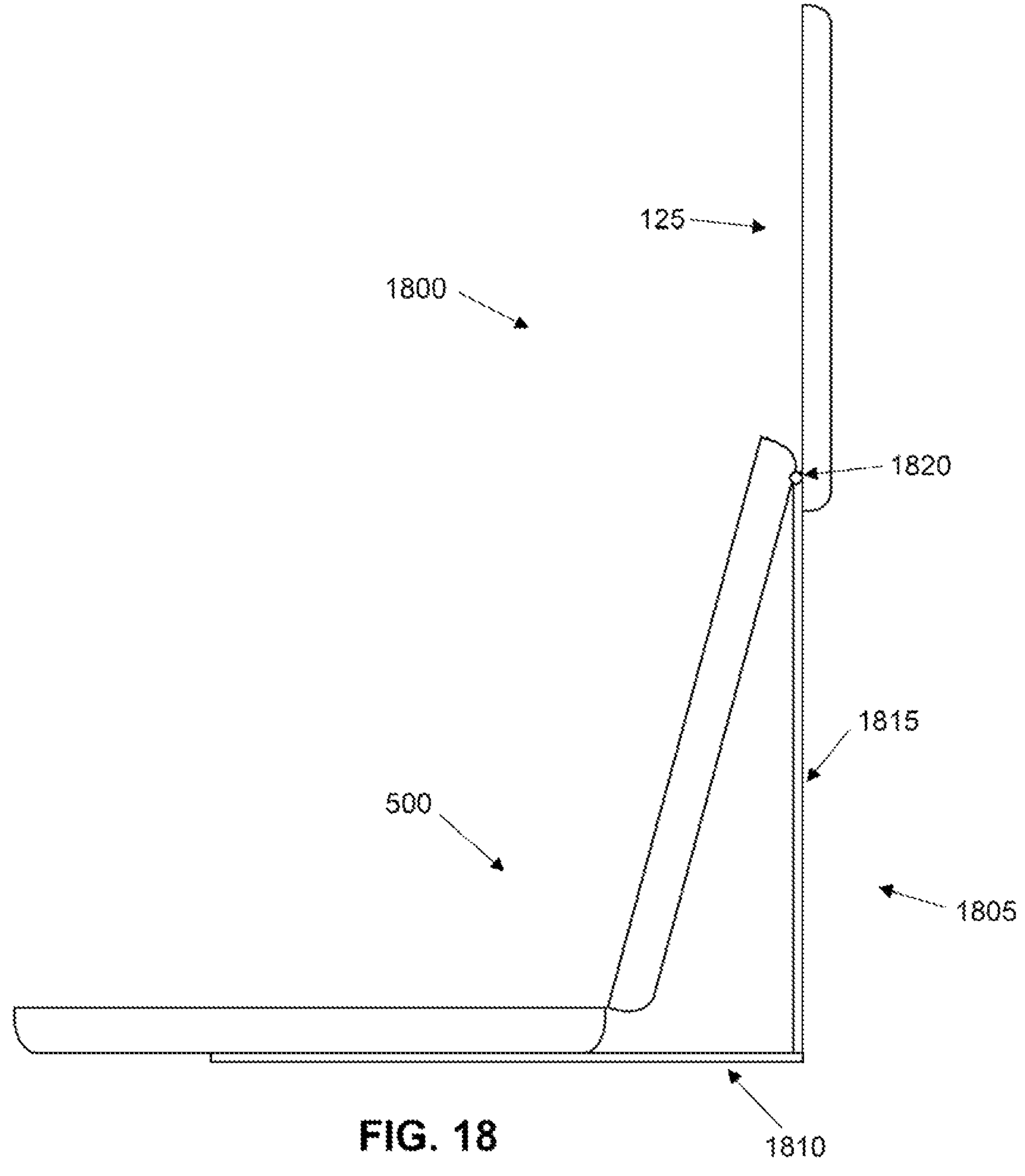
FIG. 18 illustrates a laptop display system used with the laptop of FIG. 5, according to an embodiment of the present invention.

FIG. 18 illustrates a laptop display system 1800 used with the laptop 500, according to an embodiment of the present invention.

The laptop display system 1800 is similar to the laptop display system 1600, but wherein the support member 1815 is hingedly attached to an upper end portion of the display of the laptop. Such configuration enables the stand 1805 to support the display of the laptop also, and create a link between the stand 1805 and the laptop 500.

The stand 1805 includes a base member 1810, from which the upwardly extending support member 1815 extends, when in use. The support member 1815 attaches to a rear of the display of the laptop (or a case thereof), and sits flush with the laptop display when not used. When needed, the support member 1815 is folded outwardly around an upper pivot joint 1820, and therefore functions to support the display of the laptop 500, much like a kickstand.

Furthermore, the base member 1810 may engage with a case of the laptop under a keyboard portion and extend outwardly therefrom to engage with the upwardly extending support member 1815. In such case, an external case of the laptop may include a channel for receiving the base member 1810, from which the base member 1810 may slide in and out of.

Similarly, the base and support members described above may engage with, and be stored within, the case of the laptop. As an illustrative example, the base and support members may fold into (or otherwise engage to create) a single substantially planar portion.

In a similar embodiment to that described in FIG. 18, the auxiliary display may fold outwardly from behind the laptop display around the upper pivot joint 1820 (which may comprise a hinge) approximately 270 degrees such that the auxiliary display is above the laptop display. The support member 1815 may then extend outwardly therefrom.

The base members and support members outlined above may engage with each other directly, or using one or more fasteners or fastening members (not shown). In such case, they may lock together at a particular angle (e.g. right angles), or at one of a plurality of angles. In case a plurality of angles are possible, such configuration enables the auxiliary display to be positioned at a certain angle, as desired by the user.

In some embodiments, instead of a kickstand-like arrangement, a locking mechanism may lock the display portion of the laptop relative to its base, to prevent the weight of the auxiliary display from putting pressure on the hinge of the laptop. In such case, a stabiliser may extend from a base of the laptop to prevent the laptop from toppling backwards, by increasing the footprint of the laptop.

Figure 19:
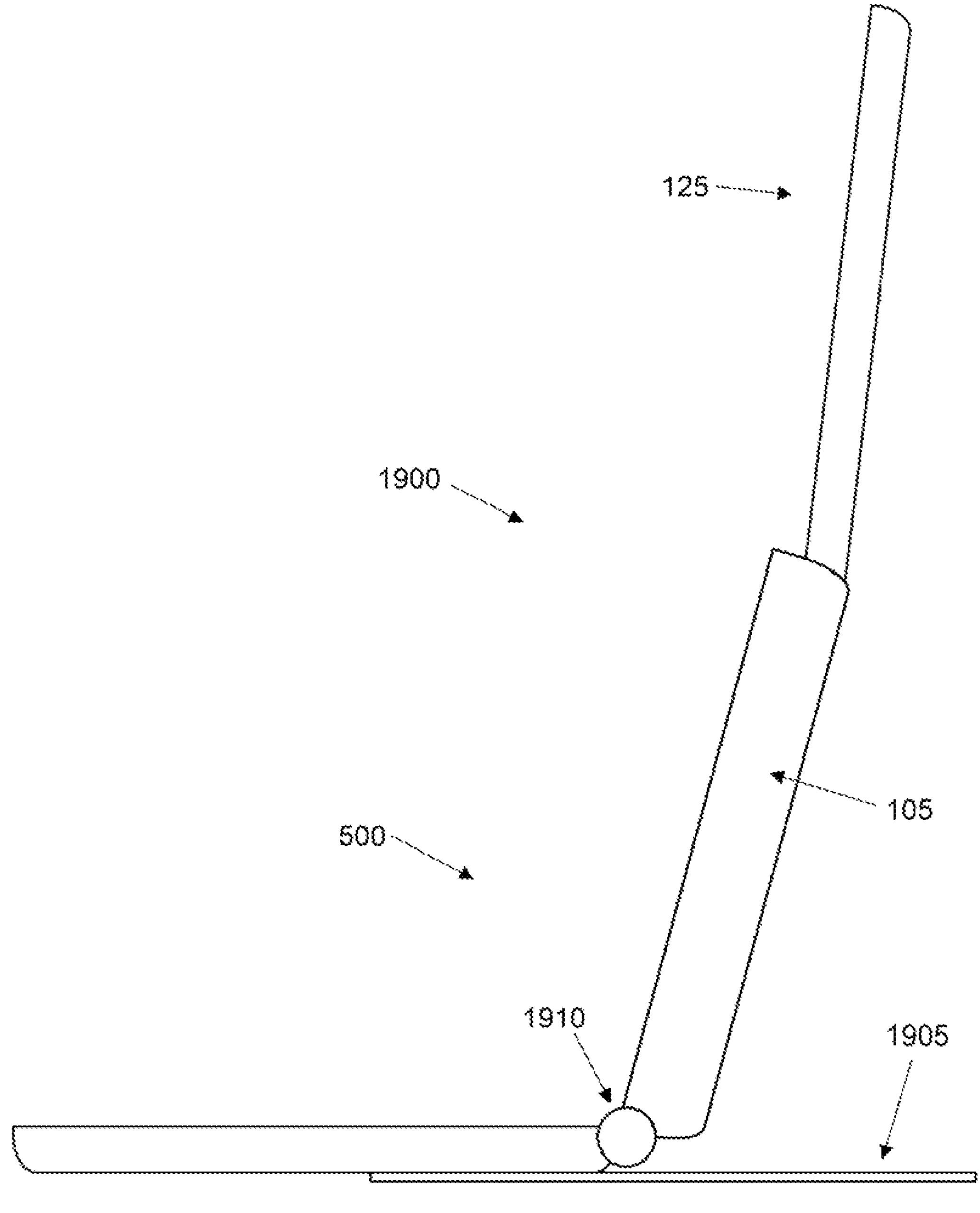
FIG. 19 illustrates a laptop display system used with the laptop of FIG. 5, according to an embodiment of the present invention.

FIG. 19 illustrates a laptop display system 1900 used with the laptop 500, according to an embodiment of the present invention. The display system 1900 is similar to the system 1500.

The display system includes a base member 1905, which extends outwardly from the base of the laptop, to stabilise the laptop by increasing the size of its base of support (footprint). The base member 1905 is substantially planar, but in other forms may include cut-outs or the like.

A hinge of the laptop 500 may not be able to support the weight of the auxiliary display 125, and therefore may tilt backwards due to the weight, or otherwise be prone to increased wear from the additional weight.

A locking mechanism 1910 is therefore provided at the hinge of the laptop, to lock the base and display portions relative to each other, thereby taking weight from the hinge. The locking member 1910 may take any suitable form, and in one embodiment includes a locking member that prevents the display portion from moving relative to the base portion.

In case the hinge of the laptop 500 is sufficiently strong, the base member 1905 may be used without a locking mechanism.

Figures 20, 21, 22, 23:
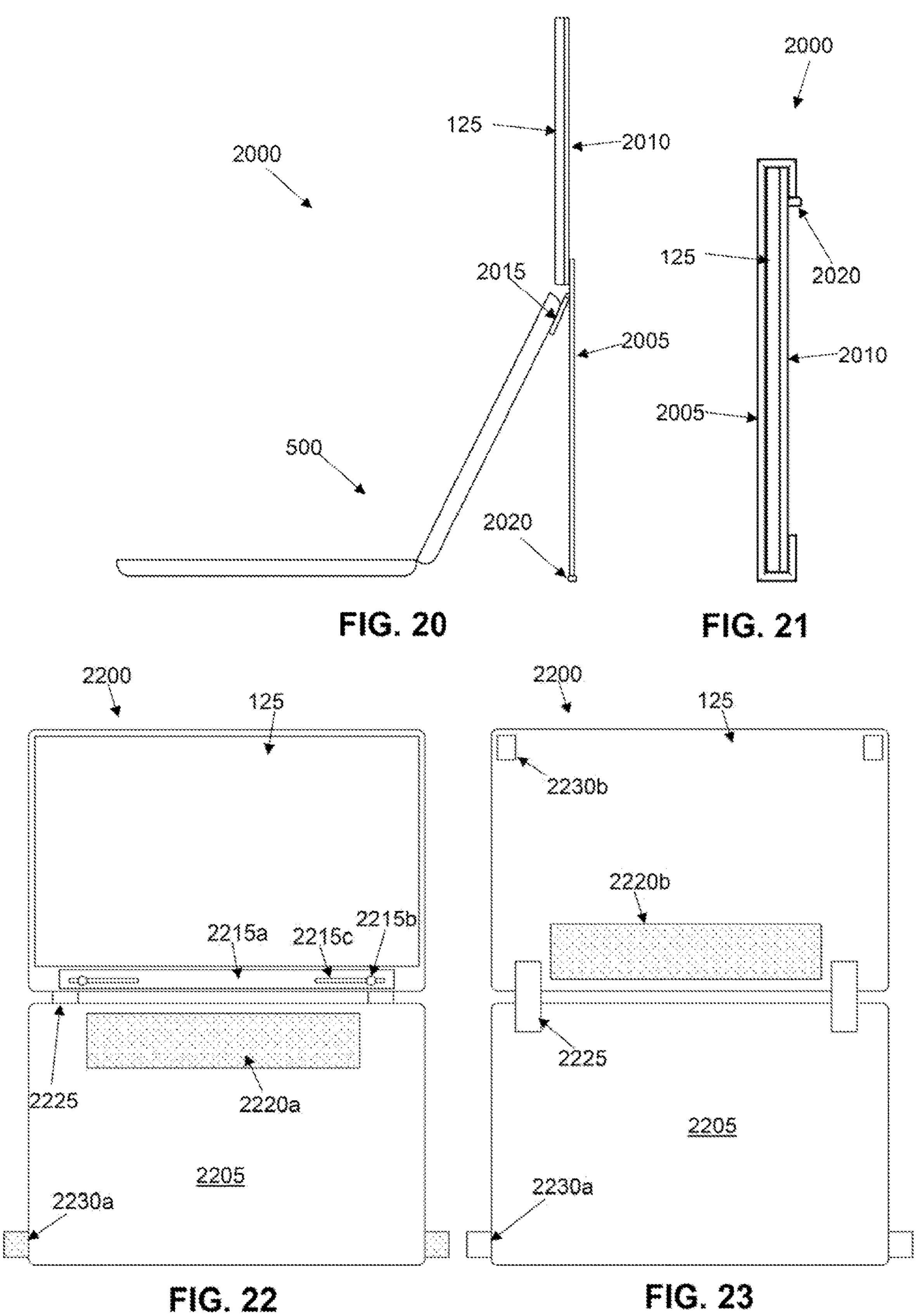
FIG. 20 illustrates a side view of a laptop display system used with the laptop of FIG. 5, according to an embodiment of the present invention.
FIG. 21 illustrates a side view of the system of FIG. 20 in a storage/transport configuration.
FIG. 22 illustrates a front view of a laptop display system, in an open configuration, according to an embodiment of the present invention.
FIG. 23 illustrates a rear view of the system of FIG. 22, in an open configuration, according to an embodiment of the present invention.

FIG. 20 illustrates a side view of a laptop display system 2000 used with the laptop 500, according to an embodiment of the present invention. FIG. 21 illustrates a side view of the system 2000 in a storage/transport configuration.

The laptop display system 2000 comprises an auxiliary display 125, which in use is supported by a stand portion comprising first and second panel members 2005, 2010. The first panel member 2005 extends downwardly from the second panel member 2010, which is coupled to a rear of the auxiliary display 125, to thereby support the auxiliary display 125 in an elevated position.

The first panel member 2005 includes a magnetic coupling 2015, configured to couple an upper portion of the first panel member 2005 to an upper portion of a rear of the laptop 500 (i.e. behind the screen of the laptop 500), to provide stability to the stand portion (and prevent the stand portion from toppling).

The magnetic coupling 2015 is hingedly attached to the first panel member 2005, to enable the coupling 2015 to connect to laptops 500 opened at different angles.

The first panel member 2005 further includes a gripping member 2020 in the form of a rubber base. The gripping member 2020 prevents the first panel member from sliding on a smooth surface (such as a table), and provides comfort to a user, should the first panel member be supported directly on the user's legs.

The gripping member 2020 is illustrated at an end of the first panel member 2005. However, in other embodiments, the gripping member 2020 is provided at a join/hinge of the first panel member 2020, such that the first panel member 2005 may be folded such that the join/hinge, and thus the gripping member 1820, abuts the support surface.

The first panel member 2005 functions as a stand for the auxiliary display 125 when used with the laptop 500, as illustrated in FIG. 20, and as a protective cover for the auxiliary display 125 when in the storage/transport configuration, as illustrated in FIG. 21. In particular, the first panel member 2005 folds around to cover a front of the auxiliary display 125, and back around to a rear, where it couples (e.g. magnetically, using a hook and loop fastener, or the like) to the second panel member 2010.

The first and second panel members 2005, 2010 may automatically become rigid and lock together in a fixed arrangement when opened to 180 degree (i.e. straight). This may be achieved using magnets and a slotting arrangement.

The first panel member 2005 may be adjustable in height, e.g. by folding, or by a sliding arrangement. This enables the system to be adjusted to various height screens and screen angles.

Such configuration is particularly convenient, as it enables the auxiliary display 125, which may comprise a tablet computer, to be transported and used independently of the laptop 500, and easily converted into a stand for use together with the laptop 500. As such, no external stands need be carried or used.

In contrast to several of the systems outlined above, the laptop 500 does not bear the weight of the auxiliary display 125 in the system 1800, but instead simply provides balance to the assembly that supports the auxiliary display 125. As such, the system 1800 is less likely to wear or otherwise adversely affect hinges or other components of the laptop 500.

The auxiliary display 125 may be attached to the second panel member 2010 in a variety of manners. As an illustrative example, the auxiliary display 125 may fit in a housing (shell) defined by the second panel member 2010, in a press-fit arrangement. Alternatively, the auxiliary display 125 may be built into the second panel member 2010, or permanently (or semi-permanently) attached thereto.

The auxiliary display 125 may be larger or smaller than the laptop 500. In contrast to many other systems, a larger auxiliary display 125 (e.g. 15" or 17") may be coupled to a smaller laptop (e.g. 13") without difficulty. In such case, the auxiliary display 125 (and associated panel members) will simply extend beyond the edges of the laptop 500.

The magnetic coupling 2015 may engage with corresponding magnets of the laptop 500. Alternatively, the magnetic coupling 2015 may comprise ferrous metal portions, configured to magnetically couple to the magnets of the laptop.

While some laptops include magnets along their upper screen portions, in some embodiments, magnets and/or ferrous metal strips are attached to the back of the laptop via adhesive.

The magnets may be spaced along a width of the laptop and/or retainer, wherein detachment of the magnetic retainer may be performed by sliding the retainer, or part of the retainer, relative to the laptop. Such configuration may be less likely to cause damage to the laptop when removing the system 2000.

In some embodiments, the magnets/ferrous metal strips have interlocking patterns, such as zig-zags, diamonds, squares, etc., to provide slip protection in several directions when attached. The interlocking patterns prevent slipping (laterally) of the magnets relative to each other, requiring the magnets to be separated in a direction opposite to the force from the magnets.

In some embodiments, the magnets in the magnetic coupling 2015 may be adjustable by the user to align with the magnets of a particular laptop. Similarly, the magnetic coupling may be curved to suit a particular shape of a laptop, and/or have hooks that are configured to extend over the top of the laptop to provide protection from it slipping down.

Figure 24:
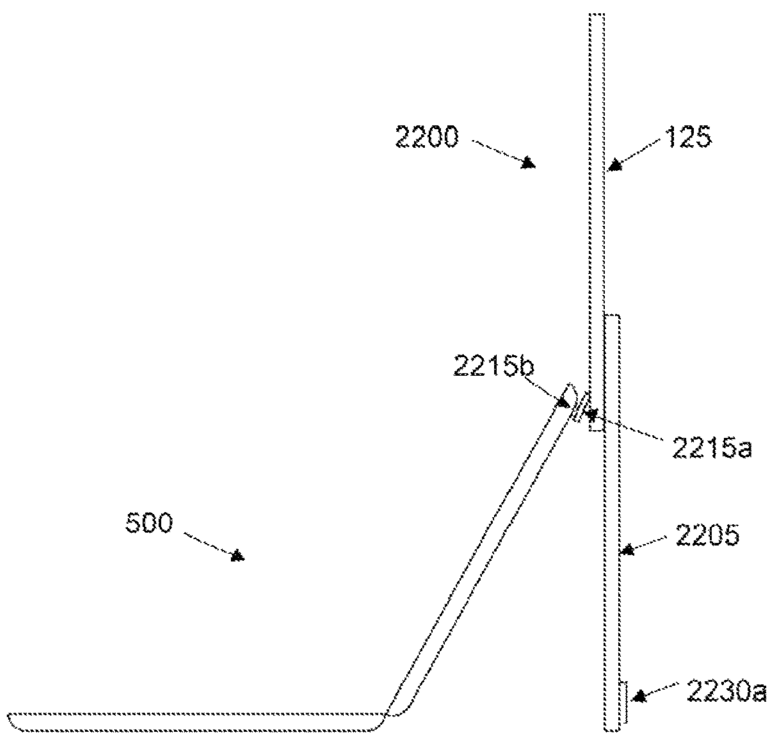
FIG. 24 illustrates a side view of the system of FIG. 22 used with the laptop of FIG. 5, according to an embodiment of the present invention.

FIG. 22 illustrates a front view of a laptop display system 2200, in an open configuration, according to an embodiment of the present invention. FIG. 23 illustrates a rear view of the system 2200, in an open configuration, according to an embodiment of the present invention. FIG. 24 illustrates a side view of the system 2200 used with the laptop 500, according to an embodiment of the present invention.

The laptop display system 2200 comprises an auxiliary display 125, which in use with the laptop 500 is supported by a stand comprising a panel members 2205. The panel member 2205 extends downwardly from the auxiliary display 125, to thereby support the auxiliary display 125 in an elevated position.

The display 125 includes a magnetic coupling in the form of a hinged member 2215*a* and magnets 2215*b*, configured to couple a lower portion of the display 125 to an upper portion of a rear of the laptop 500 (i.e. behind the screen of the laptop 500), to provide stability to the stand (and prevent the stand from toppling).

The hinged member 2215*a* is hingedly attached to the display 125, to enable the magnets 2215*b* to connect to laptops 500 opened at different angles. The magnets 2215*b* are further slidable along a rail 2215*c*, to enable the magnets 2215*b* to be positioned at various locations along a width of the rail 2215*c*.

The panel member 2205 includes a hook and loop fastening member 2220*a*, and the display 125 includes a corresponding hook and loop fastening member 2220*b*. The hook and loop fastening members 2220*a*, 2220*b* enable the display 125 and panel member 2205 to be releasably coupled such that the panel member 2205 supports the display 125 vertically.

The hook and loop fastening members 2220*a*. 2220*b* are relatively wide, enabling them to engage with each other at various positions (i.e. with only part of the hook and loop fastening members 2220*a*, 2220*b* engaging with each other), to thereby enable the display 125 to be supported at various heights. In alternative embodiments, not illustrated, the user is able to pre-set the desired height of the auxiliary display for future use, e.g. by adjusting the position or length of the straps 2225 and/or adjusting the position of a ledge which is on or near the hook and loop fastening member 2220*b*. Adjusting the position of this ledge helps the user guide or restrict the position of the hook and loop fastening members 2220*a*, 2220*b* relative to each other, thereby allowing the height to be pre-set by the user for future use.

Flexible straps 2225 couple the display 125 and the panel member 2205. The straps enable the panel member 2205 to fold over a front of the display 125, and function as a protective cover for the auxiliary display 125. Closure members 2230*a*, 2230*b* retain the system in a storage/transport configuration, and may comprise hook and loop fasteners, magnets or the like.

While the system 2200 is illustrated with two straps 2225, the skilled addressee will readily appreciate that any suitable number of straps may be used, including a single strap extending across a width of the panel member 2205.

Much like the system 2000, the system 2200 is particularly convenient, as it enables the auxiliary display 125, which may comprise a tablet computer, to be transported and used independently of the laptop 500, and easily converted into a stand for use together with the laptop 500. As such, no external stands need be carried or used.

The display 125 is coupled directly to the panel member 2205 by the straps 2225. In the case of the display 125 being a tablet or stand-alone display including its own protective housing, one end of the straps 2225 may be directly coupled to a rear of the tablet or protective housing, e.g. using adhesive. In such case, the straps 2225 and the hook and loop fastening member 2220*b* may be joined to simplify installation. In other embodiments, a display retainer, to which the hook and loop fastening member 2220*b* and straps 2225 are attached, may be used to retain the tablet or display screen.

While not illustrated, the panel member 2205 may include a gripping member, similar to that described above, to prevent the panel member 2205 from sliding on a smooth surface.

While the system 2200 utilises magnets to retain the system 2200 to the laptop, the skilled addressee will readily appreciate that other mechanisms may be used, including complementary hook and loop fasteners, which one part is attached to the laptop using adhesive, or even a small lip or ledge that engages with an upper edge of the laptop display, to prevent the system from toppling. In fact, in some embodiments, different retaining mechanisms may be used, including a combination of a magnet and a lip, where the magnet holds the lip in place, thereby providing a more stable system in case of bumps. In other embodiments, not illustrated, the bottom of the auxiliary display may act as a lip or ledge, touching the top of the laptop display to help stop the system from toppling.

Similarly, while hook and loop fasteners are used to couple the display 125 to the panel member 2205, the skilled addressee will readily appreciate that other mechanisms may be used, including magnets.

Advantageously, the system 2200 is simple and cost effective to manufacture, and does not require bulky parts, like stands which need to provide balance. Additionally, as the system 2200 supports its own weight, it is not putting pressure on a hinge of the laptop.

While the system 2200 is shown connecting to the rear of the laptop 500, in other embodiments the panel member 2205 may instead function as a freestanding support.

Figure 25:
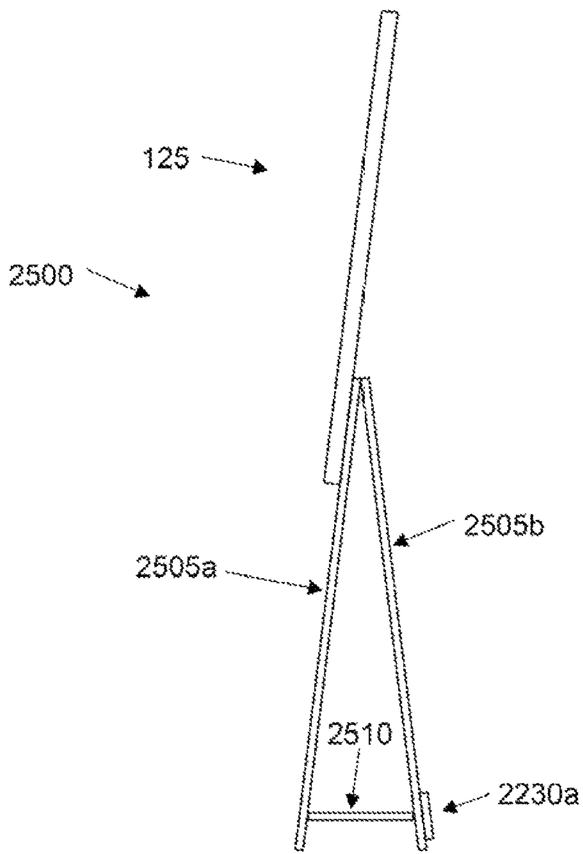
FIG. 25 illustrates a side view of a laptop display system, in an open configuration, according to an embodiment of the present invention.
Figure 26:
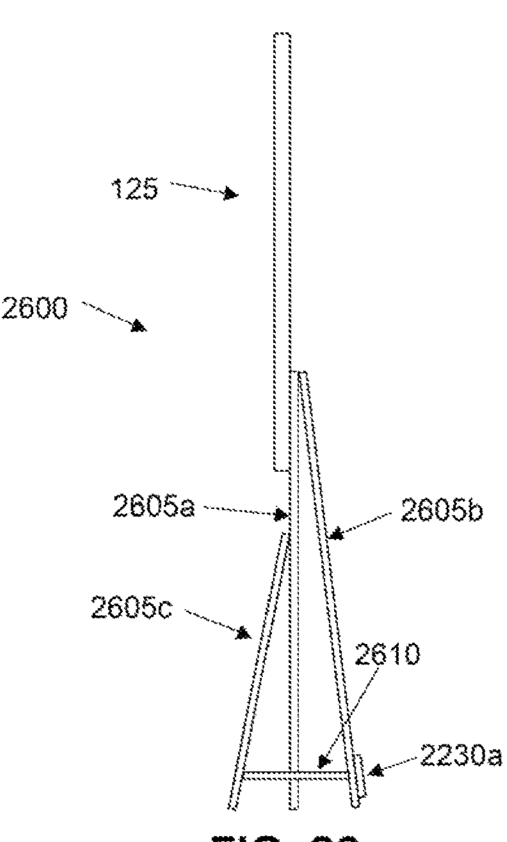
FIG. 26 illustrates a side view of a laptop display system, in an open configuration, according to an embodiment of the present invention.

FIG. 25 illustrates a side view of a laptop display system 2500, in an open configuration, according to an embodiment of the present invention. The laptop display system 2500 is similar to the system 2200, but is self-standing.

In particular, the laptop display system 2500 comprises an auxiliary display 125, configured to be used with a laptop (not illustrated), and is supported by a stand comprising panel members 2505*a*, 2505*b*. The first panel member 2505*a* extends downwardly from the auxiliary display 125, and the second panel member 2505*b* opens around an upper edge of the first panel member 2505*a* to form an A-frame shape. A brace 2510 extends between lower ends of the first and second panel members 2505*a*, 2505*b*, to support the first and second panel members 2505*a*. 2505*b* in an open configuration.

Rather than being attached to a laptop, however, the display 125 is configured to stand freely behind the laptop, much like the configuration illustrated in FIG. 24, but without the magnetic coupling.

While not illustrated, the system 2500 includes flexible straps, similar to the system 2200. This enables the first and second panel members 2505*a*, 2505*b* to function as a cover to the display. In such case, the first and second panel members 2505*a*, 2505*b* are folded together to function as a single panel member that folds over a front of the display 125, and to function as a protective cover for the auxiliary display 125.

Similarly, and while also not illustrated, the system 2500 includes hook and loop (or similar) fastening members, similar to that of the system 2200. This enables the display 125 and the first panel member 2505*a* to be releasably coupled such that the first and second panel members 25058, 2505*b* supports the display 125 vertically, including at various heights.

As the display 125 is coupled to the first panel member 2505*a*, which is angled, the display 125 is similarly angled. By adjusting the brace 2510, an angle and height of the display 125 can be adjusted. For example, by enlarging the brace 2510, the first and second panel members 2505*a*, 2505*b* open at a larger angle. This enables the user to get a comfortable viewing angle, and to minimise glare. By spacing the first and second panel members 2505*a*, 2505*b*, stability of the stand may also be increased.

In other embodiments, as an alternative to the brace 2510, another locking mechanism may be used to set a desired angle between panel members 2505*a* and 2505*b*, such as a locking hinge or torque hinge.

While not illustrated, the first and second panel members 2505*a* may be telescopic, or otherwise able to change in length, to enable the height of the display 125 to be adjusted. This could be achieved in a variety of ways, including by having extensions that fold down from the panel members, slide down from the panel members, or through any other means. This enables the display to be better aligned with a comfortable viewing height, avoiding the need to look down, for example.

In some embodiments, an additional panel member may be provided to further add stability to the display 125, particularly if the display 125 is to be used in a near vertical configuration.

Figures 28, 29:
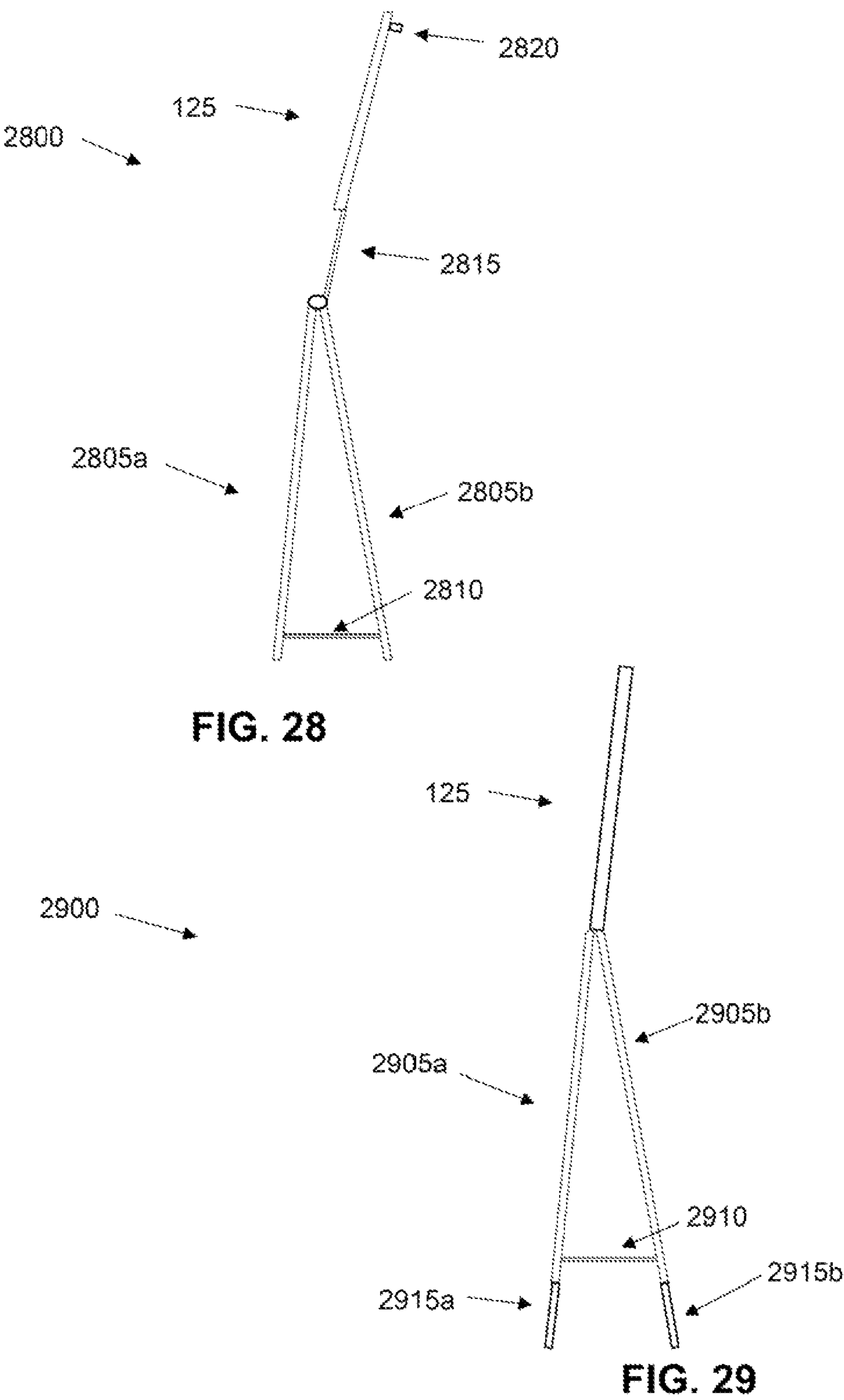
FIG. 28 illustrates a side view of a laptop display system, in an open configuration, according to an embodiment of the present invention.
FIG. 29 illustrates a side view of a laptop display system, in an open configuration, according to an embodiment of the present invention.

FIG. 28 illustrates a side view of a laptop display system 2000, in an open configuration, according to an embodiment of the present invention. The laptop display system 2600 is similar to the system 2500, but includes an additional panel member for support.

In particular, the laptop display system 2600 comprises an auxiliary display 125, configured to be used with a laptop (not illustrated), and is supported by a stand comprising panel members 2605*a*, 2605*b*, 2605*c*. The first panel member 2605*a* extends downwardly from the auxiliary display 125, and the second and third panel members 2605*b*, 2605*c* open around the first panel member 2605*a* to form an A-frame shape centred around the first panel member 2605*a*. A brace 2610 extends between lower ends of the second and third panel members 2605*b*, 2605*c*, to support the second and third panel members 2605*b*, 2605*c* in an open configuration.

Such configuration enables the display 125 to be provided in a near vertical configuration, while providing stability through the second and third panel members 2605*b*, 2605*c*.

The systems 2500 and 2600 may be similar or identical. As an illustrative example, the third panel member 2605*c* may be selectively folded outwardly when additional support is needed, but otherwise be folded against the first panel member 2605*a*, thereby functioning as a single panel member with the first panel member 2605*a*. In such configuration, i.e. when the third panel member 2605*c* is not used, the system 2600 may function in a near identical manner to the system 2500. The panel members 2605*a*, 2605*b*, 2605*c* may be telescopic, or otherwise able to change in length, as described briefly above, to enable all three panel members 2605*a*, 2605*b*, 2605*c* to provide support on a planar surface.

While the above examples illustrate and describe the use of straps to join the display and panel members comprising the stand/cover, in other embodiments different mechanisms to join the display and panels may be provided including hinges.

Figure 27:
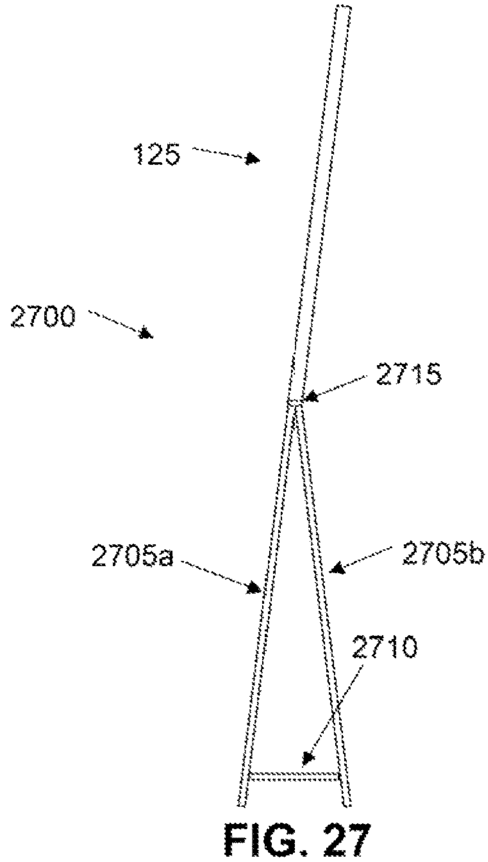
FIG. 27 illustrates a side view of a laptop display system, in an open configuration, according to an embodiment of the present invention.

FIG. 27 illustrates a side view of a laptop display system 2700, in an open configuration, according to an embodiment of the present invention. The laptop display system 2700 is similar to the system 2500, but includes a hinge coupling the display 125 to the stand.

In particular, the laptop display system 2700 comprises an auxiliary display 125, configured to be used with a laptop (not illustrated), and is supported by a stand comprising panel members 2705*a*, 2705*b*. The first and second panel members 2705*a*. 2705*b* extend downwardly from the auxiliary display 125 through a hinge 2715, and may be opened around the hinge 2715 such that the first and second panel member 2705*a*, 2705*b* form an A-frame shape under the display 125. A brace 2710 extends between lower ends of the first and second panel members 2705*a*, 2705*b*, to support the first and second panel members 2705*a*, 2705*b* in an open configuration.

The hinge 2715 may be configured to lock at one or more pre-defined positions, e.g. using magnets. Such configuration may be particularly useful in assisting the user in configuring the system 2700, as when unfolding the panel members from the display 126, the panel members may 'snap' into predefined positions.

Alternatively, the hinge 2715 may comprise a torque hinge, or other suitable mechanism, that is configured to enable the panels 2705*a*, 2705*b* and/or auxiliary display 125 to fold into a wide range of positions.

Alternatively, again, the hinge 2715 may simply enable the panels to fold relative to the display 125, and the display may be supported in position using a separate mechanism.

The first panel member 2705*a* is connected to the second panel member 2705*b* at the hinge 2715. In alternative embodiments, however, the panel members 2705*a*, 2705*b* may be coupled below the hinge 2715, using another hinge member, such that the panel member 2705*b* Is shorter in height than the panel member 2705*a*. In such case, the first panel member 2705*a* may lean against, and be supported by, the second panel member 2705*b*.

It will be understood that in some embodiments, the system 2700 may be adapted to releasably couple to the back of the laptop 500 in a similar fashion to system 2000 to improve stability of the system 2700.

FIG. 28 illustrates a side view of a laptop display system 2800, in an open configuration, according to an embodiment of the present invention. The laptop display system 2800 is similar to the system 2700, but includes a telescoping portion 2815 enabling the height of the display 125 to be adjusted.

The laptop display system 2800 is supported by first and second panel members 2805*a*, 2805*b*, with a brace 2810 extending between the lower ends of the first and second panel members 2805*a*. 2805*b*.

The telescoping portion 2815 is coupled to the first and second panel members 2805*a*, 2805*b* by a hinge (which also couples the first and second panel members 2805*a*. 2805*b* to each other) enabling the telescoping portion 2815 to extend at an angle greater or less than 180 degrees relative to the first and second panel members 2805*a*, 2805*b*. The hinge and therefore the angle of extension may be adjustable by a user.

In alternative embodiments, the telescoping portion may be at least partly received in and extend upwardly from one of the first or second panel members 2805*a*, 2805*b*. Alternatively, the telescoping portion 2815 may slide or extend along an outside length of one of the first or second panel members 2805*a*, 2805*b*. Alternatively again, the telescoping portion 2815 may comprise a panel member, coupled, e.g. hingedly, to one of the first and second panel members 2805*a*, 2805*b* such that the display 125 and panel member operate in a telescoping arrangement.

The telescoping portion 2815 may be locked in an extended or retracted configuration by a button 2820. The skilled addressee will appreciate that the telescoping portion 2815 may, however, be alternatively locked and unlocked via a number of alternative mechanisms without deviating from the scope of the disclosure.

The telescoping portion 2815 may have a spaced intervals to enable the display 125 to be adjusted and locked in defined positions. The telescoping portion 2815 may be lockable in any position along its length.

The skilled addressee will readily appreciate that any suitable mechanism such a key, spring button, or twist lock, may be used to lock the telescoping portion 2815 into an extended or retracted configuration.

FIG. 29 illustrates a side view of a laptop display system 2900, in an open configuration, according to an embodiment of the present invention, The laptop display system 2900 is similar to the system 2700, but includes telescoping leg portions 2915*a*. 2915*b*.

The telescoping leg portions 2915*a*, 2915*b* are received in and extend outwardly and downwardly from ends of the first and second panel members 2905*a*, 2905*b*. In alternative embodiments, however, the leg portions 2915*a*, 2915*b* extend downwardly from the first and second panel members 2905*a*, 2905*b* in another way.

The laptop display system 2900 includes a brace 2910 configured to brace the legs 2905*a*, 2905*b*.

The skilled addressee will appreciate that the features of the laptop display system 2800 may be combined with the laptop display system 2900, e.g. telescoping display and telescoping legs.

Figure 30:
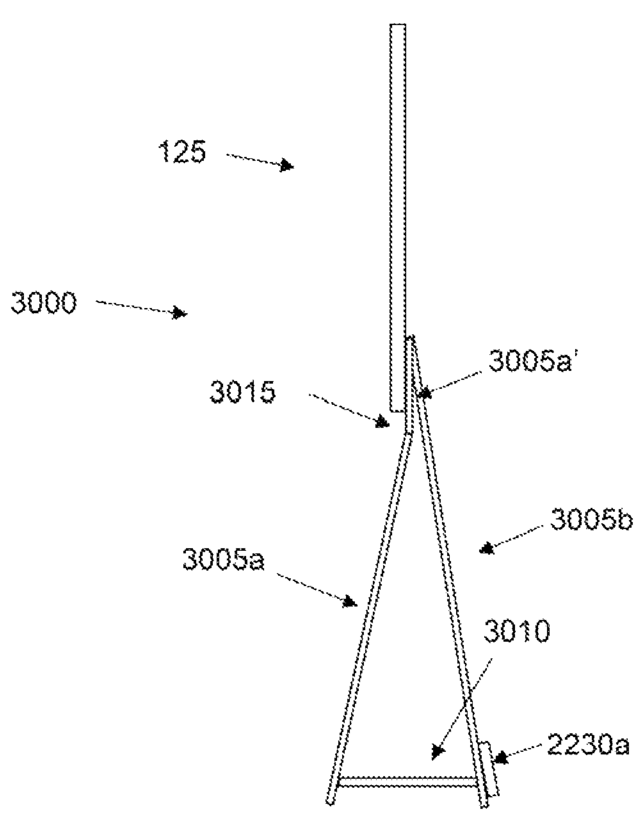
FIG. 30 illustrates a side view of a laptop display system, in an open configuration, according to an embodiment of the present invention.

FIG. 30 illustrates a side view of a laptop display system 3000, in an open configuration, according to an embodiment of the present invention. The laptop display system 3000 is similar to the system 2500, but includes a torque hinge 3015 allowing angle adjustment of the display 125.

The skilled addressee will readily appreciate that any suitable mechanism may be employed to enable angular adjustment of the display 125.

In particular, the laptop display system includes panel members 3005*a*, 3005*a*', 3005*b*. The panel members 3005*a*, 3005*a*' are similar to the first panel member of the system 2500, but include the torque hinge 3015, to enable an upper portion thereof, which is coupled to the display screen 125, to be angled. As a result, the display 125 may be pivoted, which may improve visibility of the display 125 and/or reduce glare.

The laptop display system 3000 also includes a brace 3010.

The laptop display system 3000 may be combined with the telescoping features of the laptop display systems 2800 and 2900. In particular, the telescoping feature described in 2800 may extend from the panel member 3005*a*'. The telescoping features of the system 2900 may extend from the lower portions of panel members 3005*a* and 3005*b*.

Figure 31:
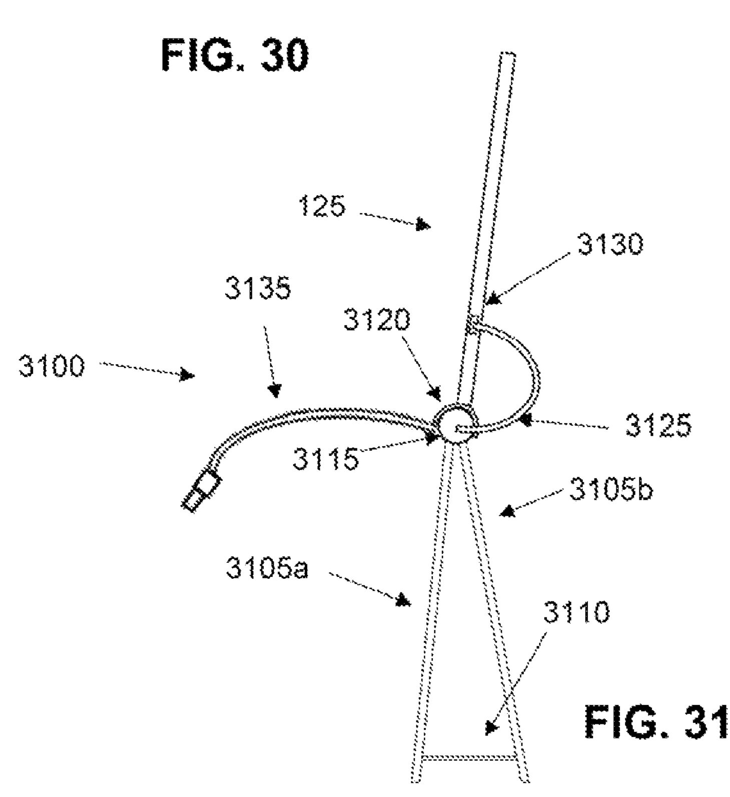
FIG. 31 illustrates a side view of a laptop display system, in an open configuration, according to an embodiment of the present invention.

FIG. 31 illustrates a side view of a laptop display system 3100, in an open configuration, according to an embodiment of the present invention. The laptop display system 3100 is similar to the system 2700, but includes a socket hinge comprising a hollow tube 3115 and a cap 3120. The cap 3120 is configured to cover at least a portion of the external surface of the hollow tube 3115, to allow for rotation, and to enable the internal portion of the tube to be used without interference from the hinge mechanism.

In a use, wires may be fed through the hollow tube 3115 and may be connected to the display 125. This may prevent tangling of wires, help organise wires, and/or provide convenient storage and protection of wires.

The wire 3125 may extend from one end of the hollow tube 3115, along the internal cavity of the hollow tube 3115, to the other end of the hollow tube 3115.

In some embodiments, the wires may automatically retract within the hollow tube 3115. Control of retraction of the wires within the hollow tube 3115 may be mediated by a button. Alternatively, the retraction of wires may be manual.

The wire 3125 may externally connect to the display 125 as shown in FIG. 31, or it may connect internally so that the wire 3125 is not visible.

A distal end 3135 of the wire 3125, may extend from the hollow tube 3115 and connect to the laptop 500.

It will be understood that any number of wires may be employed and may connect to a number of sites including the display 125 and the laptop 500.

In some embodiments, a battery may be housed within the hollow tube 3115. The battery may be used to provide power for the auxiliary display 125 and/or the laptop 500.

The laptop display system 3100 also includes first and second panel members 3105*a*, 3105*b* and a brace 3110 configured to assist in supporting the display 125.

It will be understood that the laptop display system 3100 may be combined with the telescoping features of the laptop display systems 2800 and 2900.

Figure 32:
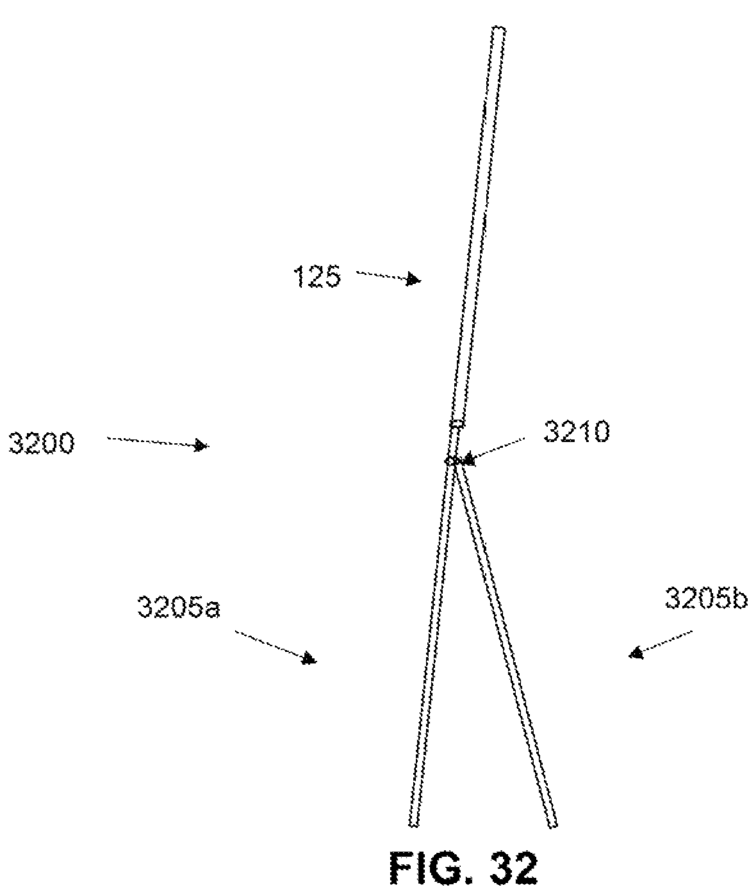
FIG. 32 illustrates a side view of a laptop display system, in an open configuration, according to an embodiment of the present invention.

FIG. 32 illustrates a side view of a laptop display system 3200, In an open configuration, according to an embodiment of the present invention. The laptop display system 3200 includes a kickstand 3205*b* connected to the first panel member 3205*a*.

The kickstand 3205*b* may allow further angle adjustment of the display 125 and increase stability of the system 3200. To enable angle adjustment, the kickstand may include a torque hinge 3210 or any other suitable angle adjustment mechanism. The torque hinge 3210 may extend to a certain angle and be restricted by a stopping member. The torque hinge 3210 may be a one-way torque hinge.

The laptop display system 3200 may comprise a telescoping portion. The telescoping portion may be at least partly received in and extend upwardly from one of the first panel member 3205*a* or the kickstand 3205*b*. Preferably, the display 125 telescopically engages with the first panel member 3205*a*.

In this embodiment, the first panel member 3205*a* is configured to attach to and support an auxiliary display via magnets or other removable adhesive means, in an alternative embodiment, the first panel member 3205*a* may be permanently attached to the auxiliary display.

The kickstand 3205*b* is illustrated in an open configuration in FIG. 32. In a closed configuration, the kickstand 3205*b* may sit on the surface of the first panel member 3205*a*. Alternatively, the kickstand 3205*b* may sit recessed in a cavity (not illustrated) on the first panel member 3205*a*.

The skilled addressee will appreciate that the kickstand 3205*b* may be a solid panel or it may comprise a number of cut out portions.

In some embodiments, the laptop display system 3200 may comprise a reversed lower hinge. In such embodiments, the kickstand 3205*b* may be hingedly connected to the display 125. The first panel member 3205*a* may extend from the kickstand 3205*b* at a point below the connection of the kickstand 3205*b* and the display 125.

Figure 33:
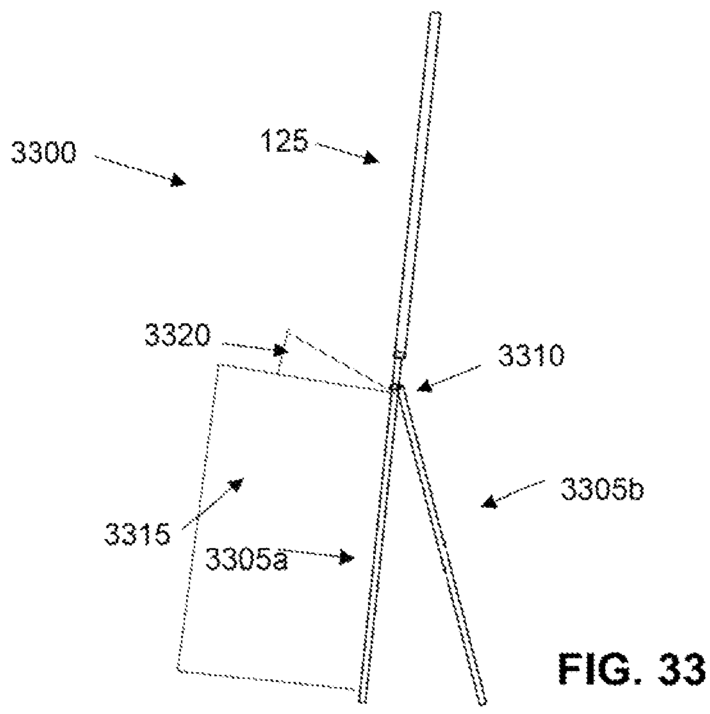
FIG. 33 illustrates a side view of a laptop display system, in an open configuration, according to an embodiment of the present invention.

FIG. 33 illustrates a side view of a laptop display system 3300 in an open configuration wherein first and second auxiliary displays 3315, 3320 are able to slide and/or fold out of the first panel member 3305*a*. In the present embodiment, the first and second auxiliary displays 3315, 3320 are hingedly attached to sides of the first panel member 3305*a* and are shown angled inwardly to provide a comfortable viewing experience.

Similar to the laptop display system 3200, the system 3300 includes a torque hinge 3310 and a kickstand 3305*b*.

In use the first and second auxiliary displays 3315, 3320 may function as a single extended display together with the display 125. In other embodiments, the display 125 and the first and second auxiliary displays 3315, 3320 may function entirely independently of each other.

Figures 34, 35:
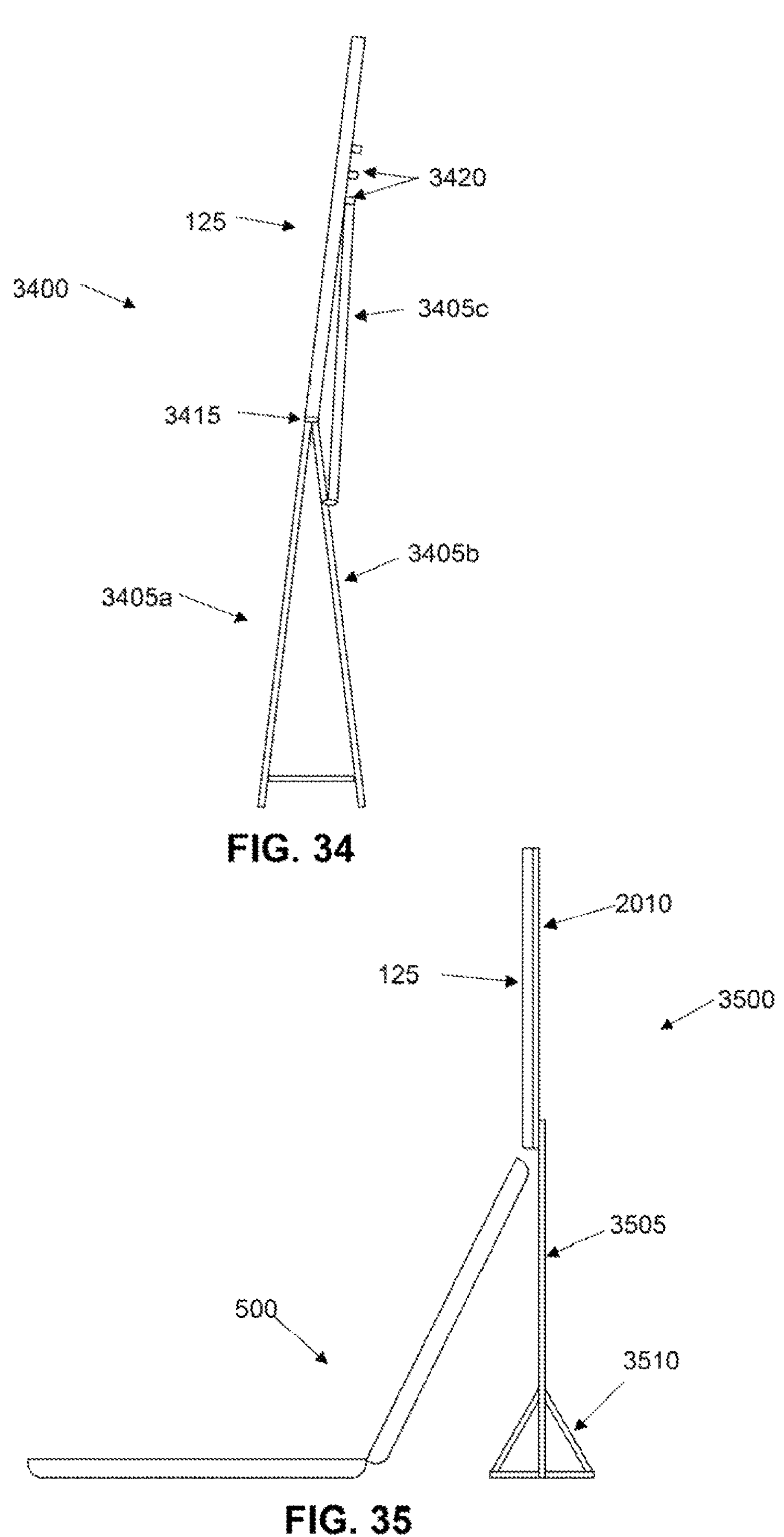
FIG. 34 illustrates a side view of a laptop display system, in an open configuration, according to an embodiment of the present invention.
FIG. 35 illustrates a side view of a laptop display system used with the laptop of FIG. 5, according to an embodiment of the present invention.

FIG. 34 illustrates a side view of a laptop display system 3400, in an open configuration, according to an embodiment of the present invention. The laptop display system 3400 is similar to the system 2700, but includes a display support member to support the display 125.

In particular, the laptop display system 3400 comprises an auxiliary display 125, configured to be used with a laptop (not illustrated), and is supported by a stand comprising panel members 3405*a*, 3405*b*. The first and second panel members 3405*a*, 3405*b* extend downwardly from the auxiliary display 125 through a hinge 3415, and may be opened around the hinge 2815 such that the first and second panel member 3405*a*, 3405*b* form an A-frame shape under the display 125. A third panel member 3405*c* extends, however, up from the second panel member 3405*b*, and engages with one (or more) of a plurality of supports 3420 of the display 125, to support the display in one of a plurality of predefined positions.

The third panel member 3405*c* may be attached to the second panel member by a hinge, or any other suitable mechanism.

Although a plurality of supports 3420 are illustrated and described, in another embodiment, only a single support is provided.

The supports 3420 may comprise protrusions extending outwardly from a rear of the display 125, defined by grooves in the display 125, a combination of grooves and protrusions, or in any other manner to enable the third panel member 3405*c* to support the display 125 in a desired position. As an illustrative example, the supports 3420 may be replaced by a magnetic fastening arrangement.

The third panel member 3405*c* may have suitable cut outs which may reduce the weight of the system and may also help it engage with the supports 3420. In particular, cut outs near the top edge of the third panel member 3405*c* may allow for engagement with certain supports 3400 which would otherwise not be possible if the cut outs were not present. In other embodiments, the third panel member 3405*c* could have substantial cut outs leaving only the edge of the panel, such that the panel comprises a square U-shaped bracket or brace, rather than a panel. In addition, the second panel 3405*b* may have an indentation or cut out, in the shape of third panel member 3405*c*, to allow the third panel member 3405*c* to be entirely or partially contained within the second panel member 3405*b* when folded away, resulting in a thinner system.

The hinges have several benefits over the mechanism described with reference to systems 2200, 2500 and 2600 having flexible straps. In particular, the use of a hinge enables the display 125 to be positioned higher, as an entire height of the panels may be used to support the display. Furthermore, hinges enable easy adjustment of screen angles, rather than requiring one or more of the panels to be angled.

In other embodiments, different types of stand arrangements are provided.

FIG. 35 illustrates a side view of a laptop display system 3500 used with the laptop 500, according to an embodiment of the present invention. The system 3500 is similar to the system 2000, but includes an enlarged base, and does not connect to the laptop 500.

In particular, first and second panel members 3505, 3510 support the auxiliary display 125 in an elevated position.

Unlike the first panel member 2005, the first panel member 3505 folds to form a base portion 2510, to provide stability to the display system 3500.

The first panel member 3505 may fold into a plurality of configurations, causing the first panel member 3505 to extend upwardly at different heights. Such configuration is useful in that the system 3500 may be used with different sized laptops 500, and with screens open to different angles.

Magnets embedded in the first panel member 3505 may be used to retain the panel member into one of the different configurations.

The system 3500 folds away for storage in a similar manner to the system 2000.

While a relatively small and simple base 3510 is illustrated, the skilled addressee will readily appreciate that other configurations may be used, e.g. a substantially larger base for stability, and/or further stability components such as kickstands and support members that fold out or fold down to provide stability. Furthermore, while no physical coupling to the laptop is illustrated, in other embodiments, a magnetic coupling such as that described in the system 2000 may be used.

In some embodiments, the base may comprise a support panel or support members that extend outwardly from a bottom of the first panel member 3505. In such case, the system may be similar to the system 2700, but wherein the panel member **2705*b* is hingedly attached to the bottom of the panel member 2705*a*. To ensure that the system is appropriate balanced, the panel member 2705*a* may be angled over the panel member 2705*b* such that the panel member 2705*b*** forms a flat base on a support surface.

Figure 36:
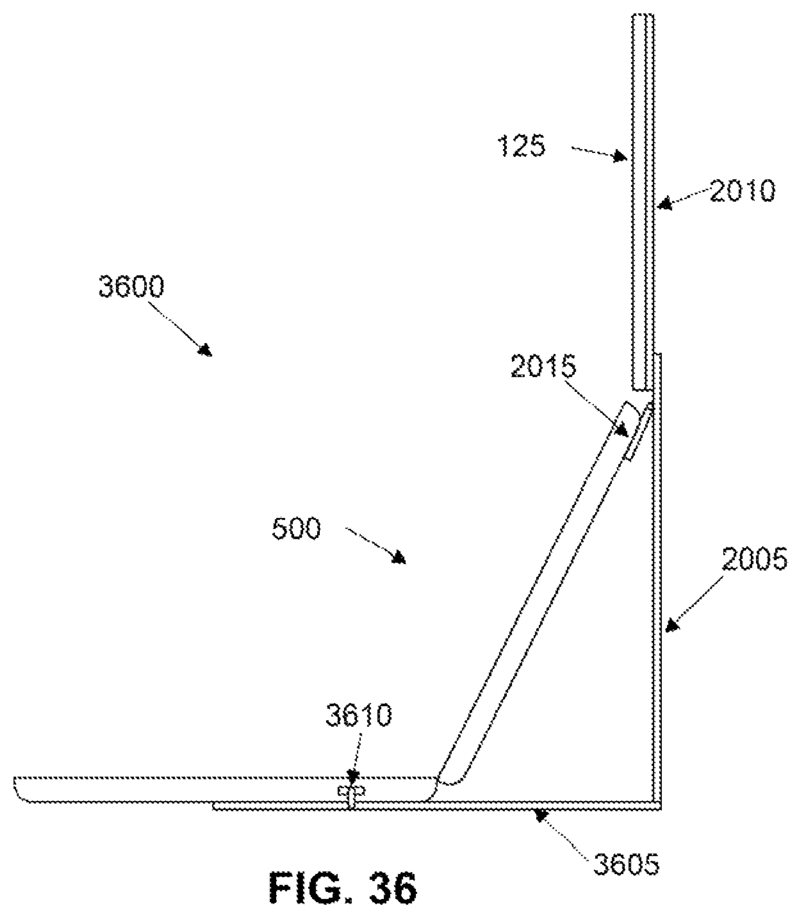
FIG. 36 illustrates a side view of a laptop display system used with the laptop of FIG. 5, according to an embodiment of the present invention.

FIG. 36 illustrates a side view of a laptop display system 3600 used with the laptop 500, according to an embodiment of the present invention. The system 3600 is similar to the system 2000, but includes a base member 3605 coupled to a lower portion of the first panel member 2005.

The base member 3005 comprises a panel, on which the laptop 500 is positioned in use. Such configuration provides additional stability over the system 2000.

The system 3600 folds for storage/transport in a similar manner to the system 2000, but wherein the base member 3605 further folds around above the second panel member 2010.

The base member 3605 includes a retractable cable 3610, for coupling the laptop to the auxiliary display 125. The cable 3610 may be used to power or recharge the auxiliary display and/or provide display signals to the auxiliary display. In alternative embodiments (not illustrated), a cable may extend directly from the auxiliary display 125 to the laptop. This cord may retract into the auxiliary display 125, or a housing associated therewith, when not needed. Alternatively, the cord may fold into a section of the first panel member 2005 or the second panel member 2010 or the auxiliary display 125.

The cable 3610 runs through the base 3605, first panel member 2005, and second panel member 2010 to the auxiliary display.

Figure 37:
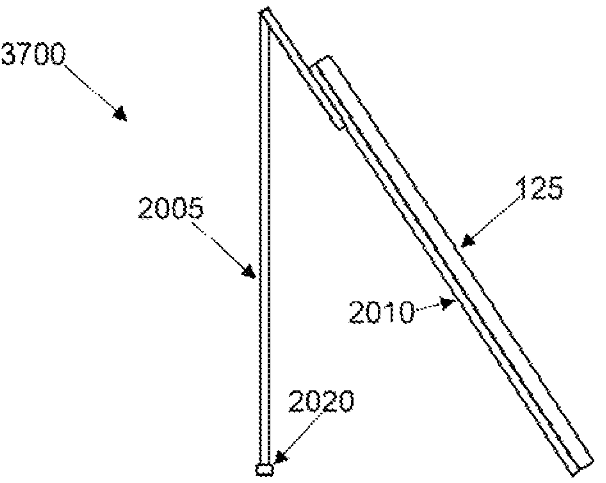
FIG. 37 illustrates a side view of a display system, according to an embodiment of the present invention.

FIG. 37 illustrates a side view of a display system 3700, according to an embodiment of the present invention. The system 3700 is similar or identical to the system 2000, but is reconfigured to support the auxiliary display 125 in a non-elevated position independently of the laptop 500.

In particular, the first panel member 2005 is foldable, such that the first and second panel members 2005, 2010 define an A-frame, supporting the auxiliary display on an angle.

Such configuration is particularly useful in case the auxiliary display 125 is a tablet computer, as it enables the auxiliary display to be transported in a safe manner (transport configuration), used together with the laptop 500 (extended configuration) and used in a standalone manner (A-frame), without requiring any additional elements or stands to be carried.

Figure 38:
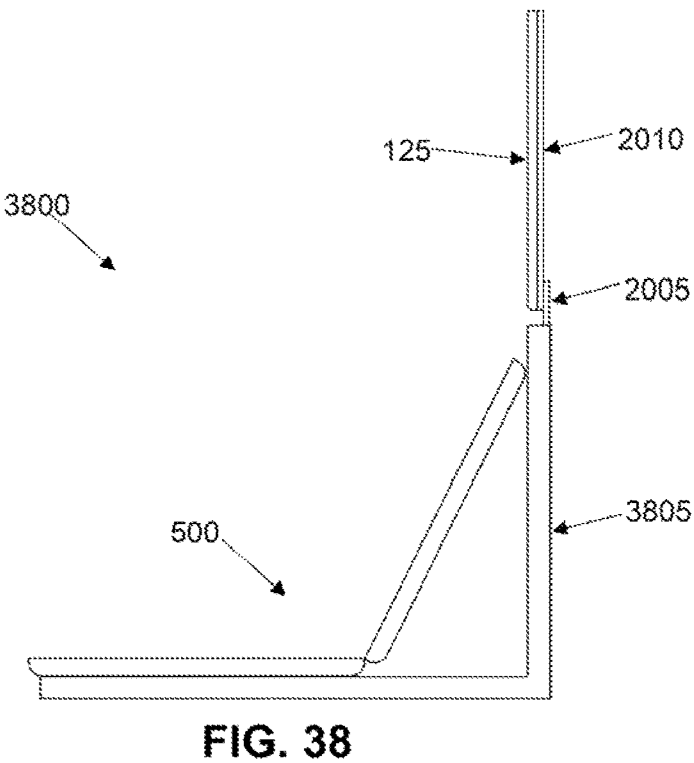
FIG. 38 illustrates a side view of a display system, according to an embodiment of the present invention.

FIG. 38 illustrates a side view of a display system 3800, according to an embodiment of the present invention.

The system 3800 is similar to the system 3600, but includes a fixed stand 3805. The fixed stand 3805 includes a base from which an upwardly extending support extends.

The auxiliary display 125 is coupled to first and second panel members 2005, 2010, which are received in the fixed stand 3805. The auxiliary display 125 is coupled to first and second panel members 2005, 2010 and may be similar or identical to the system 2000, and as such, the system 3800 may provide a more fixed arrangement in which the system 2000 may be used, e.g. in an office, in other words, the system 2000 may be used with the fixed stand 3205 when in the office, and without the fixed stand 3805 when out of the office.

While not illustrated, the system 3800 may include mains power connectivity, for powering the laptop 500 and/or the auxiliary display 125.

Figure 39:
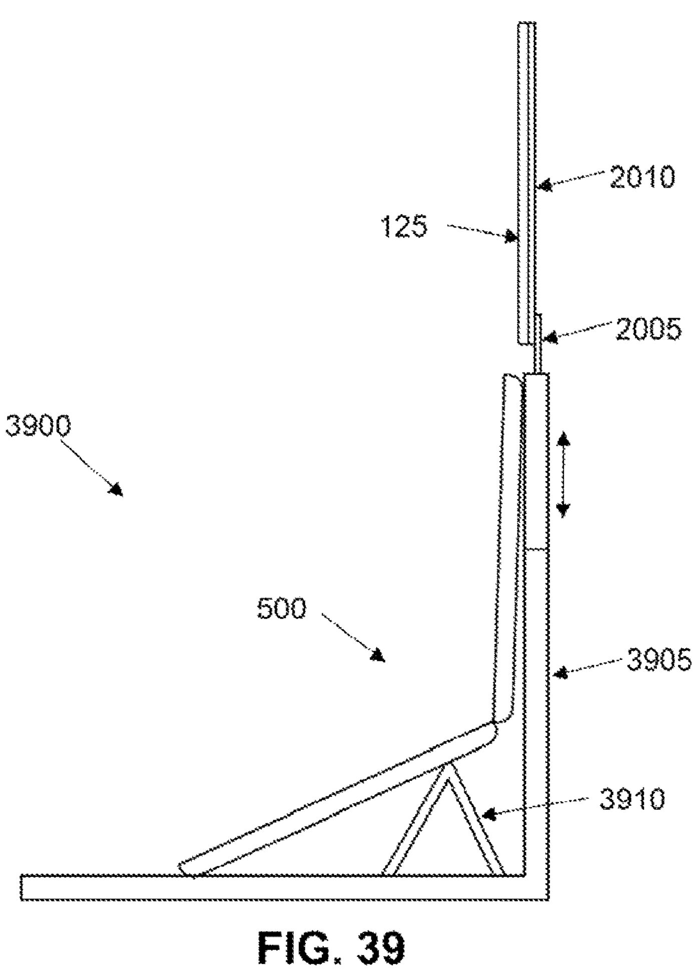
FIG. 39 illustrates a side view of a display system, according to an embodiment of the present invention.

FIG. 39 illustrates a side view of a display system 3900, according to an embodiment of the present invention. The display system 3900 is similar to the display system 3200, but includes an adjustable stand 3905, and an adjustable riser 3910.

The adjustable stand 3905 is similar to the stand 3805, but wherein the vertical member is adjustable in height. This enables the stand 3905 to be adjusted to a size of the laptop 500, and also an angle of the laptop 500 relative to the stand 3905.

The riser 3910 is configured to lift a rear of the laptop to allow air to flow under the laptop 500 and to elevate the screen of the laptop 500. The riser 3910 is also adjustable in height, enabling the user to configure the angle and height of the laptop 500 to his or her preference.

The riser 3910 is configured to lift a rear of a base portion of the laptop, thereby angling a base of the laptop relative to the base portion.

Such configuration is particularly useful when an external keyboard is to be used.

Figure 40:
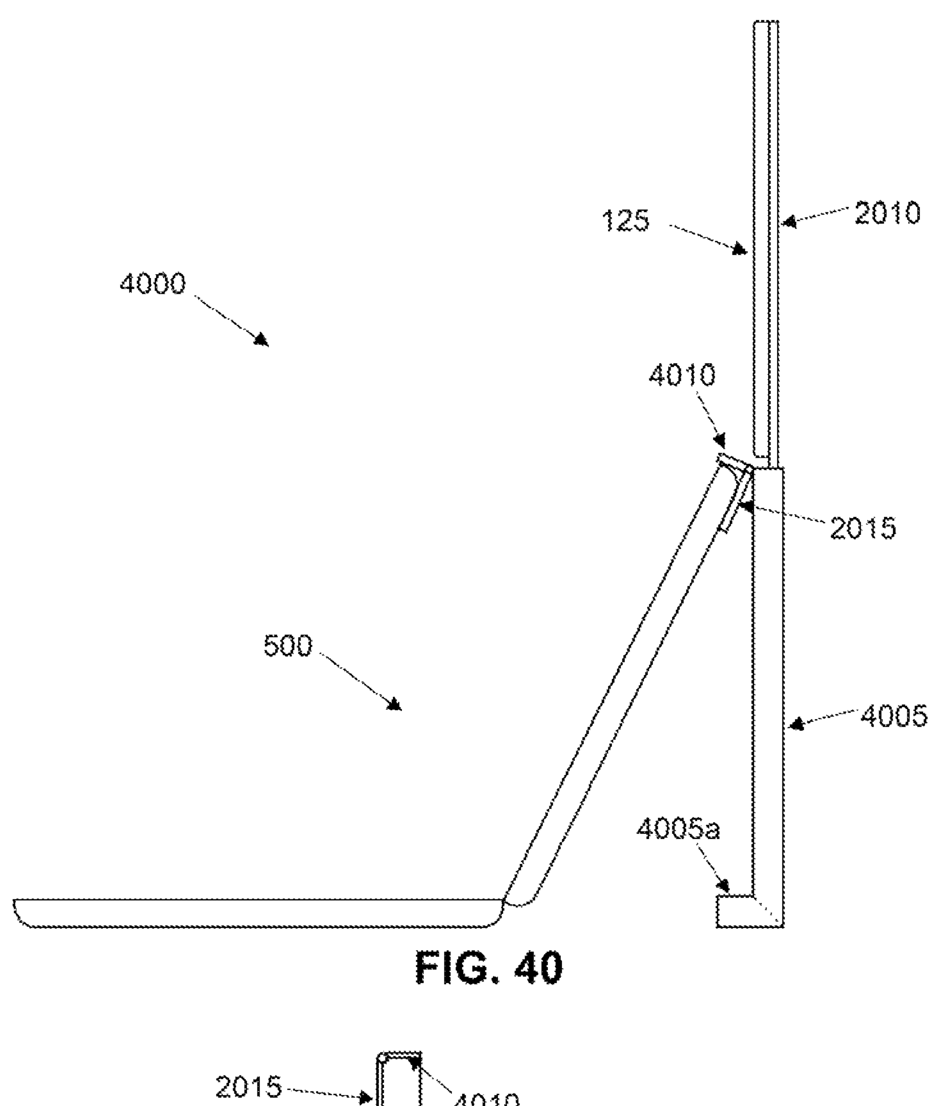
FIG. 40 illustrates a side view of a display system, in an extended configuration, according to an embodiment of the present invention.
Figure 41:
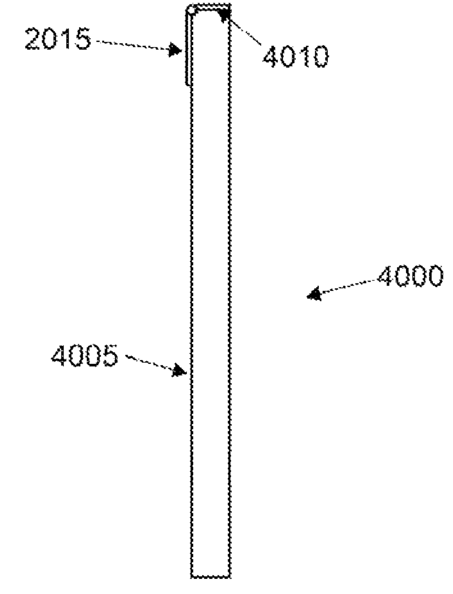
FIG. 41 illustrates the display system of FIG. 40 in a storage/transport configuration.

FIG. 40 illustrates a side view of a display system 4000, in an extended configuration, according to an embodiment of the present invention. FIG. 41 illustrates the display system 4000 in a storage/transport configuration. The display system 4000 is similar to the display system 2000, but wherein a support member 4005 functions as a housing for the auxiliary display 125, which may slide in and out thereof.

The support member 4005 is adjustable in height in the extended configuration, in that the support member 4005 is foldable to a desired height. When folded, a lower portion of the support member 3005 becomes a horizontal base **4005*a*. While illustrated as folding inwards (towards the laptop 500), the lower portion of the support member 4005** may be foldable inwards, outwards, or either inwards or outwards.

A closure 4010 is provided at an upper end of the housing, to retain the auxiliary display 125 when in the transport/storage configuration.

The auxiliary display 125 may be removed entirely from the housing, and supported by the support member 4005, without the laptop 500.

Figure 42:
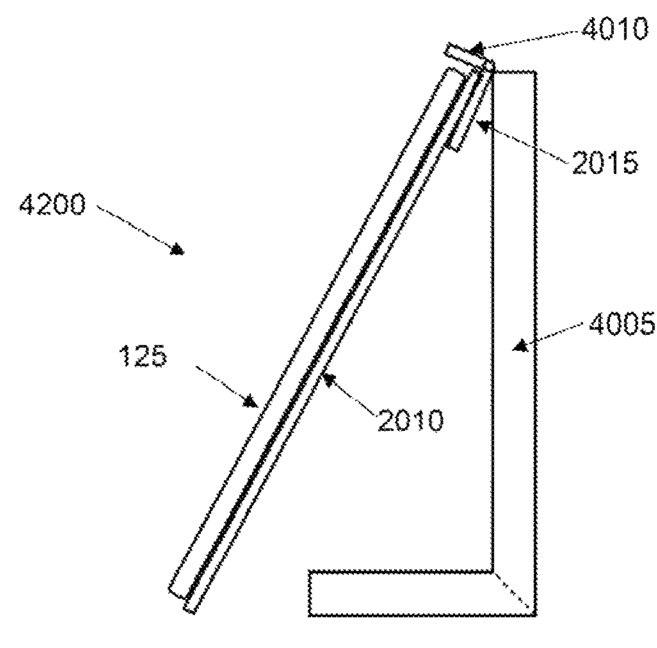
FIG. 42 illustrates the display system of FIG. 40 in a configuration without the laptop of FIG. 5.

FIG. 42 illustrates the display system 4000 in a configuration without the laptop 500. In particular, the panel member 2010 engages with the magnetic coupling 2015, much like the laptop 500 does, as illustrated above.

Such configuration is useful if the auxiliary display 125 is used separately to the laptop 500, or beside the laptop, as it enables the cover to function as a stand for the auxiliary display 125.

Figure 43:
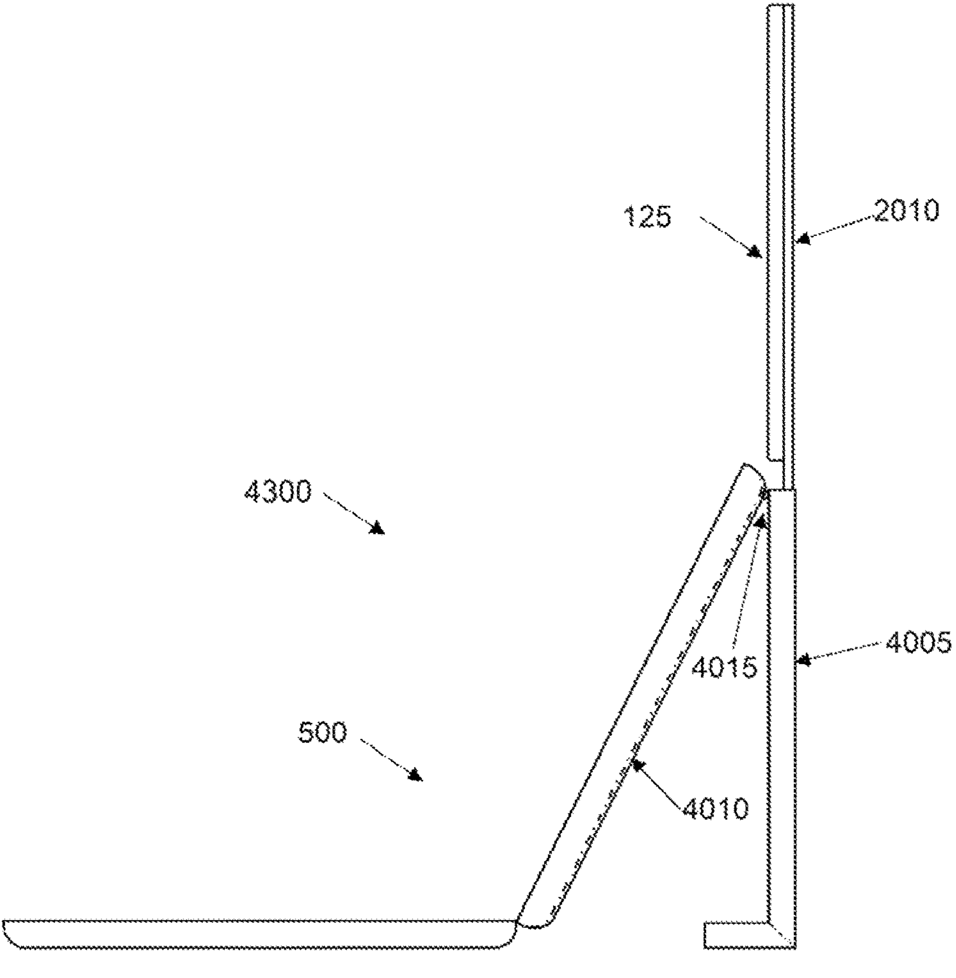
FIG. 43 illustrates a side view of a display system, in an extended configuration, according to an embodiment of the present invention.

FIG. 43 illustrates a side view of a display system 4300, in an extended configuration, according to an embodiment of the present invention. The display system 4300 is similar to the display system 4000, but wherein the support member 4005 is pivotally attached to a laptop display retainer portion 4010. The support member 4005 thereby essentially functions as a kickstand.

The retainer portion 4010 is similar to the retainer portion 110, and is configured to receive and retain the display of the laptop 500. The support member 4005 is coupled to the laptop display retainer portion 4010 by a pivot member 4015, which enables the support member to pivot relative to the laptop 500.

In a storage/transport configuration, the laptop 500 will be closed, the auxiliary display 125 retracted into the support member 4005, and the support member 4005 pivoted against the laptop, enabling the laptop 500 and system 4300 to fit into an ordinary laptop bag or sleeve.

The support member 4005 and laptop display retainer portion 4010 may include magnets to lock each other together. In use, when lifting the auxiliary display 125 out of the support member, the support member 4005 will disengage from the back of the laptop display retainer portion 4010, causing the support member 4005 to hang down vertically (by gravity). Such configuration allows the system to operate quickly and one-handedly.

In some embodiments, the support member 4005, which receives the auxiliary display 125, has an opening on a rear thereof. The auxiliary display 125 may be removed from the support member 4005, and reinserted backwards, such that the screen of the auxiliary display 125 is visible and accessible through the opening. Such configuration enables the auxiliary display 125, which may comprise a tablet computer, to be used while the laptop is closed.

The opening may be defined in any suitable manner, including between opposing rails, and advantageously providing as large an opening as possible.

In some embodiments, the laptop may be running while the laptop is closed. In such case, the auxiliary display may comprise a touchscreen or tablet computer, with which the user interacts, to thereby interact with the computer.

Such configuration is particularly useful on public transport, as the user is still able to interact with the laptop, and later (e.g. when they get home or to the office), they can reverse the auxiliary display 125, open the laptop and use it in normal dual screen mode.

Figures 44, 45:
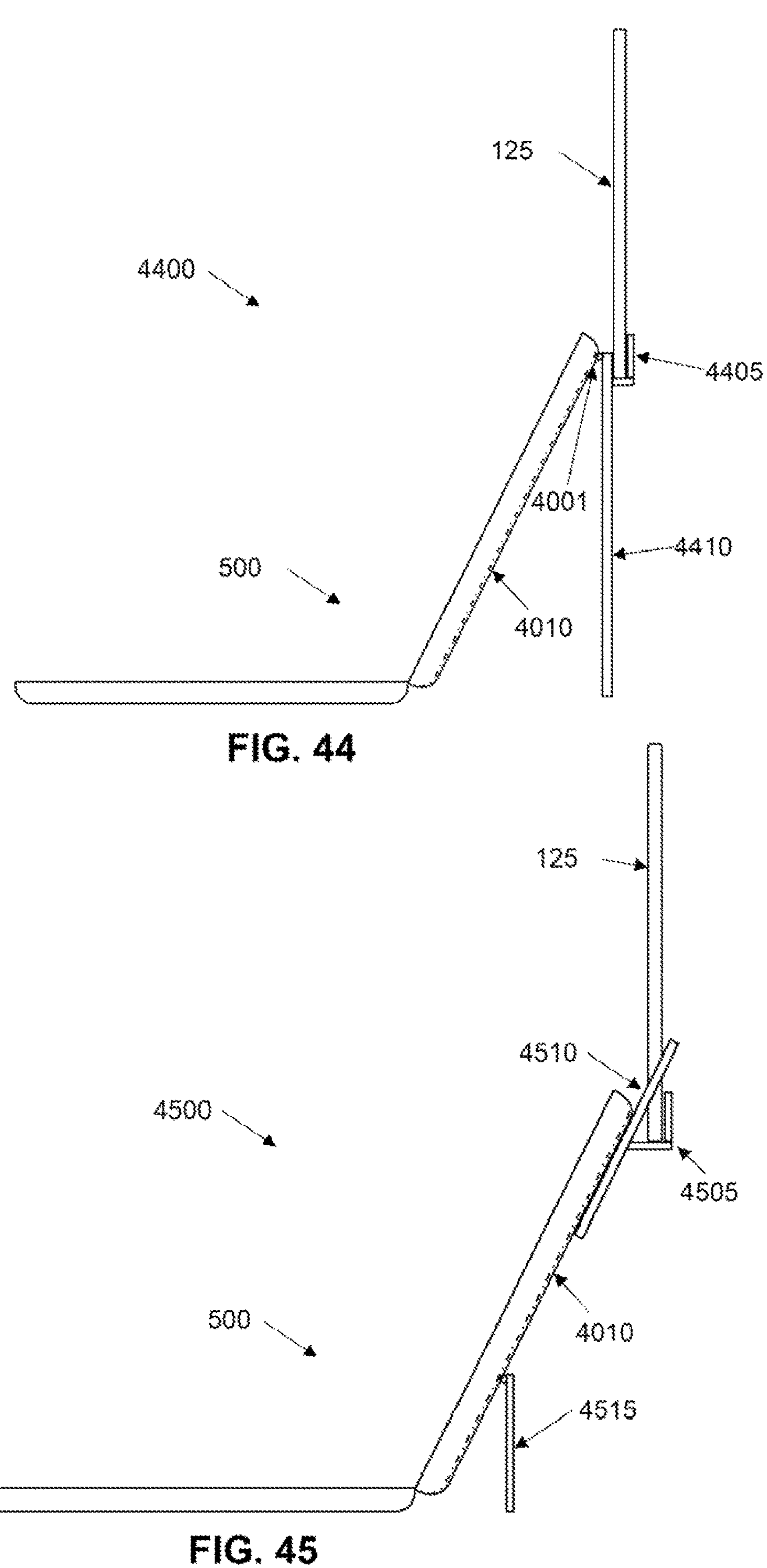
FIG. 44 illustrates a side view of a laptop display system used with the laptop of FIG. 5, according to an embodiment of the present invention.
FIG. 45 illustrates a side view of a laptop display system used with the laptop of FIG. 5, according to an embodiment of the present invention.

FIG. 44 illustrates a side view of a laptop display system 4400 used with the laptop 500, according to an embodiment of the present invention. The system 4400 is similar to the system 4300, but wherein the auxiliary display 125 is supported by a ledge 4405 of a support member 4410.

The ledge 4405 comprises a channel in which a lower portion of the auxiliary display 125 is received.

The ledge 4406 folds outwardly from the support member 4410 when used, such that when stored, lies in the same plane as the support member 4410.

As such, the system 4400 may be attached to a laptop with minimal disruption when not used, and folded out and used, when desired.

The ledge 4405 may include gripping portions, for gripping a lower edge of the auxiliary display (e.g. rubber members). Alternatively or additionally, the auxiliary display may include portions (or a cover thereof may include portions) that connect with or otherwise engage with the ledge 4405, for stability.

FIG. 45 illustrates a side view of a laptop display system 4500 used with the laptop 500, according to an embodiment of the present invention. The system 4500 is similar to the system 4500.

A ledge 4505 is coupled to the laptop display retainer portion 4010 by a sliding member 4510. The sliding member 4510 includes a slot through which the auxiliary display may extend to engage with the ledge 4505. As such, the sliding member 4510 not only functions to elevate the ledge 4505, but also functions as a support for the auxiliary display 125, preventing the auxiliary display from tipping backwards or forwards.

The ledge 4505 folds out from the sliding member 4010, and is therefor similarly compact when not used.

Finally, a kickstand 4515 is provided on a lower portion of the laptop display retainer portion 4010, to support the laptop screen and auxiliary display 125. While not illustrated, the kickstand 4515 may include a gripping member (e.g. rubber) or surface at its base.

Figure 46:
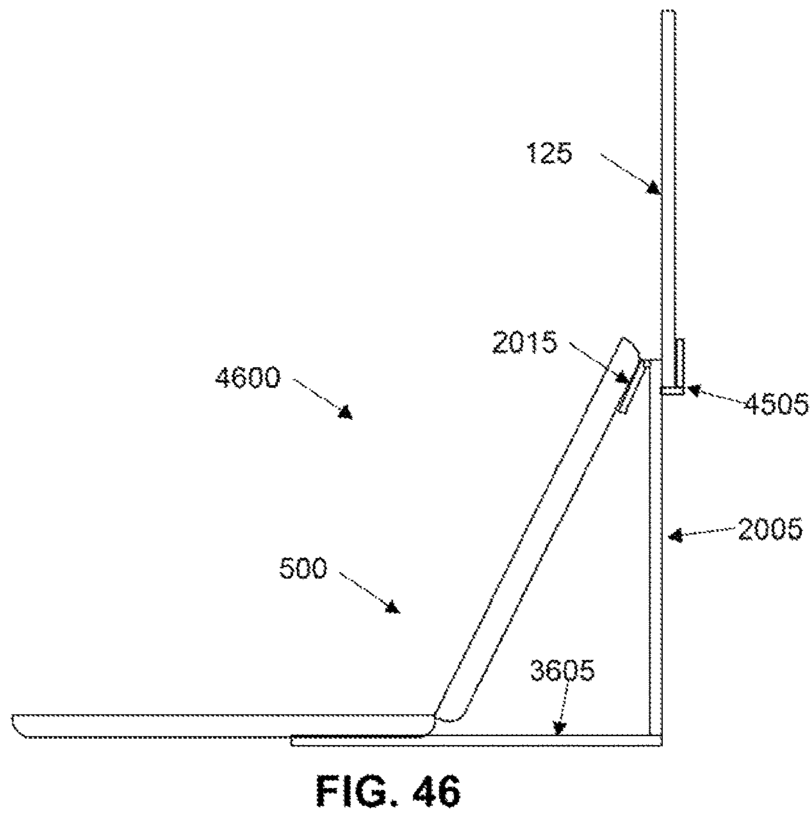
FIG. 46 illustrates a side view of a laptop display system used with the laptop of FIG. 5, according to an embodiment of the present invention.

FIG. 46 illustrates a side view of a laptop display system 4600 used with the laptop 500, according to an embodiment of the present invention.

The system 4600 is similar to the display system 3600 with the ledge of the display system 4400.

When not used, the system 4600 may be folded away and stored in a compact (near planar) manner. In some embodiments, the auxiliary display may be received between the panel member 2005 and base member 3605. In such case, a gripping surface may be provided on insides thereof to assist such function.

Figure 47:
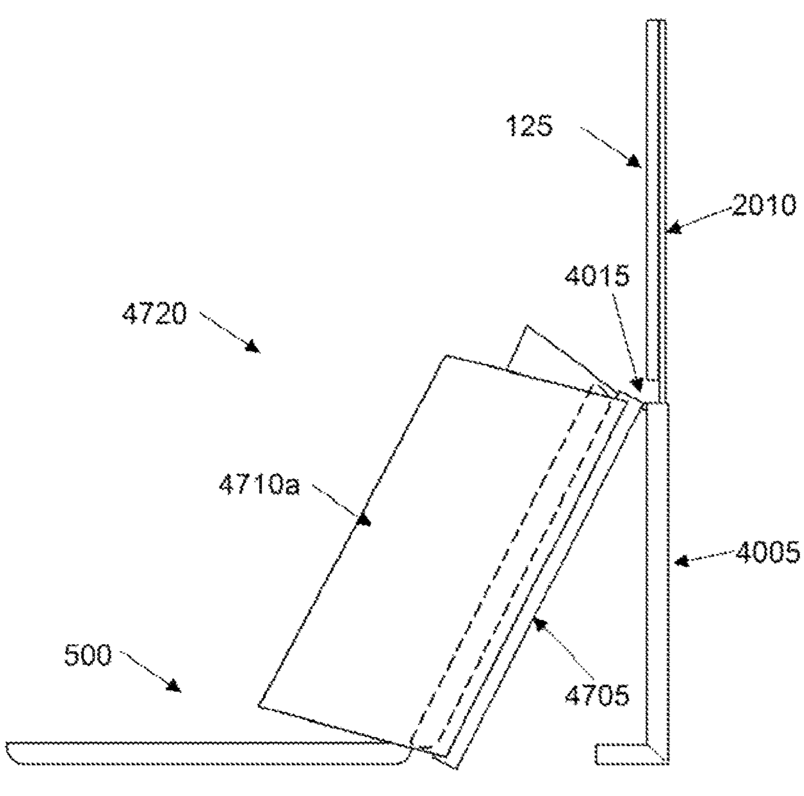
FIG. 47 illustrates a side view of a laptop display system used with the laptop of FIG. 5, according to an embodiment of the present invention.

FIG. 47 illustrates a side view of a laptop display system 4700 used with the laptop 500, according to an embodiment of the present invention.

The system 4700 is similar to the display system 4300, but with a laptop display retainer portion 4705 that houses first and second auxiliary displays 4710*a*, 4210*b*, configured to extend outwardly from each side of the laptop display retainer portion 4705.

Such configuration enables quad screen use, i.e. a screen from the laptop, the auxiliary screen 125 above the laptop, and the first and second auxiliary displays 4710*a*, 4710*b* on each side of the laptop.

As illustrated in FIG. 42, the first and second auxiliary displays 4710*a*, 4710*b* are not only able to slide out from the laptop display retainer portion 4705, but are also able to be angled inward, to provide a comfortable viewing experience.

The system 4700 is shown in an extended configuration, but when retracted, the first and second auxiliary displays 4710*a*, 4710*b* slide into the laptop display retainer portion 4205, the auxiliary display slides down into the support member 4005, and the support member 3505 folds in against the laptop display retainer portion 4705.

Figure 48:
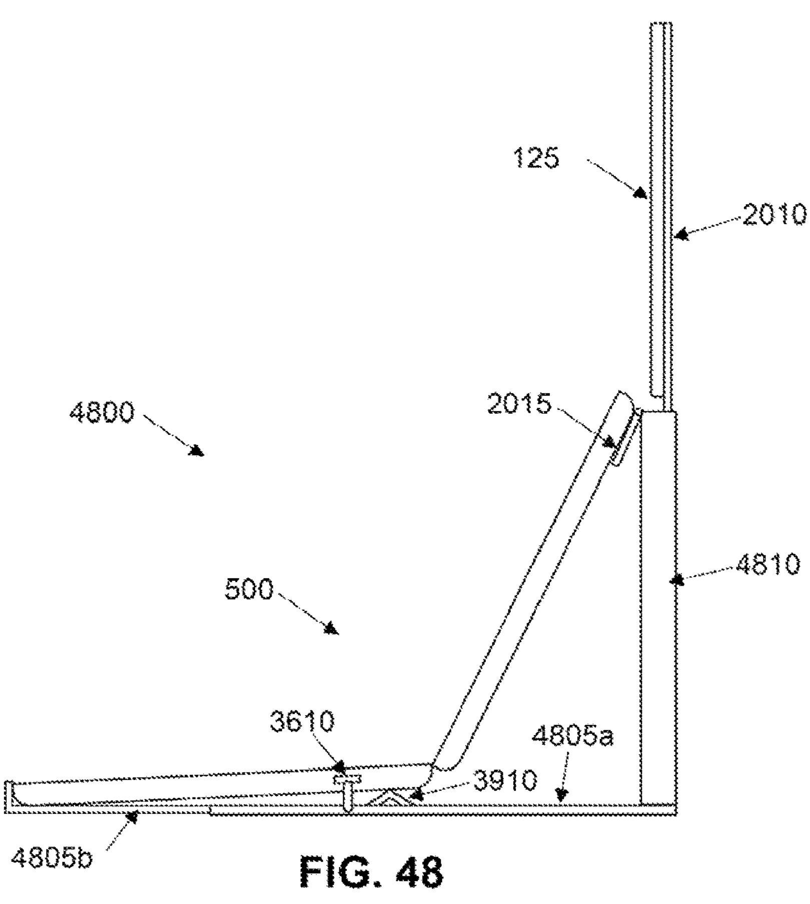
FIG. 48 illustrates a side view of a laptop display system used with the laptop of FIG. 5, according to an embodiment of the present invention.

FIG. 48 illustrates a side view of a laptop display system 4800 used with the laptop 500, according to an embodiment of the present invention. The system 4800 is similar to a combination of the system 3600 and 4000, with an extendible base comprising telescoping member 4805*a*, 4805*b*, from which a support member 4810 upwardly extends. The support member 4810 and the extendible base member 4805*a* comprise panels of a sleeve or bag that are able to be opened and closed around a pivot point. A closure, such as a zip that extends around the non-connected three edges of the panels, a fastener or the like, is used to keep the panels in a closed configuration. The laptop 500 may be stored in a case defined by the panels.

The panels may include padding, or protective material to protect against knocks, and may include a handle or straps (not shown).

The extendible base includes an outer lip and an end of the telescoping member 3305*b*, preventing the laptop from sliding off the base.

Figure 49:
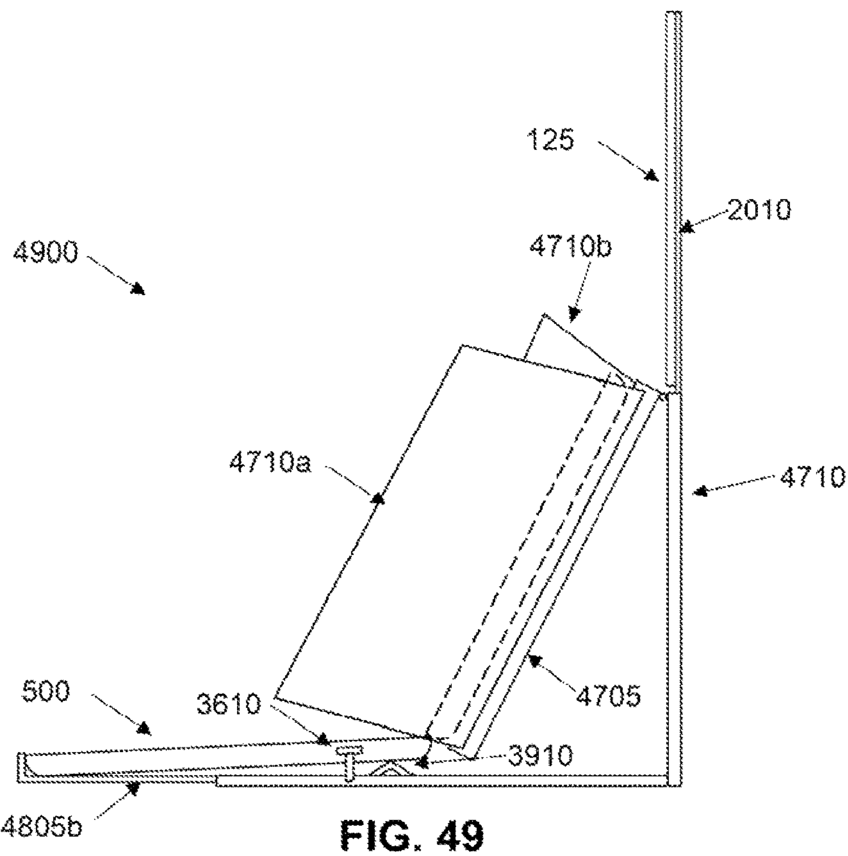
FIG. 49 illustrates a side view of a laptop display system used with the laptop of FIG. 5, according to an embodiment of the present invention.

FIG. 49 illustrates a side view of a laptop display system 4900 used with the laptop 500, according to an embodiment of the present invention. The system 4900 is similar to a combination of the systems 4700 and 4800.

Figure 50:
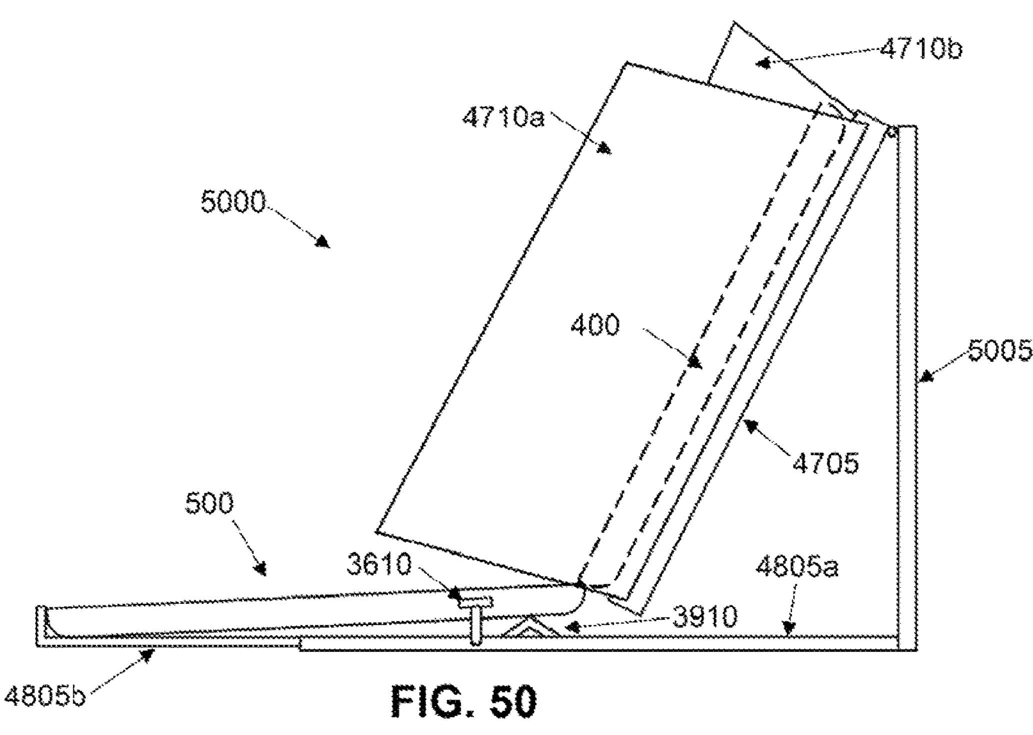
FIG. 50 illustrates a side view of a laptop display system used with the laptop of FIG. 5, according to an embodiment of the present invention.

FIG. 50 illustrates a side view of a laptop display system 5000 used with the laptop 500, according to an embodiment of the present invention.

The system 5000 is similar to the system 4900, but without the auxiliary display 125. In particular, a simple support member 5005 is used instead of the support 4810.

Figure 51:
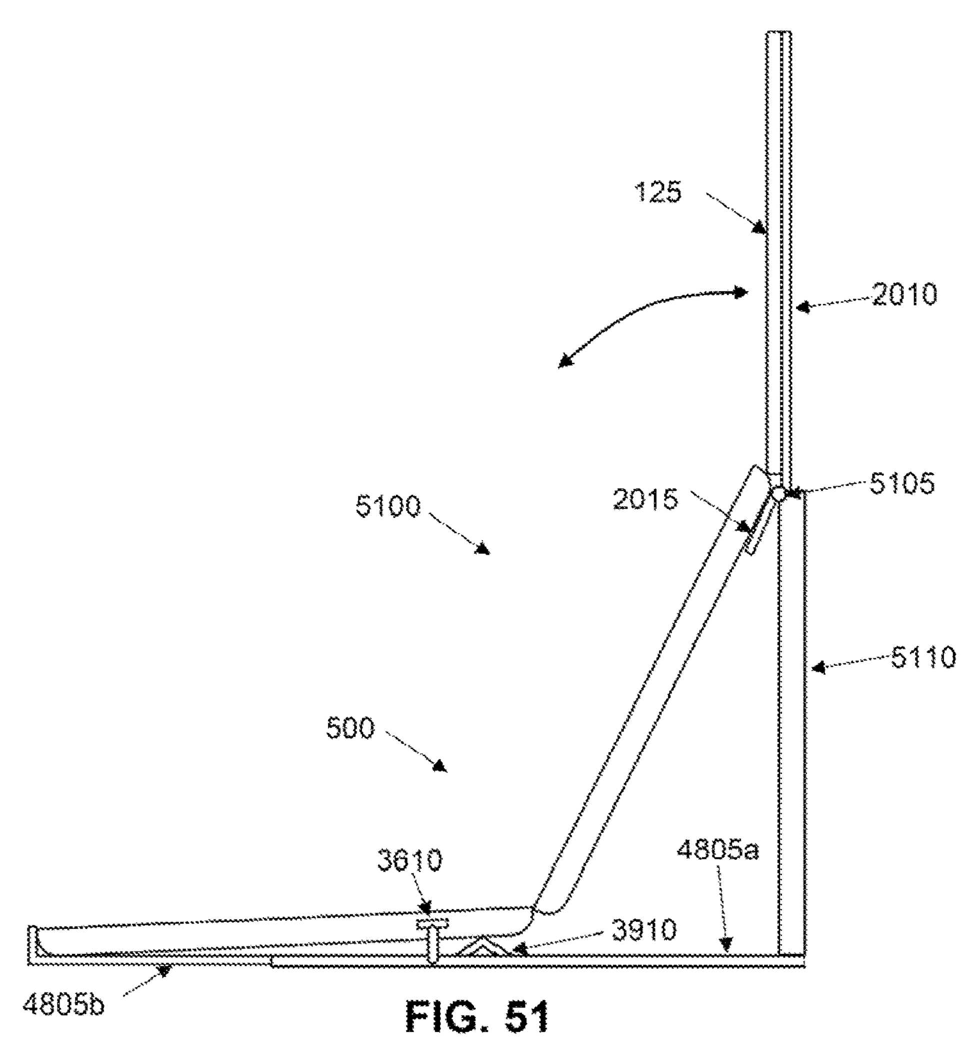
FIG. 51 illustrates a side view of a laptop display system used with the laptop of FIG. 5, according to an embodiment of the present invention.

FIG. 51 illustrates a side view of a laptop display system 5100 used with the laptop 500, according to an embodiment of the present invention.

The system 5100 is similar to the system 4800, but wherein the auxiliary display 125 folds downwards and inwards for storage/transport. In particular, a pivot joint 5105 couples the support member 5110 and the panel member 2010.

The pivot joint 5105 may releasably lock at a certain angle and thus allow the angle of the display 125, relative to the support member 5110, to be at the angle desired by the user. Alternatively, the pivot joint 5105 may be a torque hinge, or similar, allowing the user to select their desired angle.

Figure 52:
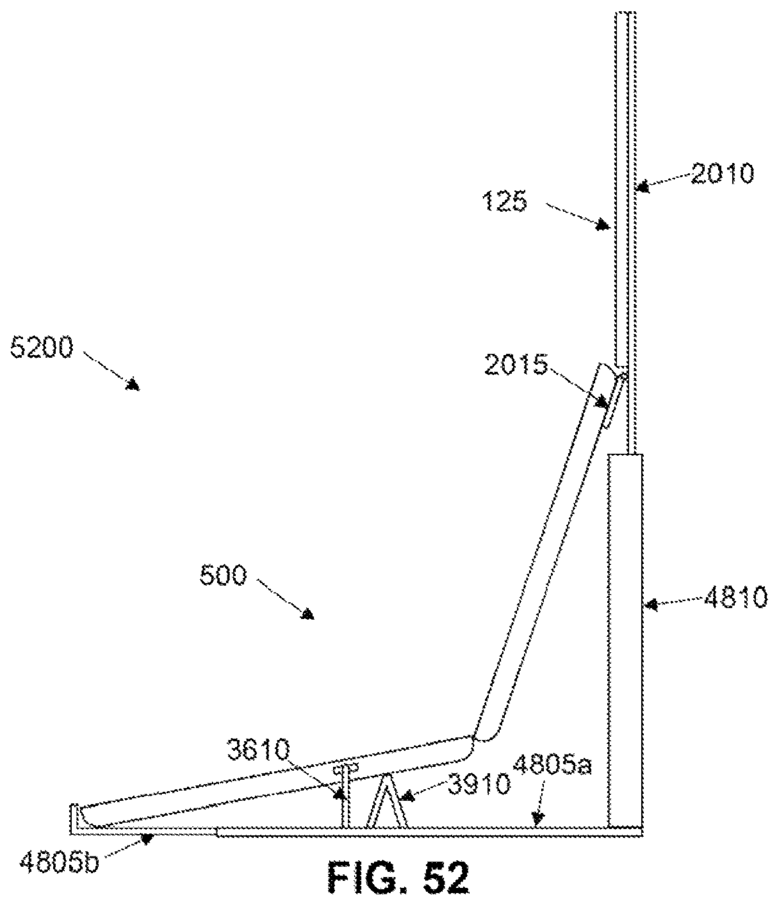
FIG. 52 illustrates a side view of a laptop display system used with the laptop of FIG. 5, according to an embodiment of the present invention.

FIG. 52 illustrates a side view of a laptop display system 5200 used with the laptop 500, according to an embodiment of the present invention.

The system 5200 is similar to the system 4800, but wherein the magnetic coupling 2015 is coupled to the panel member 2010, rather than the support member 4810. This enables the height of the magnetic coupling 2015 to be easily adjusted with the auxiliary display 125, which is particularly useful when the laptop 500 is raised on a greater angle.

Figure 53:
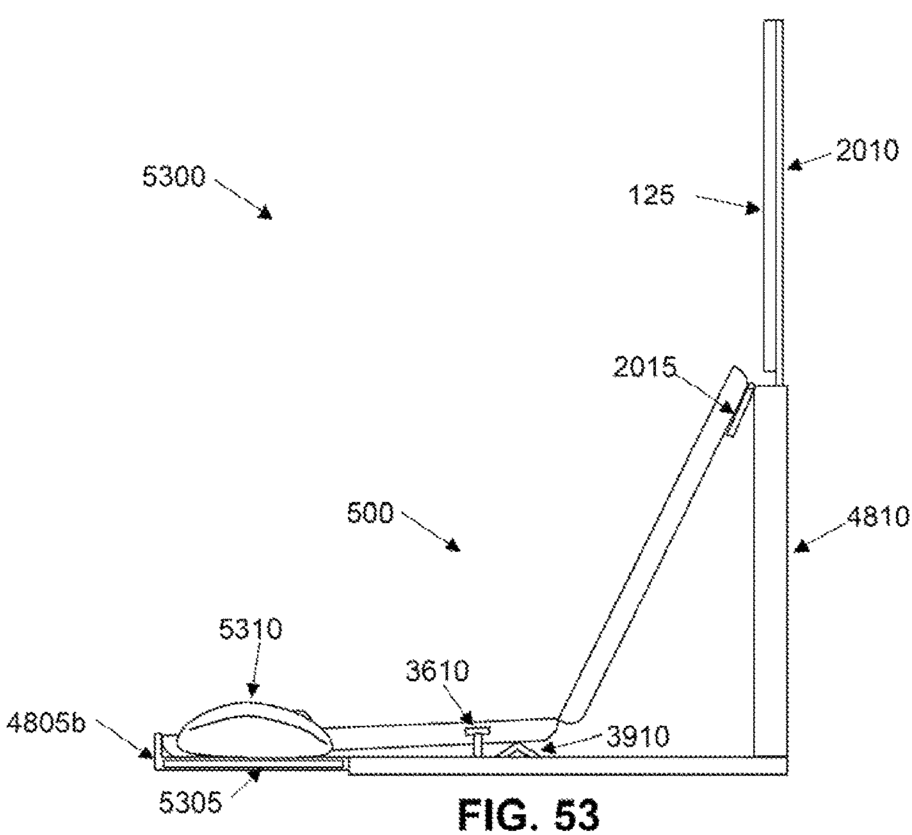
FIG. 53 illustrates a side view of a laptop display system used with the laptop of FIG. 5, according to an embodiment of the present invention.

FIG. 53 illustrates a side view of a laptop display system 5300 used with the laptop 500, according to an embodiment of the present invention.

The system 5300 is similar to the system 4800, but wherein a mouse or trackpad support 5305 extends outwardly (laterally) from the telescoping member 4805*b* of the base to support a mouse 5310 for use with the laptop 500.

Figure 54:
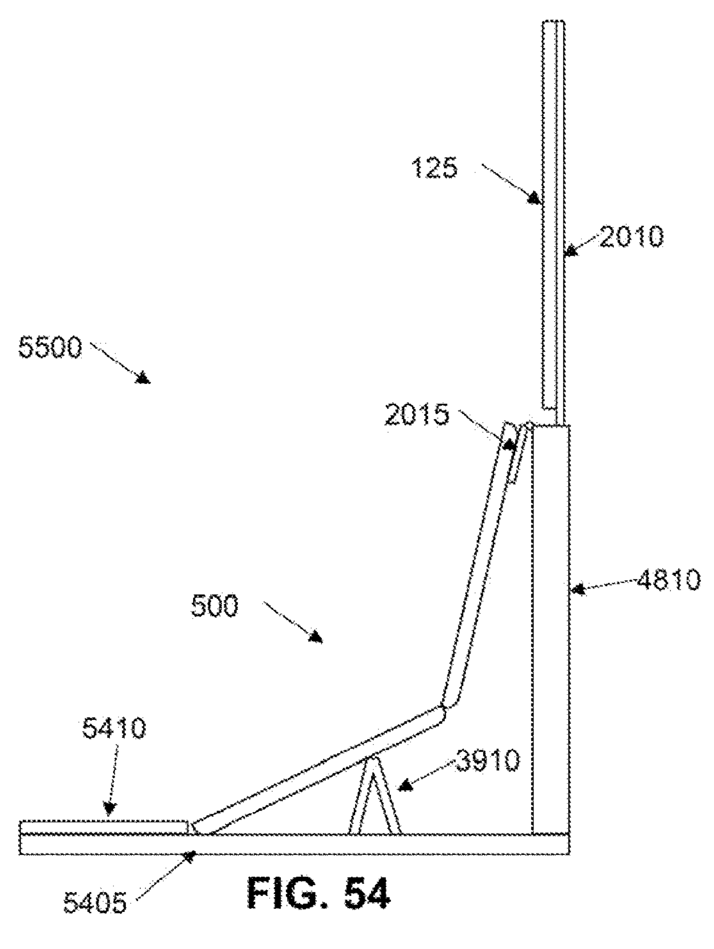
FIG. 54 illustrates a side view of a laptop display system used with the laptop of FIG. 5, according to an embodiment of the present invention.

FIG. 54 illustrates a side view of a laptop display system 5400 used with the laptop 500, according to an embodiment of the present invention.

The system 5400 is similar to the system 4800, but with a non-extendible base 5405, and a keyboard 5410 provided at a front of the base 5405. In use, the laptop 500 is lifted by the adjustable riser 3910 at an angle, providing access to the keyboard 5405 in front of the laptop.

The keyboard 5410 may be placed on the base 5405, supported by a ledge of the base 5405, grip onto a portion of the base 5405, or be received in a retainer of the base 5405, which may be sized and shaped for the keyboard. Similarly, the keyboard 5410 may be integrated into the base 4905.

The keyboard 5410 may include a trackpad. Alternatively, a trackpad may be provided in association with the system.

Such configuration combines the ergonomics of a raised laptop screen with the comfort of a flat keyboard.

Figure 55:
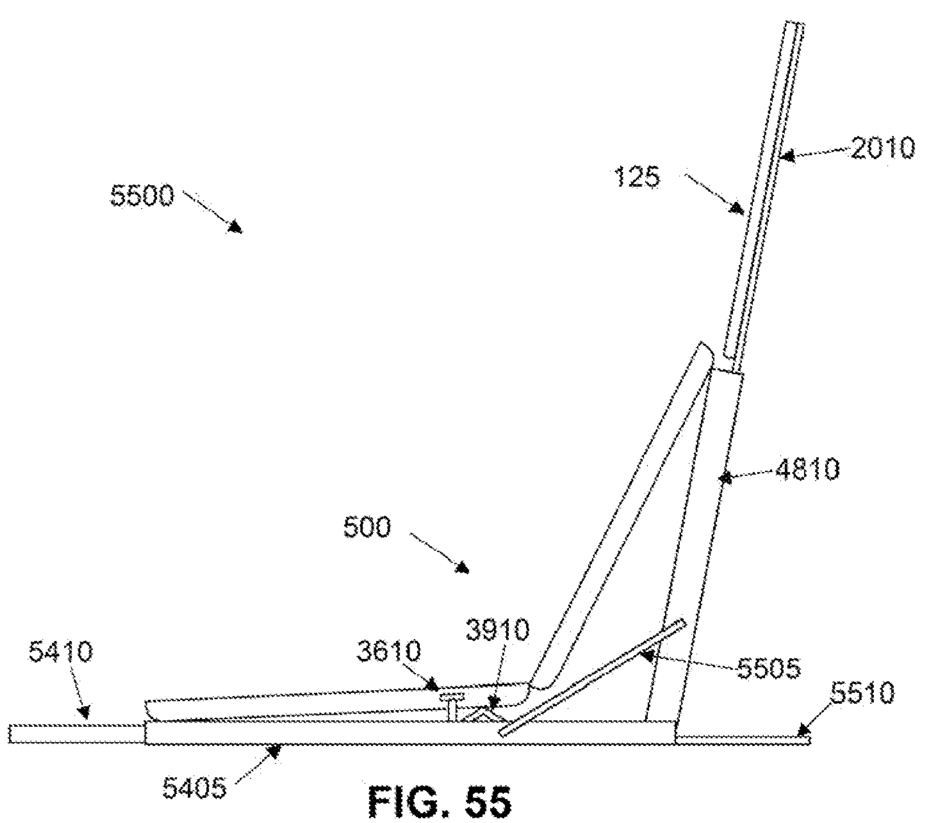
FIG. 55 illustrates a side view of a laptop display system used with the laptop of FIG. 5, according to an embodiment of the present invention.

FIG. 55 illustrates a side view of a laptop display system 5500 used with the laptop 500, according to an embodiment of the present invention.

The system 5500 is similar to the system 5400, but with the keyboard 5410 extendible from afront of the base 5405. The support member 4810 is coupled to the base 5405 by an adjustable brace 5505, which restricts a level of opening of the support member 4810 relative to the base 5405. The brace may be adjusted to support the support member 4810 at a desired angle, e.g. using hook and loop fasteners, or using a retractable brace.

This enables the support member 4810 to open more or less than 90 degrees (relating to the base 5405). As such, stabilisers 5510 extend outwardly from a rear of the base 5405, to prevent the system 5500 from toppling backwards.

While only a single riser 3910 is illustrated in FIG. 55, in other embodiments multiple risers 3910 may be provided to lift the laptop 500 from the base 5405. In such case, the entire base of the laptop 500 may be lifted from the base 5405, to provide additional airflow under the laptop 500, or to simply elevate the laptop 500.

Similarly, the riser 3910, the keyboard 5410 and stabilisers 5510 are all optional features, and in other embodiments, the riser 3910, the keyboard 5410 and/or stabilisers 5510 may be omitted.

While the embodiment in FIG. 55 is shown such that the auxiliary display 125 slides up from an inside of the support member 4810, in other embodiments, the auxiliary display 125 may fold from an inside of the support member 4810, i.e. around a pivot point at or near an uppermost portion of the support member 4810 when opened. Similarly, a folding mechanism with height selection may be provided in a fashion similar to system 2200 i.e. with flexible straps, hook and loop fastening members or magnets and the like, to allow the display to both rotate up and for the user to select the height of the display. The person skilled in the art will, however, readily appreciate that there are a variety of ways to allow for a display to move between transport/storage and extended configurations, and to optionally allow the user to select the height of the auxiliary display relative to the laptop display.

Similarly, while an adjustable brace 5505 is illustrated, in alternative embodiments, a torque hinge, locking hinge, or similar device may be used to control or maintain an angle of opening of the case.

Figure 56:
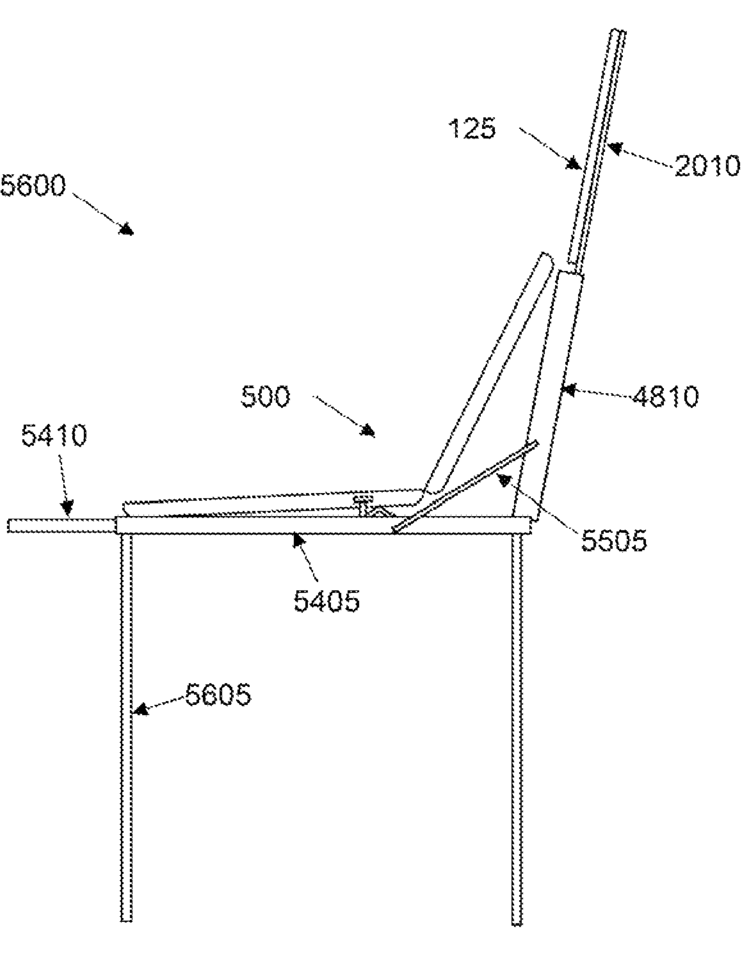
FIG. 56 illustrates a side view of a laptop display system used with the laptop of FIG. 5, according to an embodiment of the present invention.

FIG. 56 illustrates a side view of a laptop display system 5600 used with the laptop 500, according to an embodiment of the present invention.

The system 5600 is similar to the system 5500, but with legs 5005 extending downwardly from each of the corners of the base 5405.

The legs 5605 are retractable (telescopic) and/or foldable into the base 4905 for storage/transport.

The legs 5605 enable the system 5600 to be lifted, e.g. when placed on a desk. This enables the user to use the system while standing at a desk, and retract the legs 5605 to sit, providing a simple transition between sitting and standing, which is generally considered good for ergonomics.

Figure 57A:
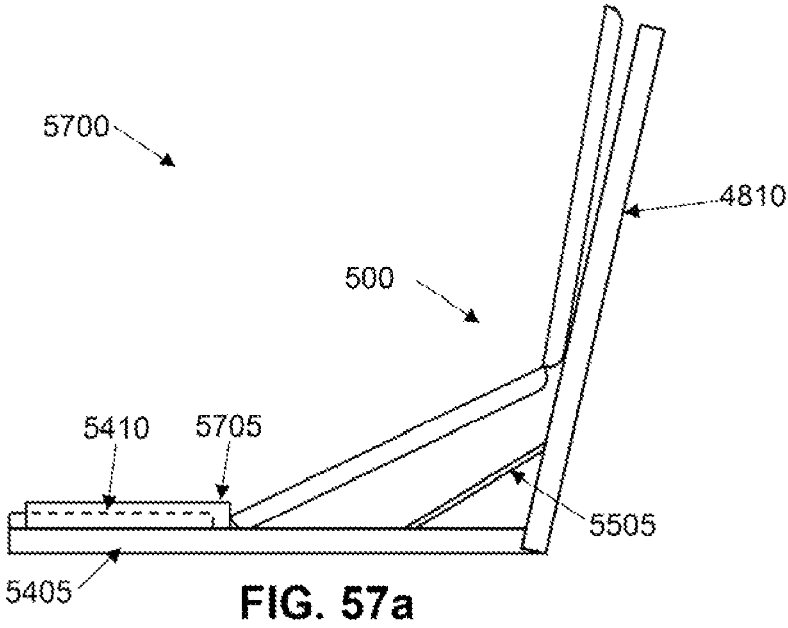
FIG. 57*a* Illustrates a side view of a laptop display system used with the laptop of FIG. 5, according to an embodiment of the present invention.

FIG. 57*a* illustrates a side view of a laptop display system 5700 used with the laptop 500, according to an embodiment of the present invention. The laptop display system 5700 is similar to the system 5500, but with the keyboard 5410 on the base 5405 and without an auxiliary screen.

The system includes first and second spacer elements 5705, on each side of the keyboard 5410. The spacer elements 5705 lift the laptop 500 from the keyboard when the laptop is closed and stored above the keyboard 5410 in a case defined by the support member 4810 and base 5405.

Figure 57B:
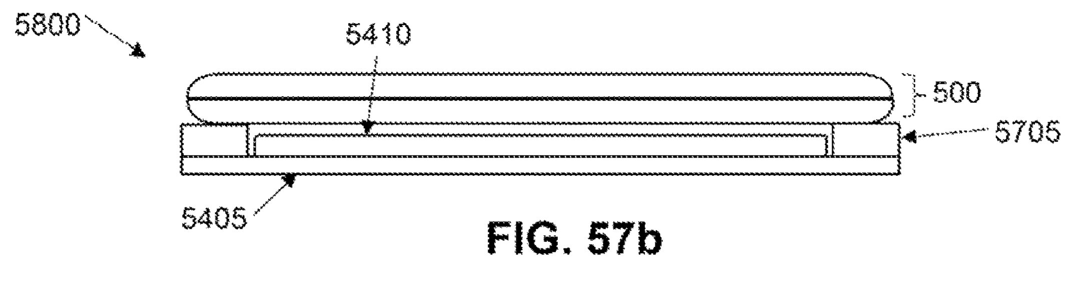
FIG. 57*b* illustrates a front view of a laptop display system used with the laptop of FIG. 5, according to an embodiment of the present invention.

FIG. 57*b* illustrates a front view of a portion of the laptop display system 5700, with the support member 4810 removed for clarity, and with the laptop 500 closed and stored above the keyboard 5410. As can be seen from FIG. 57*b*, the spacer elements 5705 are provided on edges of the base 5405, and define a keyboard receiving portion therebetween. The spacer elements 5705 are slightly higher than the keyboard 5410, and as such, the laptop is supported above the keyboard in a spaced arrangement.

The spacer elements 5705 further function as a retainer, configured to retain a front edge of a base of the laptop such that a rear of the base of the laptop is elevated from the base member 5405 and a display of the laptop is supported in an elevated position by the upper member 4810.

In some embodiments, the upper member 4810 may include a ledge (not illustrated) configured to support a rear of the base of the laptop 500 or a display of the laptop 500. Such configuration may reduce weight on a hinge of the laptop 500. In some embodiments, the ledge may be adjustable in position, to suit a wide range of laptop sizes and positions.

Although the illustration in FIGS. 57-57*b* shows the spacer elements 5705 having a rectangular cross section, in other embodiments the spacer elements 5705 may taper towards the rear, such that a rear of the spacer element 5705 is lower than a front of the spacer element 5805. The spacer elements 5705 may have a triangular, or any other suitably shaped, cross section for this purpose. Such configuration is useful in supporting the laptop at an angle.

In some embodiments, one or more further spacer elements may be provided at a rear of the base 5405, to support the laptop in a horizontal position. In such case, the further spacer elements may function also as storage compartments or pockets, for storing items such as cables. Similarly, long spacer elements may extend from a front to a rear of the case to enable store of a keyboard, trackpad, and or a variety of other items.

In some embodiments, the keyboard 5410 is releasably retained at the front of the base member 5405, e.g. using magnets, hook and loop fasteners, or the like. Such configuration may be beneficial in stopping the keyboard 5410 from moving during transport or use.

In use, the system 5700 increases ergonomics by raising the screen of the laptop, and by providing an external keyboard 5410. When stored and transported, the keyboard 5410 is protected from the laptop 500 by the spacers 5705.

As can be seen in FIG. 57*a*, the brace 5505 is provided on an inside of the base 5405 and support member 4810. Such configuration ensures that the brace 5505 does not obstruct a zipper or similar closure, closing the base 5405 and support member 4810 to form a case. The brace 5405 may, however, be on the inside or outside of the closure, as needed.

Figure 58:
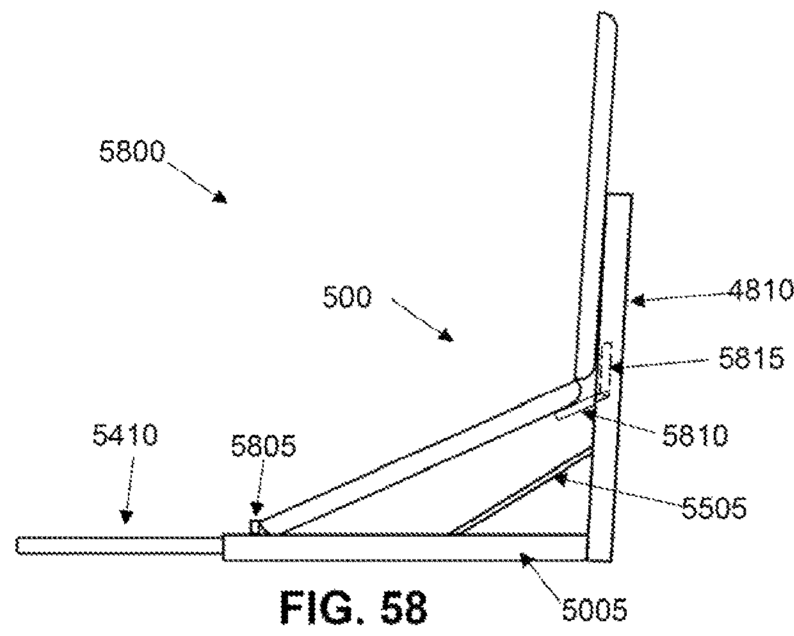
FIG. 58 illustrates a side view of a laptop display system used with the laptop of FIG. 5, according to an embodiment of the present invention.

FIG. 58 illustrates a side view of a laptop display system 5800 used with the laptop 500, according to an embodiment of the present invention. The laptop display system 5800 is similar to the system 5700, but with a slide-out keyboard 5410, that slides out from a front of the base 5405.

The system 5800 includes a retainer 5805, configured to retain a front edge of a base of the laptop such that a rear of the base of the laptop is elevated from the base member 5405 and a display of the laptop is supported in an elevated position by the upper member 4810 and a foldable ledge 5810.

The foldable ledge 5810 not only supports a rear of the base of the laptop 500, but also opens cut-outs for airflow in the support member 4810. This may help prevent the laptop from overheating.

While many laptops have air vents or heat sinks at or near a rear of the base of the laptop, in cases where air vents or heat sinks are located elsewhere, the size and location of any cut outs may be moved to suit the location of the air vents or heat sinks.

In alternative embodiments, the base may include other types of retainers, such as retaining grooves and/or a non-slip surface, for retaining a front edge of the laptop 500, to prevent the laptop 500 from sliding from the base 5405.

Figure 59:
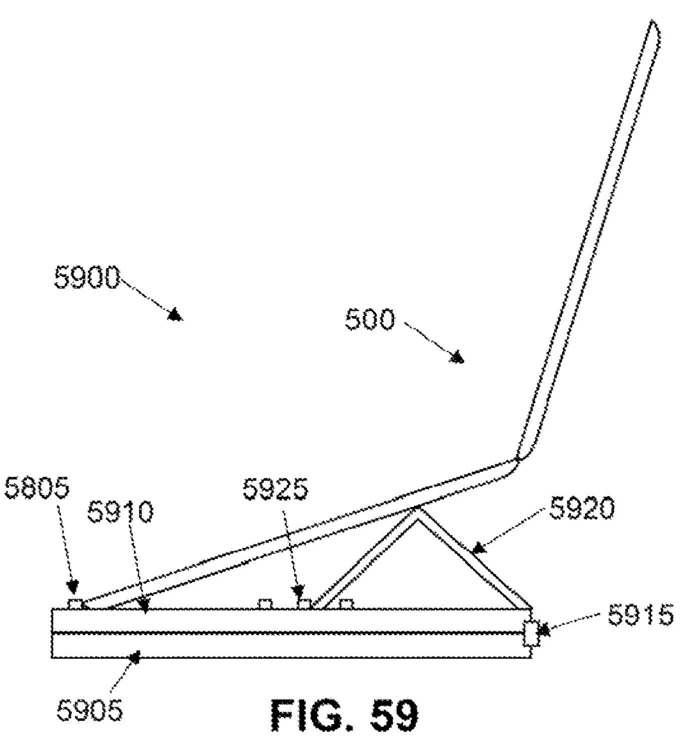
FIG. 59 illustrates a side view of a laptop display system used with the laptop of FIG. 5, according to an embodiment of the present invention.

FIG. 59 illustrates a side view of a laptop display system 5900 used with the laptop 500, according to an embodiment of the present invention. The laptop display system 5900 is similar to the systems 5700, 5800.

Uke the systems 5700, 5800 the system 5900 includes first and second panel members 5905, 5910 that comprise panels of a sleeve or bag that are able to be opened and closed around a hinge 5915. The sleeve or bag is configured to store the laptop 500 for transportation or storage, as will be readily understood by the skilled addressee.

The hinge 5915 enables the first (top in the closed configuration) panel member 5905 to fold around 360 degrees such that it is below the second (bottom in the closed configuration) panel member 5910, as outlined in FIG. 59. This both raises the second panel member 5910 and exposes the inside of the second panel member 5910, enabling it to function much like a table.

An adjustable riser 5920 is provided on an inside of the second panel member 5910 in the form of a folding panel member. The adjustable riser 5920 is attached to a rear of the second panel member 5910, and may fold such that an end of the adjustable riser 5920 engages with a retainer 5925. Different retainers 5925 are provided to enable the adjustable riser 5920 to engage with different retainers 5925, thereby providing adjustable height. Although one particular adjustable riser is illustrated, the skilled addressee will readily understand that the adjustable riser could take many forms and fold in other ways to provide adjustable height for the laptop to rest on. Additionally, the adjustable riser may have a dual purpose of being a divider/separator between a laptop and items such as a keyboard, trackpad, mouse, accessories, etc. when in the closed configuration to help stop items sliding and scraping against the laptop and each other. In such case, the adjustable riser may additionally have sections to grip/retain certain items, such as a keyboard, trackpad, mouse, etc.

Finally, a retainer 5805 is provided at or adjacent to a front of the second panel member 5910, to retain a front of the laptop 500. The retainer 5805 may take any suitable form, and any suitable location, including being defined by an inside edge of a front portion of a zipper which closes the sleeve or bag.

Figure 60:
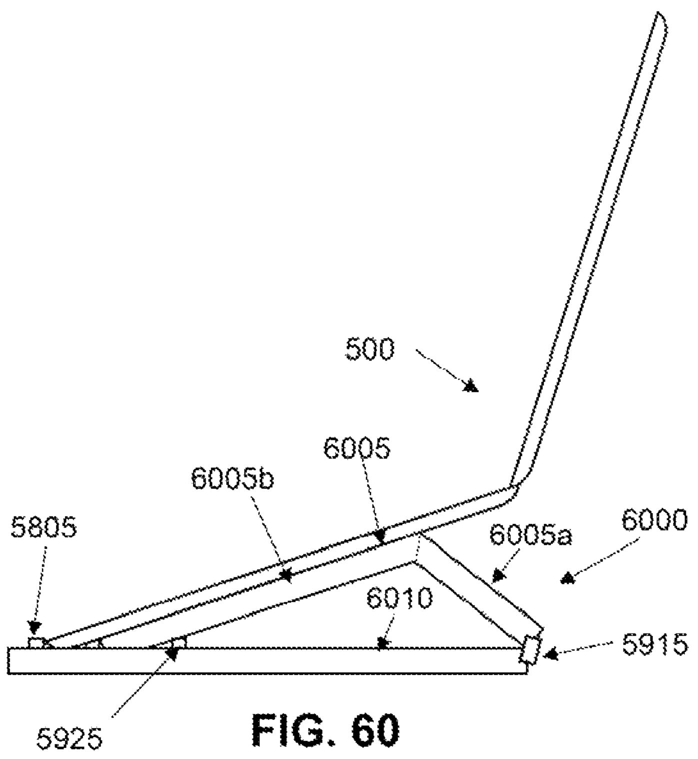
FIG. 60 illustrates a side view of a laptop display system used with the laptop of FIG. 5, according to an embodiment of the present invention.

FIG. 60 illustrates a side view of a laptop display system 6000 used with the laptop 500, according to an embodiment of the present invention. The laptop display system 6000 is similar to the systems 5900, but wherein the first panel member 6005 functions as an adjustable riser.

In particular, the system 6000 includes first and second panel members 6005, 6010 that comprise panels of a sleeve or bag that are able to be opened and closed around a hinge 5915. The first panel member 6005 folds to define first and second sub-members 6005*a*, 6005*b*.

In use, the sleeve/bag is opened, and the laptop is removed from the sleeve/bag. The first panel member 6005 is folded along a pre-defined fold line, and a front portion of the first panel member engages with a retainer 5925 of a plurality of retainers on the second panel member 6010. By engaging with different retainers 5925, the resulting "deer" may have different heights.

The laptop is then placed on the riser (i.e. the folded first panel member 6005), such that a front of the laptop engages with the retainer 5805 at or adjacent to a front of the second panel member 5910, to retain a front of the laptop 500.

In other embodiments, the case/sleeve is for storing a keyboard and/or trackpad (or similar), rather then a laptop. In such case, the case/sleeve provides a convenient way to carry the keyboard and trackpad in a protective case to avoid damage to them, while also functioning as a laptop stand, alleviating the need to also carry a separate laptop stand. In such case, the keyboard and/or trackpad may slide out from the case (similar to the manner described above), or simply be housed in a pocket or pockets defined by the case, and removed for use. In yet other embodiments, the case/sleeve is for storing a laptop, keyboard and trackpad/mouse. In such case, it has suitable pockets, dividers and/or retainers to stop the items sliding around which may also stop them from scraping against each other.

Figure 61:
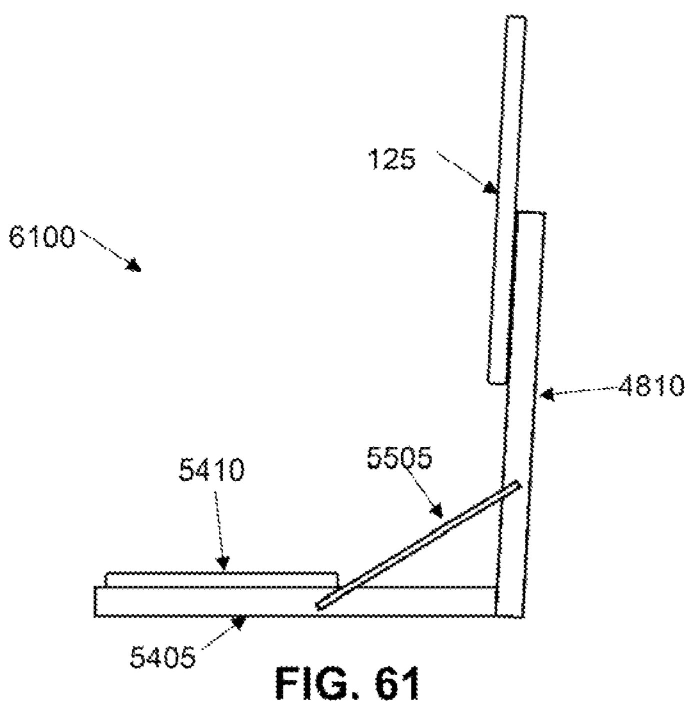
FIG. 61 illustrates a side view of a tablet computer system used with an auxiliary display in the form of a tablet computer, according to an embodiment of the present invention.

FIG. 61 illustrates a side view of a tablet computer system 6100 used with an auxiliary display 125 in the form of a tablet computer, according to an embodiment of the present invention.

The auxiliary display 125 is slidably attached to the support member 4810, such that it may be raised and lowered.

In alternative embodiments, the auxiliary display 125 is foldable around a pivot joint, like the system 4800, rather than sliding up.

The tablet computer system 6100 enables the auxiliary display 125 to be converted into an ergonomic laptop-like arrangement, where the auxiliary display 125 is lifted, providing a more ergonomic viewing angle.

The system 6100, like the other systems above, may be modified to include an extendible mouse or keyboard support, or balancers, to prevent the system 6100 from tipping.

The auxiliary display 125 may comprise a tablet, which functions as a computer with its own operating system. In other embodiments, the auxiliary display 125 may be a simple display, to which a phone, tablet or other computing device is coupled. In some embodiments, in the case of a tablet computing device, a touchscreen thereof may function as a digital keyboard when resting on the base 5405 or placed in front of the system 6100 while coupled to the auxiliary display 125.

Figure 62:
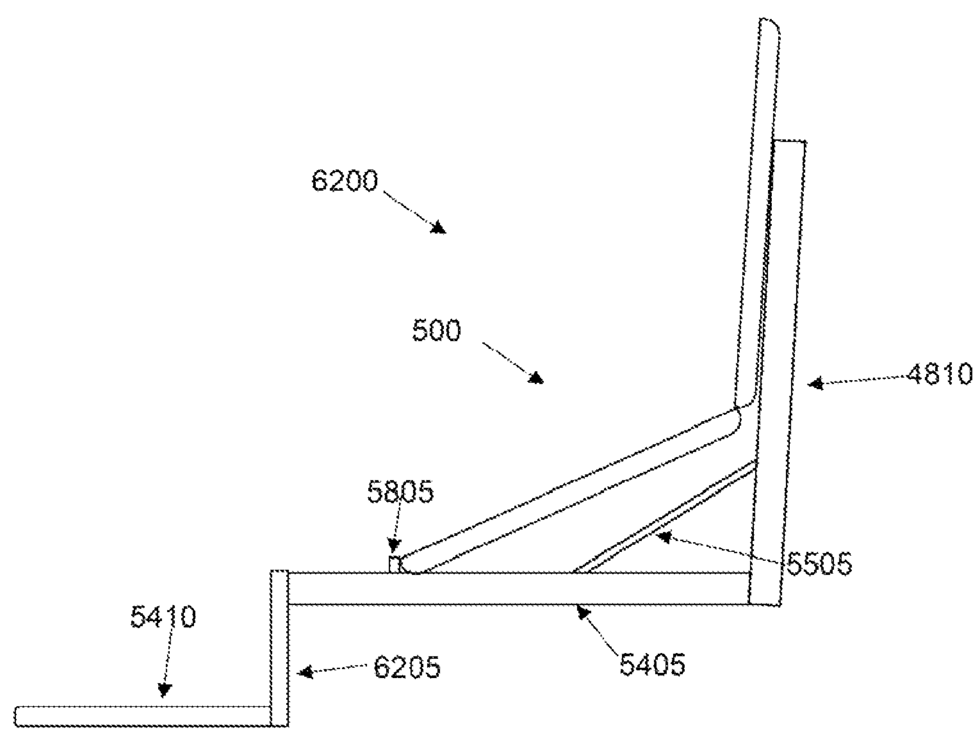
FIG. 62 illustrates a side view of a laptop display system used with the laptop of FIG. 5, according to an embodiment of the present invention.

FIG. 62 illustrates a side view of a laptop display system 6200 used with the laptop 500, according to an embodiment of the present invention. The laptop display system 8200 is similar to the system 5800, but with the keyboard 5410 being adjustable in height.

In particular, the keyboard 5410 slides out from a front of the base 5405, and is extendible in the vertical direction using a scissor mechanism 6205. The scissor mechanism 6205 enables the user to adjust a height of the keyboard to a desired height.

Such configuration is particularly useful on a high desk, where the base 5405 sits on an edge of the desk, and the keyboard 5410 is extendible down below the surface of the desk.

FIG. 83 illustrates a side view of a laptop display system 6300 used with the laptop 500, according to an embodiment of the present invention. The laptop display system 6300 is similar to the system 5800, but with first and second adjustable support members 6305, 6310.

The first and second adjustable support members 6305, 6310 are slidably and hingedly attached to the support member 4810 and the base 5405. When not used, the first adjustable support member 6305 sits flush against the support member 4810, and the second adjustable support member 6310 sits flush against the base 5405.

To enable an angle of the laptop display system 6300 to be adjusted relative to a support surface, such as a desk, table or even a user's lap, the first adjustable support member 6305 slides downwardly relative to the support member 4810, and the second adjustable support member 6310 pivots downwards around a pivot point at a front of the base 5405. Such configuration is illustrated in FIG. 63.

The first and second adjustable support members 5725, 6310 may similarly be used to provide additional support to the laptop display system 6300. In such case, the first adjustable support member 6305 may pivot outwardly around its upper edge (adjacent to the upper edge of the support member 4810), and the second adjustable support member 6310 may slide backwardly parallel to the base 5405. In such case, the adjustable support members 6305, 6310 function much like the stabilisers 5510.

In other embodiments, the adjustable support members may pivot and slide independently of each other. In certain embodiments, the adjustable support members may fold open and join to provide a platform under the laptop to raise the display system.

Figure 63:
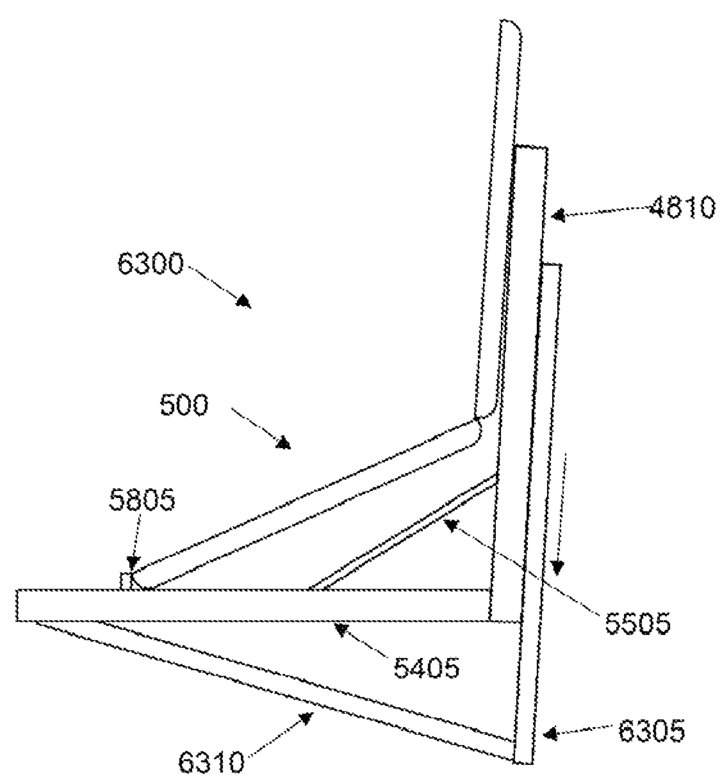
FIG. 63 illustrates a side view of a laptop display system used with the laptop of FIG. 5, according to an embodiment of the present invention.

While FIGS. 62 and 63 do not include an auxiliary display, the skilled addressee will readily appreciate that an auxiliary display may be incorporated into the case, as outlined above. Similarly, the features of FIGS. 62 and 63, such as the adjustable supports and keyboard arrangements, may be combined with other embodiments comprising a bag, case or sleeve.

While some embodiments above include integrated keyboards, in other embodiments a separate keyboard may be desirable, e.g. for use directly on a lap or desk in front of the display system.

Figures 64, 65A, 65B, 65C, 65D:
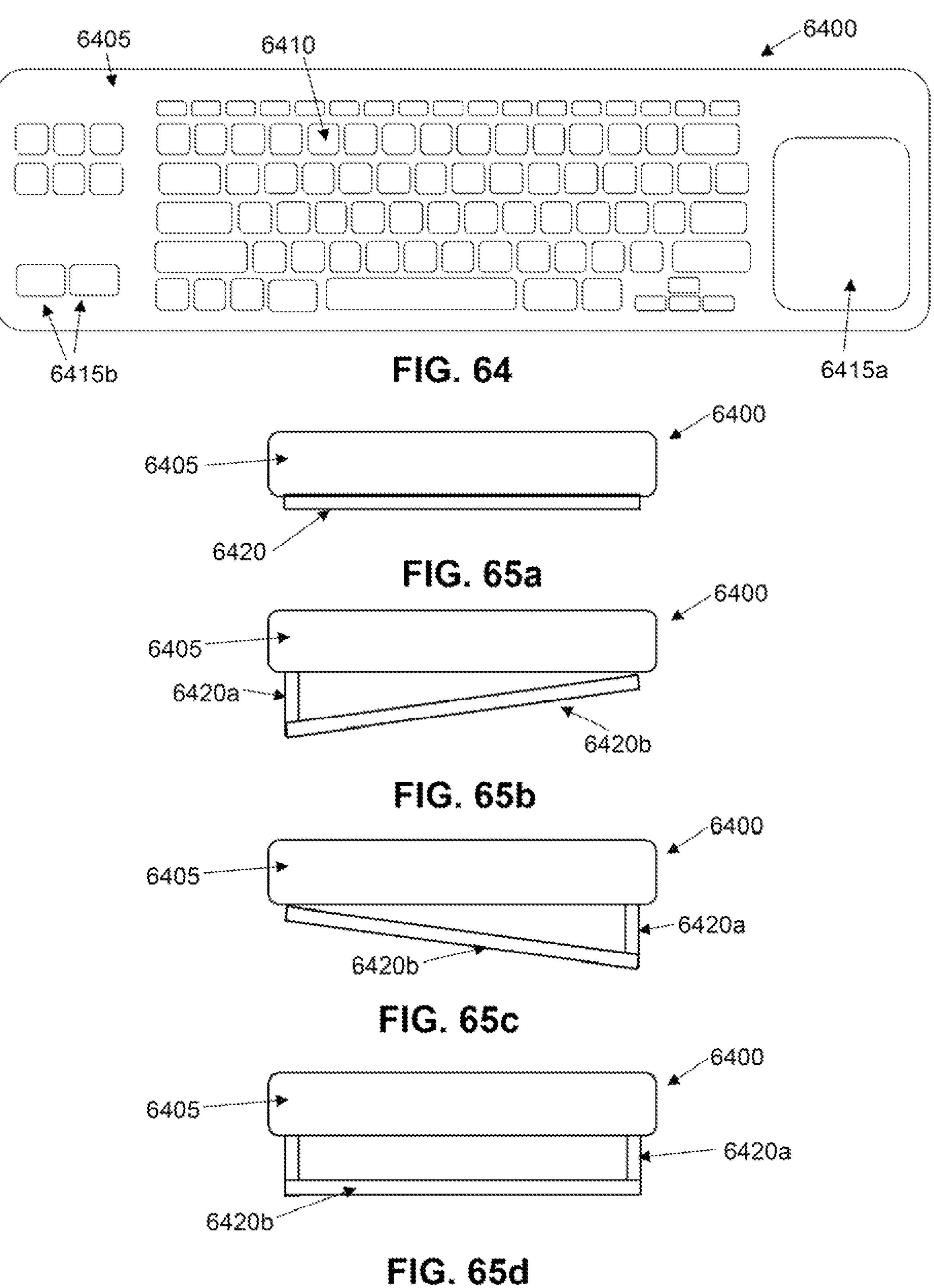
FIG. 65*a* Illustrates a side view of the keyboard of FIG. 64, showing the adjustable support in a retracted configuration.
FIG. 65*b* illustrates a side view of the keyboard of FIG. 64, showing the adjustable support in a partially extended configuration, tilting the keyboard backwards relative to a support surface.
FIG. 65*c* illustrates a side view of the keyboard of FIG. 64 showing the adjustable support in another partially extended configuration, tilting the keyboard forward relative to a support surface.
FIG. 65*d* illustrates a side view of the keyboard of FIG. 64 showing the adjustable support in a fully extended configuration, raising the keyboard relative to a support surface.

FIG. 64 illustrates a portable keyboard 6400 for use with a computing system, such as a laptop or tablet computer, according to an embodiment of the present invention.

The keyboard 6400 comprises a body 6405, on which a plurality of keys 6410 are centrally provided on an upper surface thereof. A trackpad is provided on the upper surface of the body, comprising a tactile sensor portion 6415*a* on one side of the body 6405, and a button portion 6415*b* on an opposing side of the body 6405.

Such configuration enables the keyboard 6400 to be comfortably used on a desk or lap. Unlike keyboards with trackpads on one side, and keys on the other, the keyboard 6400 is able to be centred in front of the user (e.g. on the user's legs), while the keys are also centred. Similarly, when using the trackpad, the user's hands may be positioned on each side of the keyboard 6400 (one hand on the tactile sensor portion 6415*a* on one side of the body 6405, and the other hand on the button portion 6415*b* on the other side of the body 6405), which is ergonomic and provides balance to the keyboard 6400, particularly when used on the knees or lap.

The keyboard 6400 includes an adjustable support 6420 on an underside of the body 6405 to enable an angle and height of the keyboard 6400 to be adjusted.

FIG. 65*a* illustrates a side view of the keyboard 6400 showing the adjustable support 6420 in a retracted configuration. In such retracted configuration, the adjustable support 6420 abuts an underside of the body 6405 of the keyboard 6400.

FIG. 65*b* illustrates a side view of the keyboard 6400 showing the adjustable support 6420 in a partially extended configuration, tilting the keyboard 6400 backwards relative to a support surface.

In particular, a front support leg 6420*a* of the adjustable support 6420 extends downwardly from an underside of the body 6405, angling a support surface 6420*b* of the adjustable support 6420 relative to the body 6405.

FIG. 65*c* illustrates a side view of the keyboard 6400 showing the adjustable support 6420 in another partially extended configuration, tilting the keyboard 6400 forward relative to a support surface.

In particular, a rear support leg 6420*a* of the adjustable support 6420 extends downwardly from an underside of the body 6405, angling the support surface 6420*b* of the adjustable support 6420 relative to the body 6405.

FIG. 65*d* illustrates a side view of the keyboard 6400 showing the adjustable support 0420 in a fully extended configuration, raising the keyboard 6400 relative to a support surface.

In particular, both the front and rear support legs 6420*a*, 6420*b* of the adjustable support 6420 extend downwardly from an underside of the body 6405, raising the support surface 6420*b* of the adjustable support 6420 relative to the body 6405.

While not illustrated, the keyboard 8400 may include a variety of other features, such as soft and/or gripping surfaces, and/or leg curves on the bottom of the keyboard 5800 to conform to the user's legs.

Similarly, the keyboard 6400 may include magnets to allow for easy attachment and detachment to a carry bag (e.g. a laptop carry bag or sleeve), or to one or more of the display systems above, when in use or storage. The adjustable support 6420 enables a user to adjust the keyboard 6400 in a variety of ways, to provide an ergonomic keyboard, even when used on a lap or other surface. It enables the keys to be directly in front of the user with the keyboard centred in front of the user (rather than being offset), which in turn facilitates balance on a user's lap. Furthermore, the two-handed use of the trackpad (one hand for movement on the tactile sensor and one for buttons) may reduce or avoid finger fatigue.

As outlined above, certain embodiments define a case which may store a laptop and/or display screen, together with auxiliary items such as a keyboard and/or mouse or trackpad. In some embodiments, folding panels are defined on a base of such case, to support the case above a surface.

Figures 66, 67:
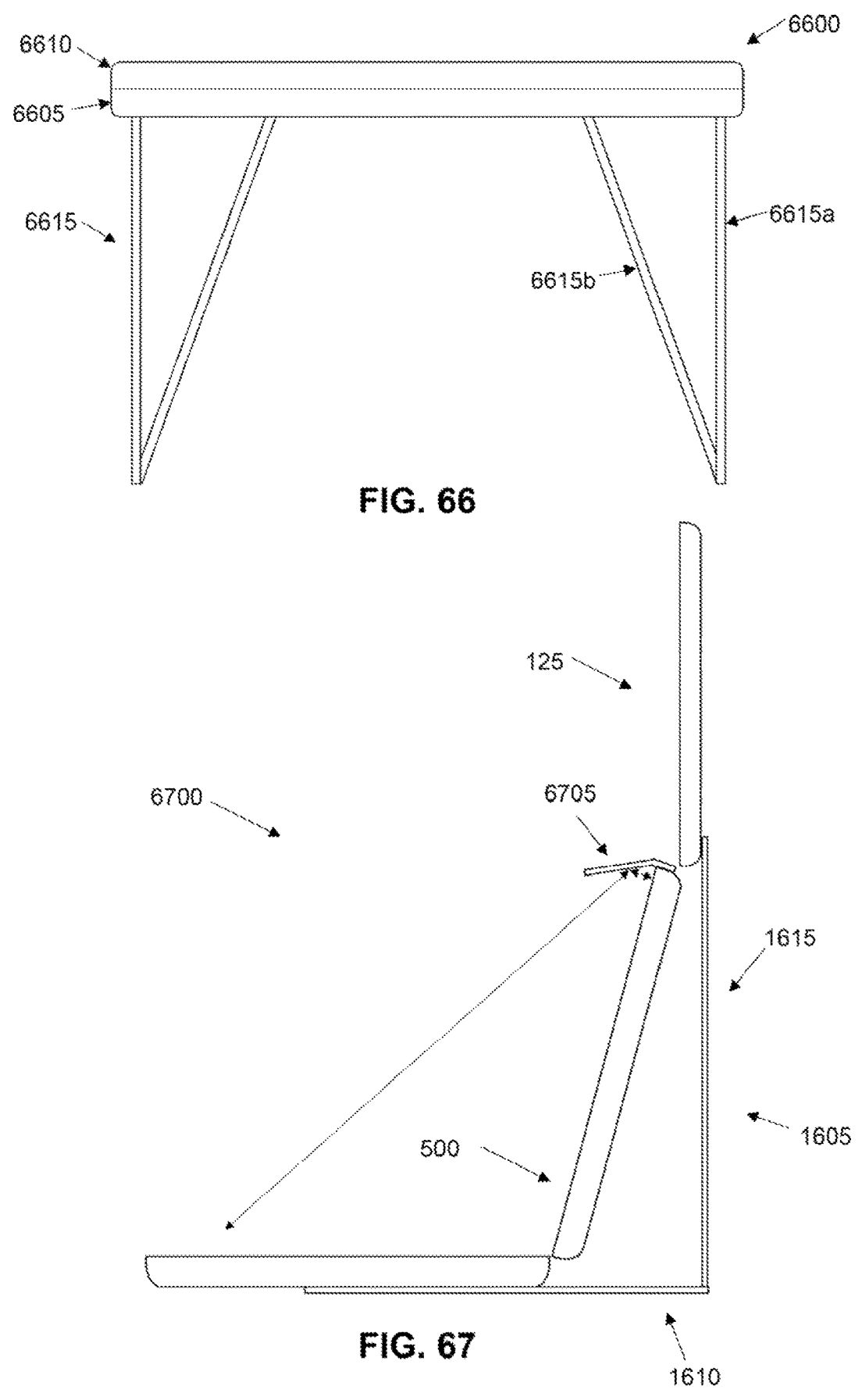

FIG. 66 illustrates a front view of a case 6600, such as the cases described above, with first and second legs 6615, supporting the case above a support surface. The legs 6615 comprise first and second panel members 6615*a*, 6615*b*, defining an inverted A-frame for supporting the case 6600.

The first and second panel members 6615*a*. 6615*b* may be foldable into a variety of configurations, e.g. to provide various heights. When not used, the first and second panel members 6615*a*, 6615*b* fold up against an underside of the case 6600.

While the case 6600 is shown in a closed configuration, the skilled addressee will readily appreciate that the case may be supported by the first and second legs 6115 even when open, e.g. when a laptop or display therein is being used, and as such, may function much like a small desk.

The legs of the case 6600 may be incorporated into other embodiments described above. As an illustrative example, the adjustable support members 6310 may include foldable legs on its lowermost surface. This would provide additional versatility to the system 6300, as it would also optionally function as a small desk.

In some embodiments, the system may include functionality to assist the user in typing, or otherwise engaging with input devices, without needing to look down at the keyboard (or input device).

FIG. 67 illustrates a side view of a laptop display system 6700 used with the laptop 500, according to an embodiment of the present invention.

The laptop display system 6700 is similar to the system 1600, but is configured to display an image of the keyboard of the laptop 500, captured in real-time, to assist the user in placement of his or her fingers relative to the keyboard.

In particular, a reflective element in the form of a mirror 6705 is attached to the laptop 500 such that the camera thereof is configured to capture an image of the keyboard thereof from above, including the fingers of the user, if positioned above the keyboard.

The image is then displayed on a portion of the display 125, or overlaid over a portion of the display 125, to assist the user in positioning their fingers relative to individual keys, and thus typing without looking down at the keyboard. This thus may improve ergonomics for the user, and/or increase typing efficiency.

While the display of the laptop is shown in an open configuration, in other embodiments, the laptop display may be partially closed such that the camera thereon is closer to and above the keyboard. The mirror 6705 will then thus also be closer to and above the keyboard, and may be angled for such use, or be adjustable in angle for such purpose.

The display of the image may be configurable by the user such that it is displayed on a selected portion of the screen, or only on demand. Furthermore, image processing may be performed of the image to cause the image to be correctly oriented and sized/shaped.

As an illustrative example, an image of the keyboard may first be captured without the user's fingers over the keyboard. The image including the user's fingers may then be overlaid (or combined) with a certain opacity over the image of the keyboard to allow the user to see the keys under their fingers, resulting in an effect that the user can partially see through their own fingers which may increase ergonomics and/or increase typing speed.

The mirror 6705 may be 'hooked' over an upper portion of the laptop, adjacent to the web camera thereof, and thereby be installed and used when desired. In other embodiments, the mirror may attach to the laptop, e.g. using adhesives or magnets and optionally tuck or fold away when not being used. e.g. behind the upper portion of the laptop, and may optionally continue to remain attached to the laptop when the laptop is closed and also while being transported.

In yet other embodiments, an external camera may be used to capture the image of the keyboard. In such case, the camera may be coupled to the stand (e.g. to the support member 1615), the laptop, or supported independently, and be directed down towards the keyboard. In such case, the mirror may be avoided altogether.

In some embodiments, the external camera may be coupled to an adjustable and/or telescopic pole, that may be positioned by the user to capture the keyboard. Such configuration may be particularly useful when different types of keyboards are used.

In other embodiments, a foldable frame may be provided to provide a support for a camera directly above the keyboard. In such case, the camera may be positioned directly above the keyboard, alleviating or at least reducing the need to post process the captured image.

In some embodiments, the system may be configured to automatically show/hide the image of the keyboard when the users fingers appear over the keyboard. For instance, the system may detect a change in the real-time image captured by the camera indicating that the users fingers are over the keyboard and hence show the image of the keyboard. Likewise, when the system does not detect a change (or detects minimal change) in the real-time image, this indicates that the user's fingers are not over the keyboard and the image may be hidden. Alternatively, the system may detect the presence of human fingers and show or hide the image accordingly. This enables the system to benefit the user when needed, while not using any space on the display when the keyboard is not being used.

Similarly, the system may be configured to move the image of the keyboard to different parts of the display 125, depending on what the user is doing or what software program the user is using.

While the above example is illustrated with reference to the keyboard of the laptop, the skilled addressee will readily appreciate that the teachings thereof may be applied to any keyboard, including an external keyboard, or other input device.

Several of the embodiments described above relate to stands that include different combinations of features. Any of these features may be combined, including features of highly portable stands and more furniture-like embodiments. In one embodiment, the folding stands described above are adapted to include a base member in the form of a laptop support panel.

Figure 68:
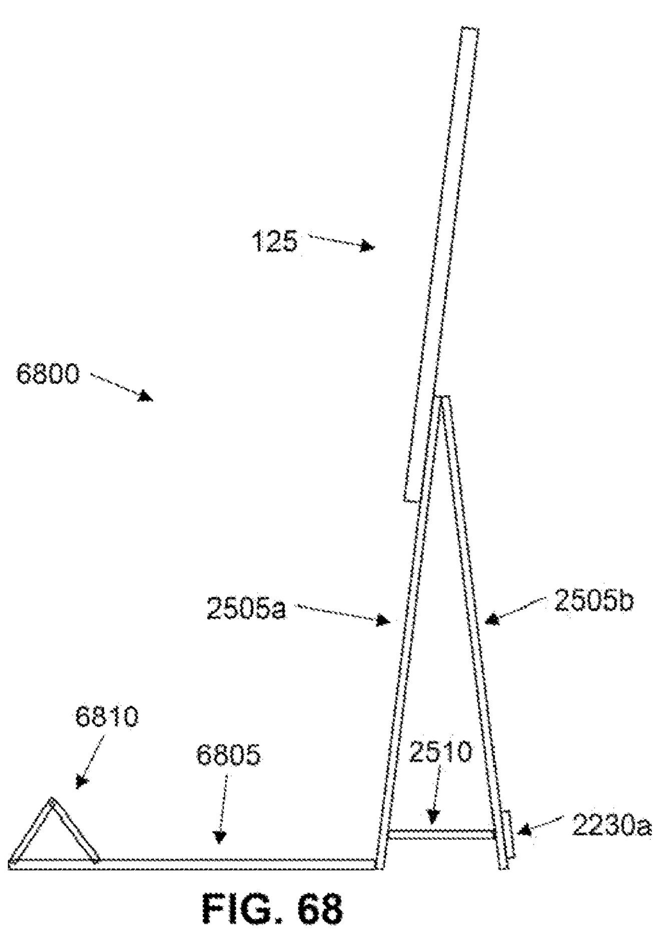
FIG. 68 illustrates a side view of a laptop display system, in an open configuration, according to an embodiment of the present invention.

FIG. 68 illustrates a side view of a laptop display system 8800, in an open configuration, according to an embodiment of the present invention. The laptop display system 6800 is similar to the system 2500, but includes a laptop support panel.

In particular, the laptop display system 6800 comprises an auxiliary display 125, configured to be used with a laptop (not illustrated), and is supported by a stand comprising panel members 2505*a*, 2505*b*. The first panel member 2505*a* extends downwardly from the auxiliary display 125, and the second panel member 2505*b* opens around an upper edge of the first panel member 2505*a* to form an A-frame shape. A brace 2510 extends between lower ends of the first and second panel members 2505*a*, 2505*b*, to support the first and second panel members 2505*a*, 2505*b* in an open configuration.

A laptop support panel 6805 folds downwardly from a front of the first panel member 2505*a*, such that the laptop support panel 6805 extends outwardly from a bottom of the first panel member 2505*a*. In particular, the laptop support panel 6805 is hinged at a lower end of the first panel member.

The laptop support panel 6805 may be selectively used, and when not in use, function as a single panel member with the first panel member 2505*a*. As such, the systems 6800 and 2500 may function in an identical manner when the laptop support panel 6805 is not used.

A lockable hinge may connect the laptop support panel 6805 to the first panel member 2505*a*. This lockable hinge may be configured to lock at one or more predefined positions (e.g. 90 degrees, 100 degrees), e.g. using magnets. Alternatively, the hinge may be configured to restrict opening beyond a certain angle (e.g. 90 or 100 degrees). Such configuration provides additional support to the system as the weight of the laptop may stabilise the system.

An adjustable riser 6810 is provided at a front of the laptop support panel 6805, for lifting a rear of a laptop, such as the laptop 500. The adjustable riser 8810 is also foldable, and can fold upwardly from an inside edge of the laptop support panel 6805. While not illustrated, several ridges or channels may be defined, in which the ends of the riser 6810 may engage. The ridges or channels are spaced along a length of the laptop support panel 6805, therefore enabling the adjustable riser 6810 to be spread over a greater or smaller area (thus increasing or reducing its height). Each of the ridges or channels may include magnets or other retaining means for retaining the adjustable riser 6810 in position.

In use, the laptop is positioned on the laptop support panel 6805, such that a rear portion of the laptop sits on the adjustable riser 6810 (if used), and the screen of the laptop extends up to just under the auxiliary display 125. Such configuration may be useful in lifting the display, as well as providing airflow under the laptop.

In some embodiments, the screen of the laptop may engage with a lower edge of the display 125, or with an upper portion of the first panel member 2505*a*, to provide additional support thereto.

While the above system 6800 is similar to the system 2500, the skilled addressee will readily appreciate that the teachings of the system 6800 may be applied to other systems, including the system 2700 and the system 3400.

In some embodiments, the primary display and the auxiliary display may be treated as a single, larger display. This not only has benefits of having larger work areas, but also the camera 510 of the laptop being centrally located in this display area.

Figure 69:
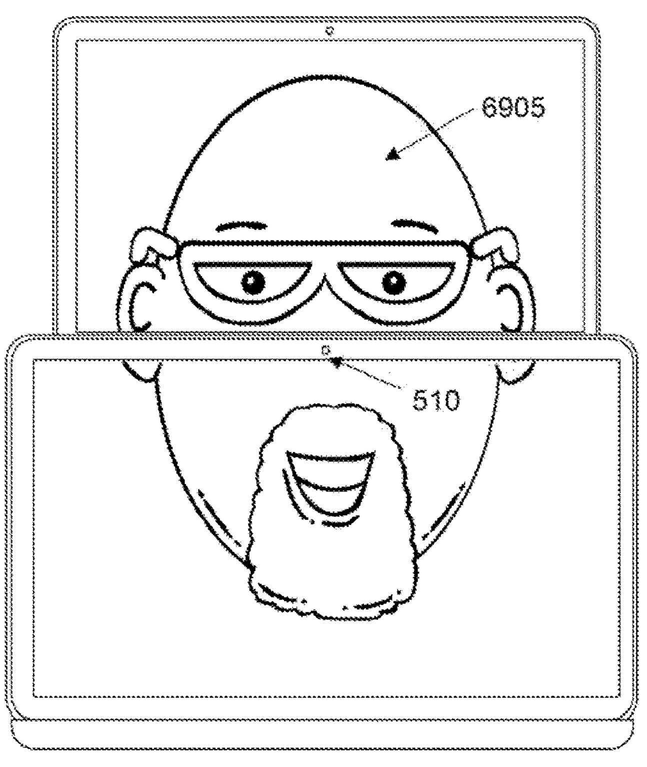
FIG. 69 illustrates an exemplary configuration of the laptop of FIG. 5 with the display system of FIG. 1 thereon, in a video conferencing context.

FIG. 69 illustrates an exemplary configuration of the laptop 500 with the display system 100 thereon, in a video conferencing context.

As can be seen, the video conferencing image 6905 is split across the primary display of the laptop and the auxiliary display. This positions the camera 510 centrally in the video conferencing image, and immediately adjacent to the eyes of the other user.

Such configuration enables video conferencing to be provided in a manner that helps provide eye contact between users, without the need for video manipulation, which has several potential issues, including in relation to the interpretation of emotions and body language.

While the camera 510 is positioned immediately below the eyes in the example of FIG. 69, the camera 510 may be positioned directly above the eyes, or at the eyes.

In some embodiments, the face of the participant may be automatically positioned relative to the camera 510. In such case, software on the laptop may use facial recognition to identify the participant, and automatically move the face to position the eyes of the participant relative to a location of the camera.

In some embodiments, the user of the laptop may set parameters, such as how close he or she wishes the eyes (or another part of the face) to be placed to the camera.

In other embodiments, the user may manually move the face of the participant using drag and drop, or any other suitable user interface.

While the edge of the laptop housing which includes the camera 510 is relatively thick, in other embodiments, the display may extend substantially to an edge of the housing, resulting in only a very small strip of non-display area between the primary and auxiliary displays.

While the above embodiments illustrate an auxiliary display that extends vertically above the primary (laptop) display, in other embodiments, the auxiliary display may extend outwardly from a side of the laptop, in a side-by-side arrangement. Similarly, displays may slide out from each other in a nested arrangement in either or both of the horizontal and vertical directions. In one embodiment, a first display may slide out from behind the primary (laptop) display (e.g. vertically), upon which one or more other displays may slide out from behind the first display (e.g. horizontally).

Similarly, while several of the above embodiments illustrate an auxiliary display that slides out from the housing of the display system, in other embodiments other configurations may be used, including fold-out and flip-up arrangements.

In some embodiments, the auxiliary display is provided in portrait mode (i.e. its longest side in the vertical direction). This is particularly useful for code and documents with many lines, as mentioned above. In certain such embodiments, the housing may have the ability to move between landscape or portrait mode for the auxiliary display, e.g. through rotation.

In certain embodiments, the display systems may include multiple auxiliary displays, including displays which slide out in at least two different directions (e.g. to the side and above).

In some embodiments, the auxiliary display is configured to identify when it is in the storage configuration, and automatically turn off or go into hibernation mode. Similarly, the auxiliary display may be configured to automatically turn on when opened.

In certain embodiments described above, a keyboard is shown as sliding out from the case. In some embodiments, a multi-directional sliding arrangement may be provided where the keyboard and/or trackpad slides out from the case, and then slides left or right, to enable the keyboard and/or trackpad device to be comfortably positioned.

In some embodiments, a keyboard/trackpad support may be removable from the case, to provide a comfortable support for the keyboard/trackpad, for example on a user's lap. In such case, the keyboard/trackpad may be slidable relative to the support, to enable the keyboard to be comfortably positioned. The support may include ledges, rails, slots and/or magnets to guide and retain the keyboard/trackpad in place.

While the laptop and auxiliary display may include their own batteries or power source, in some embodiments, the housing of the display systems includes rechargeable batteries for at least partly powering the auxiliary display and/or laptop.

The housing of the display system may be rigid and also function to protect the laptop, much like a hard-shell laptop case. A protective hard-shell case may be provided on a keyboard portion of the laptop.

As the display system may fit snugly and tightly around the laptop and auxiliary display, it may be manufactured to fit a particular model of laptop and display/tablet. As a result, display systems may be provided of different sizes to suit different laptops, displays and/or tablets.

The display system may comprise an integrally formed main body which comprises the laptop display retainer and display channel. The display system may comprise an integrally formed auxiliary housing for the auxiliary display which engages with the display channel. In such case, different main bodies and auxiliary housings may be chosen according to the desired laptop and auxiliary display combination, and may engage with each other in a modular manner (i.e. different main bodies and auxiliary housings may engage with each other in the same way).

In alternative embodiments, an auxiliary housing may be provided in which an auxiliary display is permanently or semi-permanently attached. This enables the auxiliary housing to be made independently of the display technology ultimately used.

In some embodiments, the auxiliary display is held in place by a gripping rubber/soft plastic cover around the edges, by magnets that exist inside the housing and/or auxiliary display, and/or any other suitable means.

In some embodiments, the housing may be designed to be able to grip and utilise several different models of auxiliary displays. This may be performed using adhesives, engaging with magnets or ferrous metal already in the auxiliary display, or gripping just the lower edge of the display, for example. A conversion kit may be provided, enabling the user to attach his or her own auxiliary display.

Several embodiments described above utilise magnet coupling mechanisms. The skilled addressee will readily appreciate that any suitable combination of magnets and ferrous metals may alternatively be used, including by swapping the positions of magnets and ferrous metal elements, and/or utilising matching magnets.

The body 105 may be integrally formed of rigid plastic. In some embodiments, ABS plastic may be used. In other embodiments, polycarbonate may be used. Such materials are generally robust, lightweight and impact resistant. In some embodiments, textured fabric or other material may be applied to the rigid plastic to give a different appearance or texture to the body.

The systems may include a variety of accessories, not illustrated, such as powered fans, lights, and even pouches, pockets, and the like. As an illustrative example, a pocket may be provided for storing a keyboard for use with the system.

Advantageously, the display systems described herein are easy to install onto laptop computers, and may minimally alter the characteristics of the laptop when the auxiliary display is in the retracted (storage) configuration. As such, the display systems may be semi-permanently attached to laptops and simply used when needed.

As some of the display systems cover a rear of the display of the laptop, and engage with a periphery of the laptop display, force may be equally distributed across the entire laptop display. Clamping members, for example, which attach to parts of displays, are more likely to damage the displays, and are not aesthetically pleasing.

The auxiliary displays are easy to use, and in some embodiments can simply be slid up into position, and used directly, i.e. without the need to connect any wiring. Similarly, the display systems may simply be pressed onto and thus clipped onto the laptop.

The embodiments enable the auxiliary displays to align nicely with the top of the laptop display, thereby providing an almost continuous viewing area. The primary display of the laptop may be configured to extend continuously to the auxiliary display, providing a function much resembling a larger display.

The auxiliary display may comprise a tablet computer, which enables the user to choose technology that suits his or her needs. The tablet computer may be removable from the display system for use independently of the laptop.

Certain embodiments enable the user to tilt the auxiliary display to a certain angle and also lock in place, so it doesn't have to be exactly aligned (parallel) with the laptop display. In some embodiments, the auxiliary display may be positioned between 70 and 120 degrees relative to horizontal (or the laptop base). This further adds to the ergonomics of the system.

Figures 70, 71:
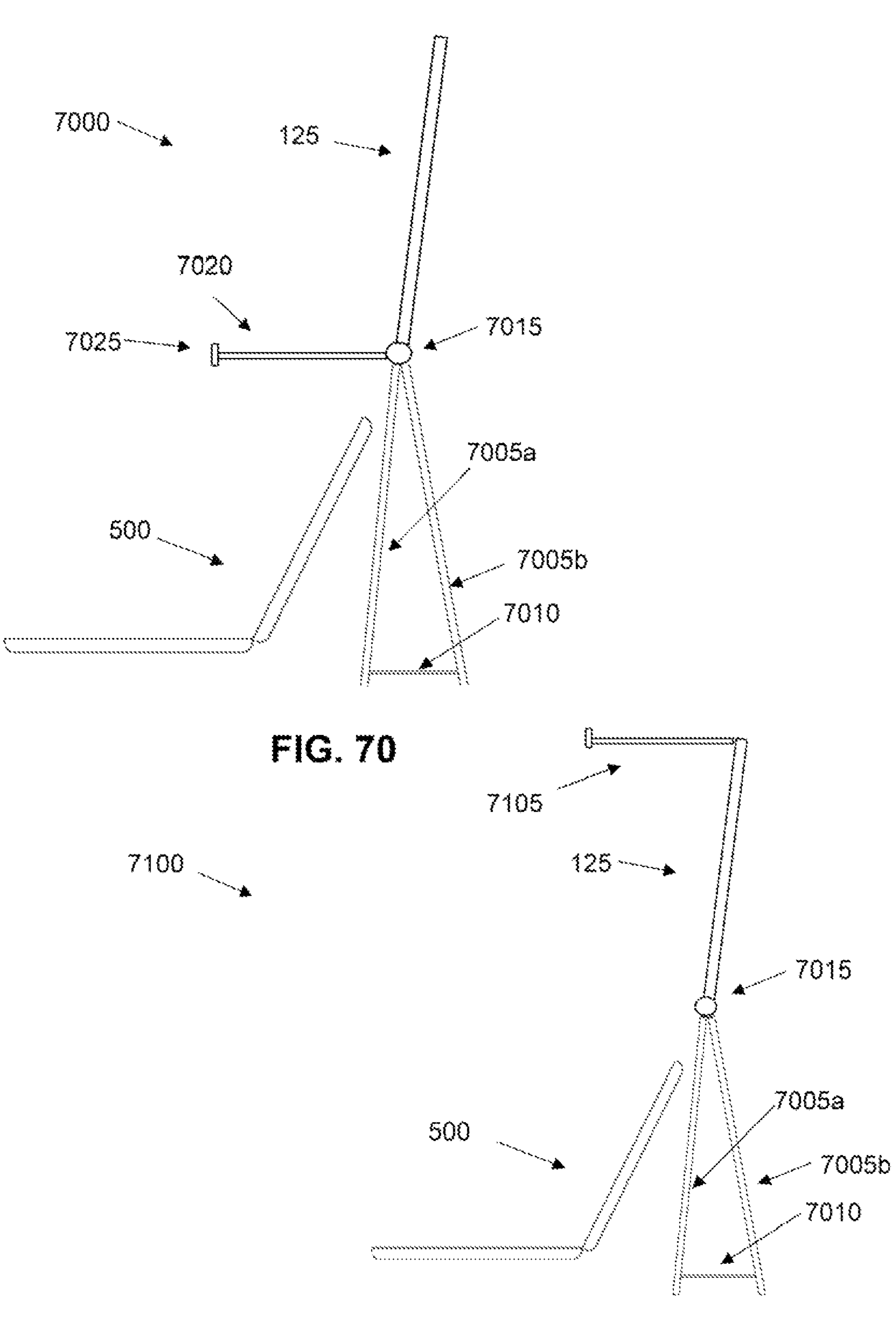
FIG. 70 illustrates a side view of the laptop of FIG. 5, closed with the laptop display system of FIG. 1 installed and in a retracted (storage) state.
FIG. 71 illustrates a side view of a laptop display system used with the laptop of FIG. 5 with a camera extension, according to an embodiment of the present invention.

FIG. 70 illustrates a side view of a laptop display system 7000 used with the laptop 500 of FIG. 5 with a camera extension 7020.

The display system 7000 includes a camera 7025 coupled to the camera extension 7020. The camera 7025 may be coupled to the laptop 500 or the auxiliary display using any suitable means, such as a wired (e.g. USB) connection or a wireless connection.

The camera extension 7020 is linear and solid, but in other embodiments may be flexible. The skilled addressee will appreciate that the camera extension 7020 may include a frame or casing made of resilient material to enable the camera extension 7020 to flex, thereby enabling the camera to be directed in different directions.

The camera 7025 and camera extension 7020 are preferably small so as not to obstruct visibility of the display 125 and/or the laptop display.

The camera extension 7020 may be manufactured from a transparent material, to further prevent the extension 7020 from obstructing the auxiliary display 125 and/or the laptop display.

The camera 7025 may be hingedly connected to the camera extension 7020 to enable rotation of the camera without the need to move the camera extension 7020. Such configuration may enable the camera to be directed downwardly, e.g. towards the keyboard, and/or outwardly from the display, e.g. towards a face of the user. Such configuration enables the camera to be used when typing, as outlined above, and for video conferencing.

It is envisioned that in some embodiments the camera 7025 will be positioned in front of the auxiliary display 125 or the laptop display to assist with maintaining eye contact in the video conferencing setting.

The camera extension 7020 may extend from along the length of the hollow tube 7015 to assist with cable management and portability. The hollow tube 7015 may have a number of cut out portions along its length to facilitate access to the camera extension 7020, or other accessory wires.

The camera extension 7020 may be retractable inside the hollow tube 7015. The camera 7025 and camera extension may include a light. Aspects of the light such as brightness and hue may be adjustable by a user via the laptop, auxiliary display, the light itself or controls, such as buttons, located anywhere on the system.

In some embodiments, the light may be located on the camera 7025. In an alternative embodiment, the light may extend radially from along the length of the hollow tube 7015 separate to the camera extension 7020.

The skilled addressee will appreciate that the camera extension 7020 may extend from below the hinge 7015 or above the hinge 7015 and on the display portion 125. In an embodiment, the camera extension 7020 may extend from an upper portion of the first panel member 7005*e*.

The laptop display system 7000 is supported by first and second panel members 7005*a*, 7005*b*, with a brace 7010 extending between the lower ends of the first and second panel members 7005*a*, 7005*b*.

In some embodiments, the hollow tube 7015 may not be present. In such cases, the camera 7025 and the camera extension 7020 may be stored in a section of the first panel member 7005*a* or the display 125 when not in use.

It will be understood that the camera 7025 and camera extension 7020 may be used as described in the laptop display system 7000 or may be used in any of the systems disclosed herein.

FIG. 71 illustrates a side view of a laptop display system 7100 used with the laptop 500 of FIG. 5 with a camera extension 7105.

Similar to the laptop display system 7000, the camera extension 7105 may be linear and solid. The skilled addressee will appreciate that the camera extension 7105 may comprise resilient material to enable a bent configuration.

In a closed configuration, the camera extension 7105 may be stored in the display 125.

The camera extension 7105 may extend firm the display 125. Alternatively, the camera extension 7105 may be an accessory to the system 7100. In such instances, the associated cables of the camera 7025 and camera extension 7105 may be housed in the hollow tube 7015.

The camera extension 7105 may be positioned in front of the display 125 to improve eye contact in a video conferencing setting. The camera extension 7105 may extend downwardly from the top of the display 125.

Figure 72:
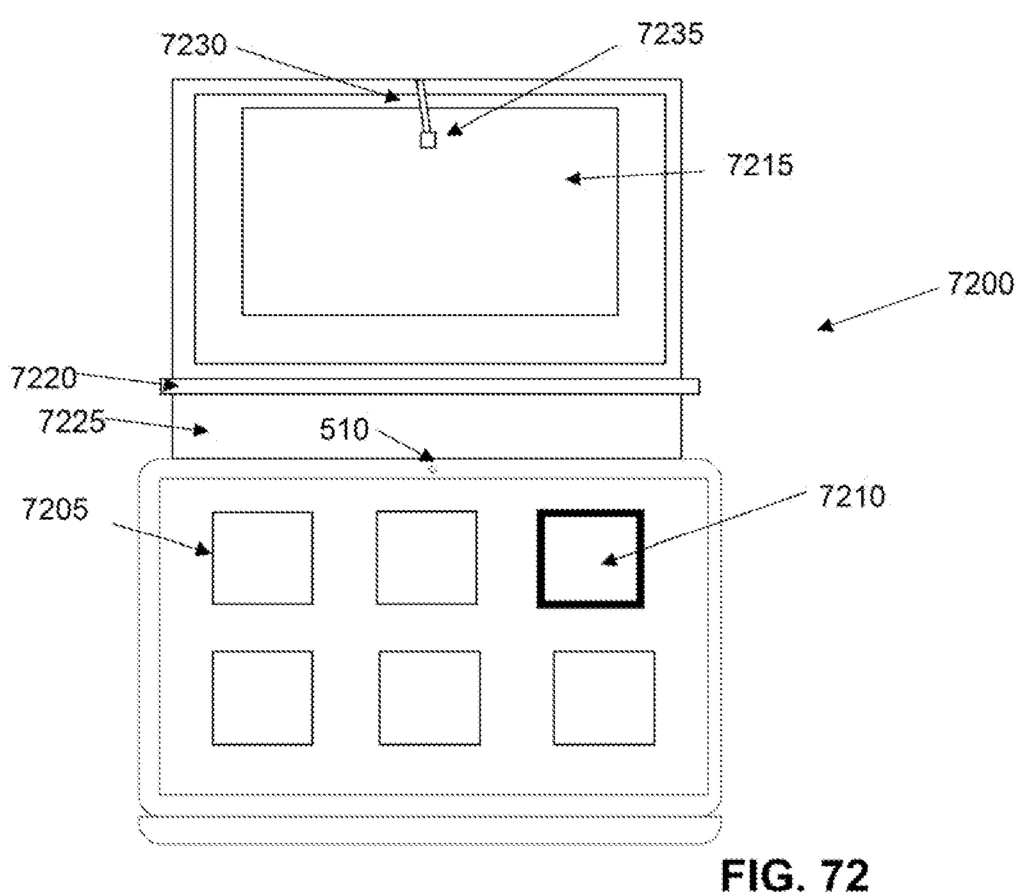
FIG. 72 illustrates an exemplary configuration of the laptop of FIG. 5 with the display system of FIG. 1 thereon, in a video conferencing context.

FIG. 72 illustrates a front view of a laptop display system 7200 used with the laptop of FIG. 5 in a video conferencing context. The system 7200 is similar to the system 7100.

In the laptop display system 7200, an active participant (e.g. a person speaking, or selected in another manner, as outlined below) may be highlighted using an active person highlight element 7210.

The active participant may be determined by a user selecting the participant 7205 using a mouse or trackpad, switching through participants with the keyboard. Alternatively, the active participant may be determined based on the username of the participant, the participant currently speaking, eye detection to determine who a user is looking at, or a combination of the above.

Analysis of video input from the camera and/or the webcam may be employed to determine the active participant.

Furthermore, the active participant is displayed on an enlarged display 7215.

Similar to the laptop display system 7100, the system 7200 includes a hollow tube 7220 and a first panel member 7225. A camera 7235 extends from a camera extension 7230 similar to the camera and extension systems described earlier.

Figure 73:
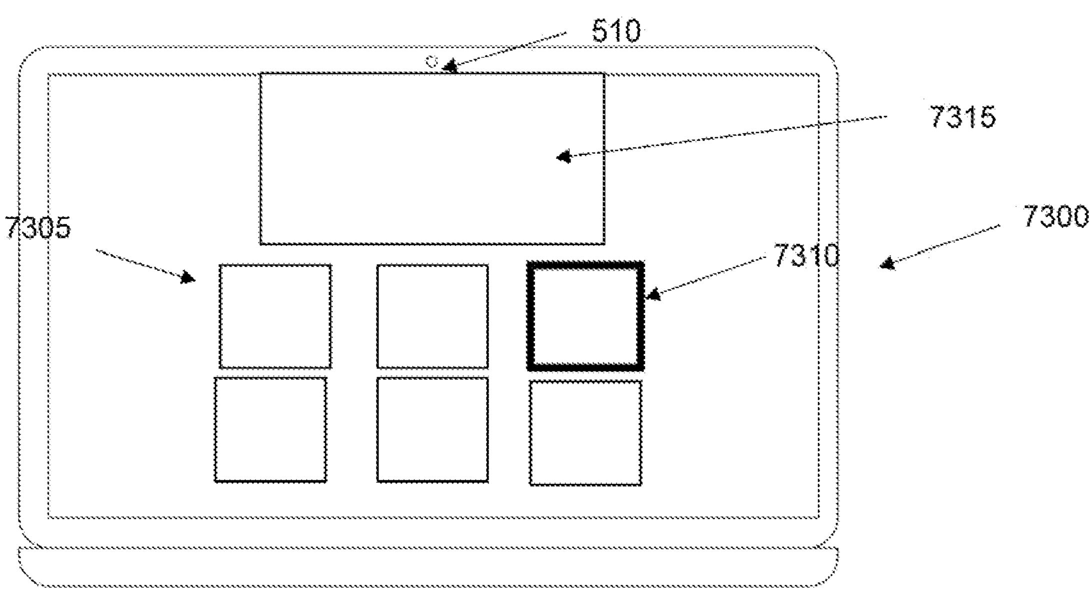
FIG. 73 illustrates an exemplary configuration of the laptop of FIG. 5, in a video conferencing context.

FIG. 73 illustrates an exemplary configuration of the laptop of FIG. 5, in a video conferencing context 7300.

FIG. 73 is similar to FIG. 72, however, does not require accessories to the laptop 500. In this embodiment, the video participants are represented by squares 7305. When a video participant is active, the corresponding square may be highlighted 7310.

Highlighted video participants 7310 will be enlarged and moved to a central position 7315 that is closer to the camera 510.

By enlarging and moving the active participant closer to the camera 510, eye contact between users will be improved.

It will be understood that the video feed of the active participant may remain the same size or may be smaller. In embodiments where the video feed of the active participant is smaller, there will be less space between the eyes of the active participant and the camera which may result in improved eye contact.

When a speaking participant 7310 is elevated to a central position 7315, the original highlighted square 7310 may be replaced by another participant 7305.

It will be understood that the active participant may be shown via a number of means not limited to highlighting. In some instances, the active participant may not be identified in any way, for example, where the video conference is limited to two participants.

Figure 74:
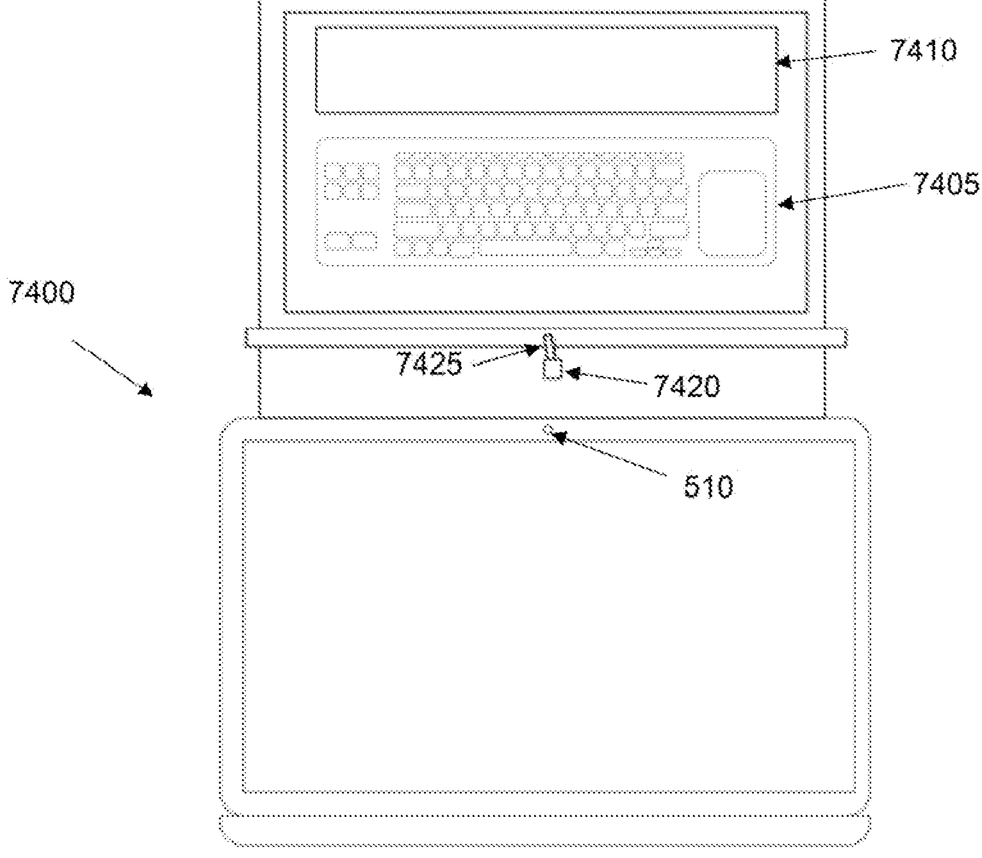
FIG. 74 illustrates an exemplary configuration of the laptop of FIG. 5, with a typing assistant.

FIG. 74 illustrates a front view of a laptop display system 7400 used with the laptop of FIG. 5. The system 7400 is similar to the system 7200.

The typing assistant may be used in combination with the laptop display systems 7000 or 7100. The skilled addressee will appreciate that the typing assistant of the present invention may be used on any hardware.

The typing assistant is configured to mirror an image of the keyboard of the laptop 500 with the users fingers thereon, on the auxiliary display, to avoid the need for a user to look down at the keyboard.

In particular, the typing assistant captures an image of the keyboard using the camera 7420 and may overlay that image with the video feed of the keyboard 7405 allowing the user to partially see through their own fingers. This allows the user to see the keys of the keyboard which would otherwise be obstructed by their fingers. It will be understood that the typing assistant may operate in a similar manner to the laptop display system 6700. In an embodiment, the camera 7420 is adjustable via the camera extension 7425.

The skilled addressee will appreciate that in alternative embodiments, a reflective element may be attached to the laptop 500 similar to the laptop display system 6700 such that the camera of the laptop 500 is configured to capture an image of the keyboard from above.

The typing assistant may detect the keyboard in the image and utilise the portion of the image which contains the keyboard, discarding the rest of the image. The typing assistant may additionally adjust the images to achieve the correct orientation and alignment.

Combining the image with the video feed may be achieved by any suitable method such 8*s* overlaying the image over the video feed at a certain opacity, overlaying the video feed over the image at a certain opacity, or otherwise combining the image and video feed to create an effect where the user can partially see through their own fingers to view the keys which would otherwise be obstructed.

The typing assistant may preview typed text in the area highlighted by the rectangle 7410.

The typing assistant may determine which key was pressed by the video analysis or by the input from the keyboard, or a combination of both.

The typing assistant may give feedback to the user if the finger used to select a key is not optimal having regard to accepted techniques, ergonomic standards, behaviours of the user, the task being performed, defined KPI's or target typing rates, or a combination of the above.

In some embodiments, the typing assistant may identify the text needing to be typed and may pre-emptively highlight the appropriate fingers to type with before a user begins typing. It may also highlight the keys to be pressed on the image of the keyboard making it easier for the user to locate the keys. Additionally, the typing assistant may highlight the finger the user should have used after failing to use the correct finger to press a key.

The typing assistant may analyse hand position and detect when a users hands are improperly spaced or have become maladaptively positioned. In such instances, the typing assistant may display tips to enable a user to move their hands into a more appropriate position.

In an embodiment, the typing assistant may prevent a user from typing if their hands are inappropriately positioned. Further, the typing assistant may require the user to complete a short course or view an instructional video before resuming typing.

In an embodiment, the typing assistant may detect that the image of the keyboard does not align with the video feed. This may happen over time or after a bump or knock of the system, laptop or support surface. The typing assistant may correct this via a number of different techniques, such as: adjusting the image via skewing, distorting, shifting, zooming, cropping, etc. Alternatively, it may re-capture the entire image, or parts of the image, when the user moves their hands from over the keyboard, or parts of the keyboard.

The typing assistant may monitor and analyse cursor location, rate of clicks, or eye movement of the user to detect the task being performed by the user and automatically arrange software windows and active portions of software windows to be more ergonomic based on the specific task. In an embodiment, a camera directed to the user (such as the webcam of the laptop) may be employed to monitor the eye movement of the user and/or the posture of the user to help determine the arrangement. In another embodiment, the typing assistant may ignore or otherwise restrict the input from the keyboard if the user is looking down at the keyboard. In such instances the typing assistant may display alerts to encourage the user to look up at the screen to be able to resume typing.

In an alternative embodiment, the typing assistant tracks how often the user looks down at the keyboard and/or how often they use incorrect fingers to press keys and may provide statistics, tips and/or gamify improving typing speed and/or ergonomics.

System 7400 illustrates the video feed of the keyboard 7405 toward the lower portion of the auxiliary display. In alternative embodiments, the video feed of the keyboard 7405 may be positioned on the upper portion of the auxiliary display or on the laptop display.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A portable laptop display system for use with a laptop computer, the portable laptop display system including: an auxiliary display configured to be coupled to the laptop computer; a support assembly, coupled to the auxiliary display, the support assembly movable between a transport configuration and an extended configuration, the support assembly comprising: a rigid panel member, and a support member, wherein the rigid panel member and the support member define a base of the support assembly, and wherein in the transport configuration the rigid panel member extends across an entire front surface of the auxiliary display; and in the extended configuration, the rigid panel member supports the auxiliary display in an elevated position, such that when in use with the laptop computer the auxiliary display is displayed above a display of the laptop, wherein the support member is pivotally attached to the rigid panel member.

2. The portable laptop display system of claim 1, wherein the support member is pivotally attached to an upper end of the rigid panel member.

3. The portable laptop display system of claim 1, wherein the display is pivotally attached to the rigid panel member.

4. The portable laptop display system of claim 1, wherein the support member comprises a second panel member.

5. The portable laptop display system of claim 4, wherein the second panel member is substantially the same size as the rigid panel member.

6. The portable laptop display system of claim 1, wherein the support member comprises a kickstand that extends outwardly from the rigid panel member.

7. The portable laptop display system of claim 1, wherein the rigid panel member and/or the support member include one or more extensions, configurable to further elevate the display relative to a support surface.

8. The portable laptop display system of claim 7, wherein the one or more extensions are telescopic, and extend in a direction parallel to the rigid panel member or the support member.

9. The portable laptop display system of claim 1, wherein the auxiliary display is coupled to the support assembly by an extension member, wherein the extension member is configurable to elevate the display relative to the support assembly.

10. The portable laptop display system of claim 9, wherein the extension member comprises a telescopic member.

11. The portable laptop display system of claim 1, wherein the rigid panel member is coupled to the display by a hinge member, the hinge member including a hollow inner body extending across a width of the rigid panel member.

12. The portable laptop display system of claim 11, wherein the auxiliary display is configured to be coupled to the laptop computer at least in part using a cable, the cable extending through at least part of the hollow inner body.

13. The portable laptop display system of claim 1, further comprising a camera configured to be coupled to the laptop computer and/or the auxiliary display.

14. The portable laptop display system of claim 13, wherein the camera is configurable to be directed in different directions.

15. The portable laptop display system of claim 13, wherein the camera is coupled to an end of an arm that extends outwardly from the system.

16. The portable laptop display system of claim 15, wherein the arm is flexible.

17. The portable laptop display system of claim 13, wherein the camera is configurable to capture images of a keyboard of the laptop, and a user's fingers thereon, and display the images in real time or near real time on a display of the laptop computer and/or the auxiliary display.

18. A portable laptop display system for use with a laptop computer, the portable laptop display system including: a support assembly, configured to support an auxiliary display when the auxiliary display is coupled to the laptop computer, the support assembly movable between a transport configuration and an extended configuration, the support assembly comprising: a rigid panel member, and a support member, wherein the rigid panel member and the support member define a base of the support assembly; and wherein in use and in the transport configuration the rigid panel member extends across an entire front surface of the auxiliary display; and in the extended configuration, the rigid panel member supports the auxiliary display in an elevated position, such that when in use with the laptop computer the auxiliary display is displayed above a display of the laptop, wherein the support member is pivotally attached to the rigid panel member.

* * * * *